United States Patent [19]

Conners

[11] 4,212,076

[45] Jul. 8, 1980

[54] DIGITAL COMPUTER STRUCTURE PROVIDING ARITHMETIC AND BOOLEAN LOGIC OPERATIONS, THE LATTER CONTROLLING THE FORMER

[75] Inventor: John P. Conners, Fond du Lac, Wis.

[73] Assignee: Giddings & Lewis, Inc., Fond du Lac, Wis.

[21] Appl. No.: 726,277

[22] Filed: Sep. 24, 1976

[51] Int. Cl.² .............................................. G06F 9/06
[52] U.S. Cl. ..................................... 364/706; 364/200
[58] Field of Search ................ 235/156, 164; 364/200, 364/900, 706

[56] References Cited

U.S. PATENT DOCUMENTS

| | | | |
|---|---|---|---|
| 3,849,765 | 11/1974 | Hamano | 340/172.5 |
| 3,878,514 | 4/1975 | Faber | 340/172.5 |
| 3,922,538 | 11/1975 | Cochran et al. | 235/156 |
| 3,939,335 | 2/1976 | Brantingham | 235/156 |
| 3,942,158 | 3/1976 | Dummermuth | 364/900 |
| 3,990,052 | 11/1976 | Grunev | 445/1 |
| 4,010,452 | 3/1977 | Cazanove | 445/1 |

Primary Examiner—David H. Malzahn

Attorney, Agent, or Firm—Leydig, Voit, Osann, Mayer & Holt, Ltd.

[57] ABSTRACT

A digital computer of relatively simple and efficient structural organization which is capable not only of conventional arithmetic operations according to a program but also of (i) performing chained Boolean logic processing on any selected bit of any of various selected words held in memory, (ii) using the logic processing result by storing it at any selected bit location in any of various selected words held in memory, and/or (iii) causing different, predetermined instructions within a program to have their execution dependent upon the results of previously performed single bit logic processing. The logic processing is carried out in response to specially coded instruction words which may be randomly interspersed between conventional arithmetic instruction steps within an overall program. Existing registers and apparatus components necessary for conventional arithmetic operations are utilized in large measure to carry out the routing of signals to and from the logic processor, and very little added hardware is required to create the logic processing, storing, and dependent conditioning.

35 Claims, 13 Drawing Figures

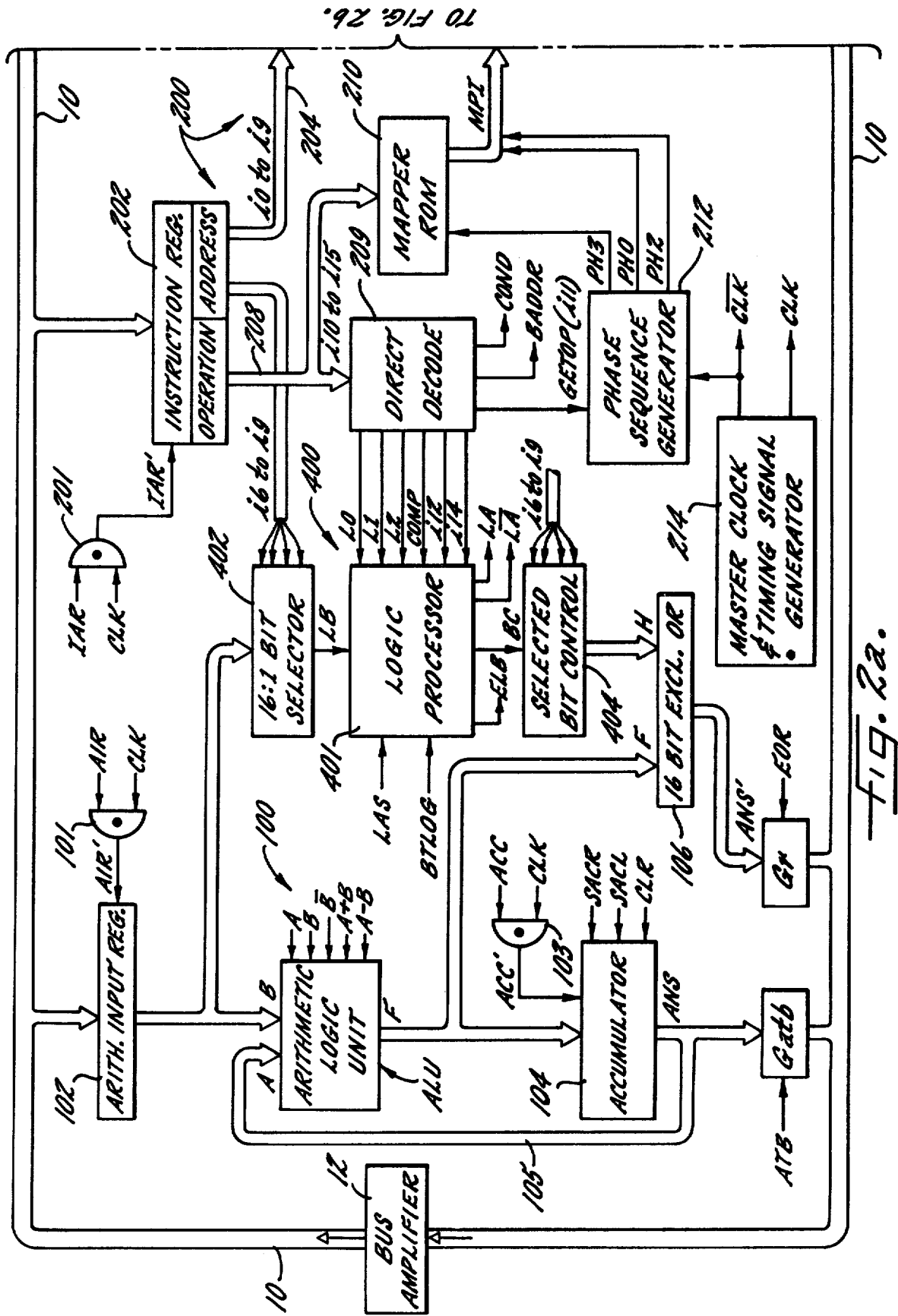

DIGITAL COMPUTER STRUCTURE PROVIDING ARITHMETIC AND BOOLEAN LOGIC OPERATIONS, THE LATTER CONTROLLING THE FORMER

TABLE OF CONTENTS

Abstract of Disclosure
Brief Summary of the Invention
Description of the Drawings
Detailed Description of Exemplary Embodiment
 1. Introduction
 2. The Basic Arithmetic System
 3. Special Word Formats
 4. The Logic Processing Elements
 5. Exemplary Instructions and Their Codes
    A. Ordinary Instructions
    B. Special Instructions
 6. Details of System Memory
 7. Details of Direct Decoding
 8. Details of the Phase Sequence Generator and Master Clock
 9. Details of Mapper ROM and Input Signals to Microprogram ROM
 10. Details of the Microprogramming ROM
 11. Details of the Logic Processor and Bit Manipulation Circuitry
 12. System Operation—In General
    A. The Fetching Operation (Phase Zero)
    B. Feeding the Operand to the Arithmetic Register (Phase Two)
    C. Execution of the Instruction (Phase Three)
    D. Performance of Special Logic Instructions
       1. Logic Process Instructions
       2. Bit Manipulation Instructions
       3. Conditional Arithmetic Instructions
    E. The IF Instruction
 13. Typical Program Sequences Which the Present System Will Carry Out
    A. Boolean Processing With Control of External On-Off Devices
    B. Conditional Arithmetic Operations
Resume'

BRIEF SUMMARY OF THE INVENTION

The present invention relates in general to programmable digital computers. More particularly, it relates to such digital computers which have the capability to carry out and utilize Boolean logic processing on single bits held in words of system memory.

Programmable arithmetic digital computers are per se well known in the art. There are also known and used in the art "programmable controllers" which, in effect, are single bit Boolean logic processors. While digital computers and programmable controllers have been interconnected so that one might affect the operation of the other, such installations are complex and expensive. To applicant's knowledge there has not been available in the art a single device with full, conventional arithmetic capability and full Boolean logic processing capability, and wherein the execution of programmed arithmetic operations may be made conditional upon previously performed programmable chained Boolean logic processing steps.

It is the general aim of the present invention to create a digital computer having not only full, programmable arithmetic and related conventional operational capability, but also having full, programmable Boolean logic processing capability on single bits of various words held in system memory.

An important object and advantage of the invention is to realize such a "combined" arithmetic and logic processing programmable computer by utilizing several of the hardware components necessary for an arithmetic digital computer to perform many of the added functions which yield programmable logic processing capability—thereby to make a dual capability computer lower in cost, smaller in size and easier to program.

Another object of the invention is to enable the logic processing instruction-address words and multibit words of on-off logic operand signals to be held in, read from, and written into system memory just as if they were conventional arithmetic instruction-address words or numerical data words. No special memory organization or control is required; and indeed external devices (such as switches or flip-flops) forming input or output signal logic bits may be treated almost as if they represent bits of words in conventional core or LSI memory.

A further object of the invention is to utilize parts of an otherwise conventional arithmetic digital computer to participate in carrying out programmed single bit logic processing, with the program steps for logic processing being essentially randomly interspersable among the program steps for arithmetic functions.

A major objective and achievement of the invention is a "combined arithmetic computer and logic processor" whose total capabilities, flexibility, and ease of programming exceed those which would result from a simple marriage of a known digital computer and a known programmable controller.

In this latter regard it is an object to provide a "combined computer/processor" wherein the execution and result of arithmetic steps may be qualified and made dependent upon the result of previously performed programmed single bit Boolean logic steps.

Still another object is to provide a "combined computer/processor" wherein the result of chained Boolean logic operations may be "stored" in any bit of various words of system memory, whether such words are held in ordinary memory (e.g., cores) or external devices (e.g., flip-flops which control motors, valves and the like);—and to accomplish this by straightforward programming of the "writing" of a logic result to a selected bit of a selected memory address.

A related object is to provide a digital computer having the capability, in response to coded instruction words, of transferring a logic answer signal to a selected bit of a selected word of memory ("save"), or alternatively making the selected bit of the selected word a "1" (set), a "0" (reset) or the opposite of its previous state (invert).

Yet another object of the present invention is to utilize the conventional instruction-address register (IAR) of an ordinary digital computer to receive instruction words calling for conventional arithmetic functions, and also to receive special instruction words calling for Boolean logic functions. In the latter case, certain bits of the IAR output signal are decoded to create logic operation-defining signals, others of such bits are utilized to select a particular bit of a word as the logic operand, and still others are utilized as an address to select and obtain from memory a word which contains that bit.

A similar object is to utilize the conventional arithmetic input register (AIR) of an ordinary digital computer to receive a data word which contains a desired single bit logic operand, and to route from such register to a Boolean logic processor input terminal the particular operand bit of such word which is called for by the combination of certain bit signals from the instruction-address register containing a special logic instruction.

And another object of the invention is to achieve economy of hardware in a "combined computer/processor" by apparatus which responds normally to a conventional arithmetic instruction but which responds differently to a special logic instruction code format—the bits of the two types of instruction being identical in quantity but the special instruction containing bit selector binary signals in predetermined bit locations.

These and other objects and advantages of the invention will become apparent as the following detailed description proceeds with reference to the accompanying drawings.

DESCRIPTION OF THE DRAWINGS

FIGS. 2a and 2b collectively constitute a single FIG. 2 which is a more detailed block diagram of an arithmetic digital computer having Boolean logic processing capability and utilization thereof, such computer embodying the features of the present invention;

FIG. 3 is a more detailed block diagram representation of the instruction-address register (IAR) which is shown in FIG. 2a;

FIG. 4 is a detailed diagram of a suitable direct decode circuit which is shown generally in block form by FIG. 2a;

FIG. 5 is a detailed illustration of a suitable phase sequence generator and master clock which are shown more generally in FIG. 2a;

FIG. 10 is a detailed block diagram of a Boolean logic processor suitable for use in the practice of the invention; such processor being shown generally in block form in FIGS. 1 and 2a;

In the description which follows, reference will also be made to Tables I through VII which supplement drawing FIGS. 1 through 12. These tables are, for convenience of reference, located at the terminal portion of the present specification.

While the invention has been shown and will be described in some detail with reference to a particular, exemplary embodiment thereof, there is no intention that it thus be limited to such detail. On the contrary, it is intended here to cover all modifications, alternatives and equivalents which fall within the spirit and scope of the appended claims.

DETAILED DESCRIPTION OF EXEMPLARY EMBODIMENT

1. Introduction

Figure 1:
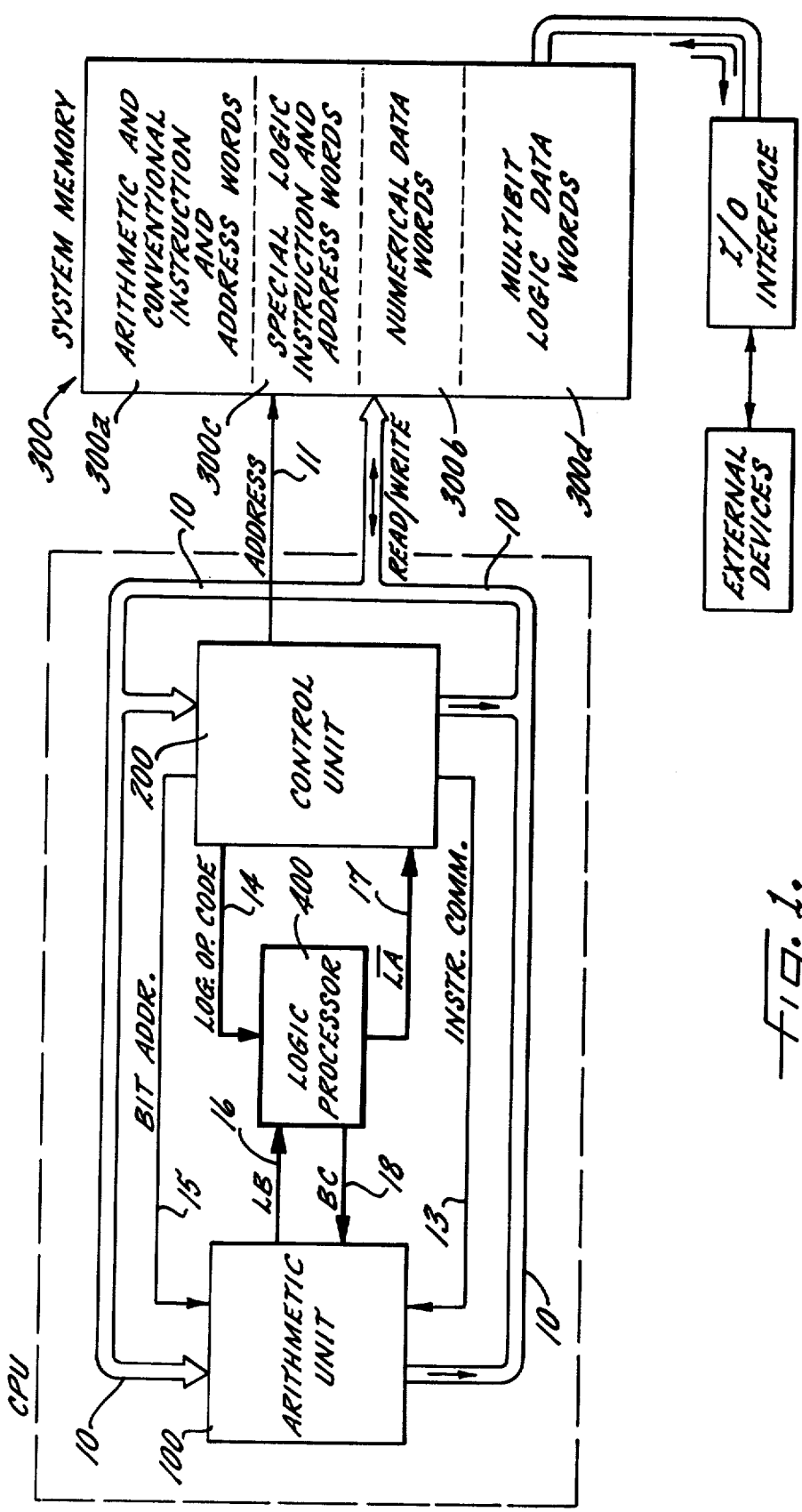
FIG. 1 is a generalized block diagram illustrating an improved digital computer embodying the features of the present invention, the interrelated major components being shown partially in a structural and partially in a functional sense.

FIG. 1 shows broadly, and by partly functional and partly structural illustration, a digital computer constituting an exemplary embodiment of the present invention. Considering first the basic programmable arithmetic digital computation system, a central processing unit (CPU) comprises an arithmetic unit 100 and a control unit 200 connected by trunking (a single multi-conductor bus 10) to a read-write system memory 300. In general terms, the memory 300 is of an organization well known per se in the art; it has a plurality of locations for receiving, holding and signaling multibit words where each bit is bi-valued, i.e., of a zero or one value. Each multibit word is stored at a location which is designated by a unique address. Some of the words stored in the memory are arithmetic instruction-address words which in their specific nature constitute a software program enterable into the memory prior to beginning operations. By contrast, some of the words stored at different locations within the memory are numerical data words to be used and/or changed in or as a result of sequential arithmetic calculations. These instruction words and arithmetic data words are labeled 300a and 300b in FIG. 1 merely to indicate that they are of a basically different nature.

The control unit 200 (including a clock and program counter, not shown in FIG. 1) serves to bring successive instructions of a program sequentially into execution, and to control the various devices within the entire computer during the execution of each step which is designated by an instruction word. Although the digital computer and its control unit 200 may be organized in well known fashion to carry out multiple sequences of operations in response to a single instruction (for example, index addressing, double precision computations and multi-sequence computations such as multiplication, division, or square rooting), the arithmetic computer here to be described is limited merely for the sake of simplicity and brevity to performing one sequence of operations in response to each instruction word. Thus, for present purposes of discussion, it may be considered that the control unit 200 causes the computation system to go through successive operational sequences when it successively calls in and utilizes any instruction word. In one type of such operational sequence, the control unit sends address signals via a multi-conductor address trunk 11 to the memory 300 and causes the latter to supply an instruction-address word from the desired memory location to the bus 10 so that the desired instruction-address word is fetched into the control unit.

Thereafter, the control unit sends the address contained in the fetched instruction word via trunk 11 to the memory 300 so as to cause the latter to feed the data word from that address location via bus 10 into the arithmetic unit 100. Next, the control unit 200 sends signals, derived from the instruction portion of the fetched word via a path 13 to the arithmetic unit 100 to command the latter to execute the corresponding function, e.g., to add or to subtract the fed number data word to or from a previously accumulated or loaded word in the arithmetic unit.

The results of a succession of arithmetic computations using successive data words as operands may be returned to a specified address location in memory for subsequent utilization or outputing to external devices. For this type of "storing" operation, a fetched instruction-address word will cause the control unit to send a command signal via path 13 to the arithmetic unit 100, making the latter place its then accumulated arithmetic answer word on the bus 10, and the control unit will thereafter cause the memory 300 to store the bits of that word as they appear on the bus into a memory location which corresponds to the address represented by the fetched instruction-address word.

While these arithmetic procedures are treated with extreme brevity above (and will be more fully described below), they permit successive computations (such as add, subtract, divide) to be performed in sequence and the answer resulting therefrom to be stored back in memory for future use or outputing to an external device such as a CRT display, printer, or the like. Merely to give a simple example, one may assume that a short numerical computation procedure, performed in response to a previously inserted program, involves the steps of (a) taking the number A from memory location 124, (b) adding the number B from memory location 126, (c) subtracting the number C taken from memory location 130, (d) dividing the result by two, and (e) storing the answer into memory location 140 where it may be considered as the number D. Each such numerical or "data" number is represented in binary notation by a one or a zero value in the multiple bit locations of a numerical data word; each instruction word is made up of a similar quantity of bi-valued bits contained at a specific address in the memory with a first group of its bit values representing in a predetermined coded format the particular type of operation to be performed, and with a second group of its bit values representing in binary notation the number of the memory address at which the operand (or computational answer) will be found (or is to be stored) in the system memory.

In many applications of programmable alpha-numeric digital computers, and especially where processes or machines are ultimately to be controlled according to changes in sensed values or conditions by changing values of iteratively computed variables,—it is desirable to sense many on-off devices (e.g., limit switches, pressure safety switches, motor contactors, and the like) to determine logically if their combination of states satisfy a certain predetermined relationship (Boolean equation), and to turn on or off an external device if the test is or is not satisfied. Programmable controllers have been used for this purpose in lieu of switch and relay circuits. As an example, if there are four switches S1 through S4 and a relay R1 controlling a motor which pumps cooling fluid, it might be desired in a particular control system to turn the motor on if and only when switch S1 is closed or switch S2 or S3 is closed and switch S4 is open. The Boolean expression would be:

$$S1 + (S2 + S3) \cdot \overline{S4} = R1$$

Each switch may be viewed as one bit of a word of memory, such bit having either a zero or a one binary value when the switch is open or closed; and the relay may be viewed as one bit of memory which is to be set to a one when the foregoing expression is satisfied, and to be set to a zero state (dropping out relay R1) when that expression is not satisfied.

As functionally illustrated in FIG. 1, the memory 300 contains special logic instruction-address words in some of its address locations 300c. It also may contain multi-bit logic data words here indicated as to their nature by the reference character 300d. When a given program step is reached and calls for fetching of a special logic instruction word into the control unit 200, the latter decodes the instruction portion of that multi-bit word into a logic operation code sent via a path 14 to a logic processor 400. Moreover, the control unit 200 responds to the address portion of the fetched special logic instruction word to send address signals via trunk 11 to cause the memory 300 to place on the system bus 10 the data word corresponding to that address. The data word is fed to the arithmetic unit 100 but the latter does not execute an arithmetic function on that word as an operand. Instead, a bit selection code formed by a particular bit group of the fetched instruction word is sent via a path 15 to the arithmetic unit 100, and causes a selected one of the bit signals of the data word to be transmitted via a path 16 as a one-bit operand input signal LB to the logic processor 400. The latter then performs a Boolean logic function on that operand taken with any previous existing logic answer LA. Examples of such logic functions are LOAD, AND, OR and XR (exclusive OR). The logic answer LA is supplied in inverted form as a signal $\overline{LA}$ via a path 17 to the control unit 200 so as to modify the operation of the latter under certain conditions and in a fashion to be hereinafter explained. The logic answer LA and its inverted form $\overline{LA}$ remain at any given established binary value (zero or one) until they are changed as a result of some further instructed logic processing operation.

One mode of using the logic answer signal LA, after it has been created by a chain of one or more Boolean operations, is to store such signal in a selected bit location of a selected word of memory. This operation, here called "save" to distinguish it from the operation of storing an arithmetically computed answer, is carried out in response to a special logic instruction word being fetched from memory to the control unit 200. The operand word containing the desired bit is then fed from memory to the arithmetic unit 100 and the bit address code portion of such fetched word causes the selected bit value of the operand word to be sent via path 16 as the signal LB into the logic processor 400. By means to be described in detail hereafter, the logic processor utilizes the input signal LB in conjunction with the existing logic answer signal LA to create a bit control signal BC. That latter signal BC is returned to the arithmetic unit via a path 18 and to means which cause the original operand word, with the selected bit forced to agree with the logic accumulator answer LA, to be placed on the bus 10 and stored in the memory 300 at the location signaled on the address trunk by the address bits of the original fetched instruction.

In addition to the foregoing, any word may be pulled from memory into the arithmetic unit 100 in response to a special logic instruction word fetched into the control unit 100 and designating the function that a selected bit of a predetermined word should be forced to the one state ("set"), forced to the zero state ("reset") or switched in states ("inverted") before the operand word is returned to its original address location in the memory.

This brief and introductory explanation with reference to FIG. 1 will indicate to the reader in a very general sense how a few components added to a generally conventional arithmetic computer system may, according to the invention, impart to the resulting computer the capability of programmable logic processing. But a full understanding of the operation and advantages, and the details of the structure by which they are realized, will flow from the more specific description which follows.

2. The Basic Arithmetic System

Figure 2B:
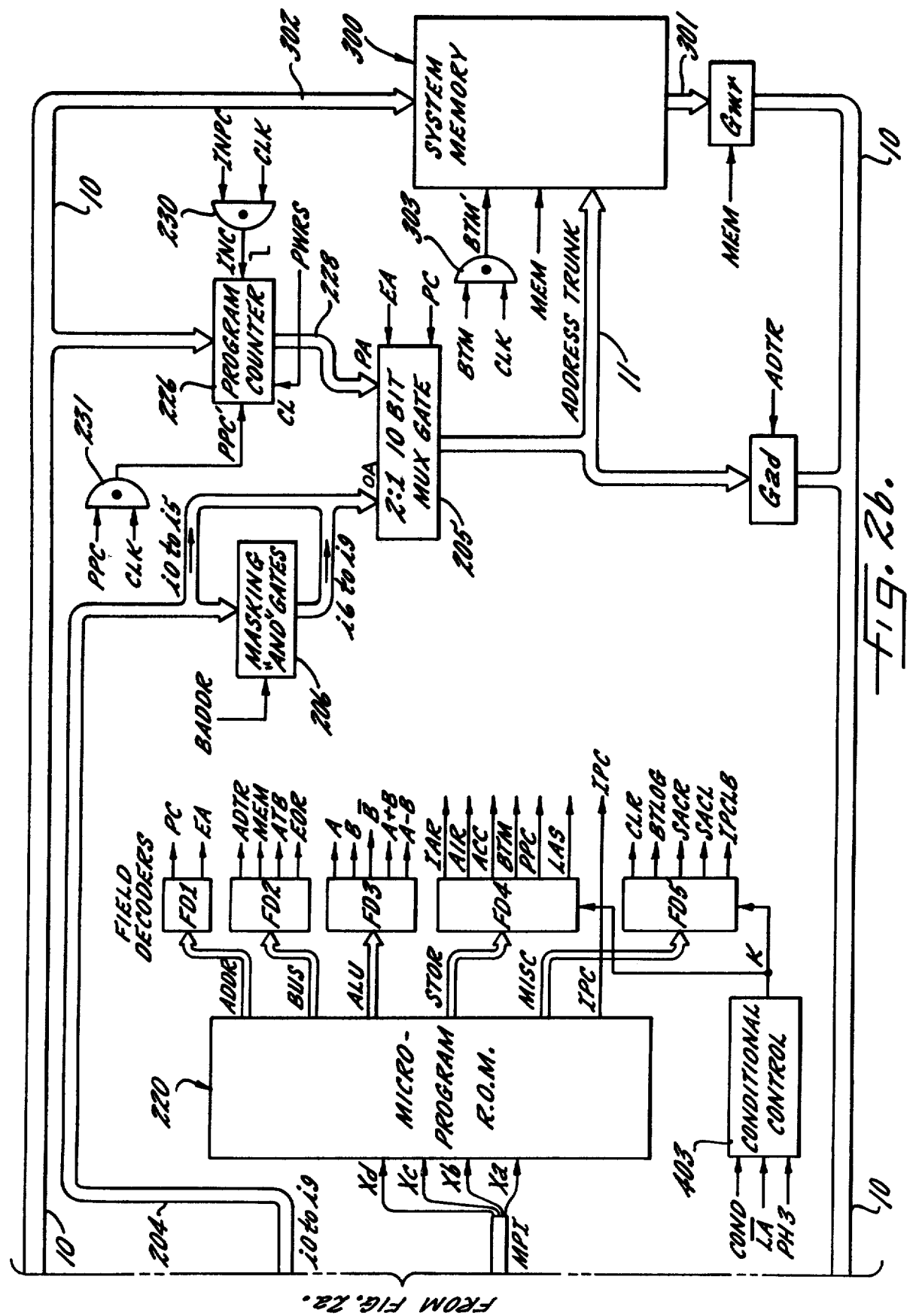

Referring now to FIGS. 2a and 2b, the system memory 300 is shown as having its output lines 301 connectable to the system bus 10 when a multi-bit gate Gmr is enabled, thereby to "read" onto the bus 10 the signals corresponding to a word stored at a particular location. The word location is selected by numerically coded signals applied at that time to the address trunk 11, and the "read" operation is initiated by an enabling control signal MEM. Conversely, the input lines 302 of the memory 300 always receive signals from the bus 10; the entering signals are routed to and stored at a memory address location designated by signals then supplied on the address trunk 11, but only when an enabling "write" signal BTM' is applied to the memory control circuitry. The writing of a sixteen bit word into a particular memory location destroys the contents previously stored at that location.

For conciseness and to avoid needless detail which would only obscure the essential aspects and the advantages of the invention, a very much simplified version of a typical basic arithmetic computer system will here be described. Thus, it will be assumed that the system memory 300 is of known core or LSI type with only 1024 word address locations, each word being sixteen bits in length. There are sixteen conductors in the input and output lines 301 and 302, and the system bus 10 likewise contains sixteen conductors so that it may carry sixteen bit signals representing one word at any given instant in time. The address trunk 11 has ten conductors, and combinations of zero or one voltage levels thereon permit any address of a decimal value from 0 to 1023 to be represented in binary notation. Thus, when the address trunk carries signals which in binary notation represent a decimal value of 285, it is considered that the word at address location 285 will be read from memory onto the bus 10 (if the read signal MEM is present), or a new form of that word will be written from the bus 10 into that address location (if the write signal BTM' is applied). Of course, the memory and bus size may be expanded to eighteen bits per word for purposes of parity checking, but this known refinement is here omitted for simplicity of description.

The single system bus 10 may receive signals from one of several sources. If one of the gates Gmr, Gad, Gr or Gatb is enabled, the bus signals come respectively from memory 300, address trunk 11, an exclusive OR array 106, or an accumulator 104. Thus, bit signals of a multi-bit word may be placed on the bus 10 from the device which feeds the enabled one of these gates. The signals placed on the bus 10 at its lower run across the bottom of FIG. 2 may be amplified by a bus amplifier 12 as they pass to the bus portion shown at the top of FIG. 2; but in effect there is a single, common bus 10 for the entire system. Signals placed on the bus may be "accepted" into any one of several devices having presetting input terminals connected to the bus conductors, but only when the particular device receives a preset "enable" signal. The manner in which such enabling signals are applied to an arithmetic input register 102, an instruction-address register 202, a program counter 226, or the memory 300 will be explained below. Merely as an example, however, it will be apparent that the arithmetic input register 102 is enabled to accept in parallel for storage the bus signals when an enabling signal AIR'0 from a logic AND circuit 101 results from two signals denominated AIR and CLK are both at "1" levels.

The arithmetic unit 100, here shown by FIGS. 2a and 2b in greatly simplified form, includes the arithmetic input register (called AIR) 102. This is a sixteen bit storage register of known, commercially available construction. The output of the register 102 leads to a sixteen bit input B of a known, commercially available arithmetic logic unit ALU having a second, sixteen bit input labeled A. The ALU arithmetically or logically treats or combines the two sixteen bit input signals A and B according to the particular one of several possible command input terminals then receiving an enabling "1" level voltage. The result is produced as a sixteen bit answer signal F appearing on the output lines of the ALU. Although the ALU (of suitable known, commercially available type) may accept additional command signals and perform other arithmetic or logical operations upon one or both of its two inputs A and B, only five arithmetic logic functions are here illustrated for purposes of discussion. These functions are respectively produced when one of the five control terminals shown at the right of the ALU in FIG. 2a receives an enabling voltage. When the commanded function is enabled by a signal A, then F=A; when the commanded function signal is B, F=B, when the commanded function signal is $\overline{B}$, F is equal to the input signal B with all bits inverted, i.e., F=$\overline{B}$; when the commanded function signal is A+B, then the output signal F is equal to the sum of the two numerical input signals A plus B; and when the commanded function signal is A−B, then F=A minus B.

The output signal F from the ALU is fed to the input of an accumulator register 104 having a sixteen bit output here designated ANS. When the accumulator receives a "preset enable" signal ACC', the output signal F passes into and is stored by the accumulator register 104 so that it thereafter appears as the answer signal ANS. Noteworthy is the fact that the output ANS of the accumulator 104 is returned via a sixteen bit trunk 105 to form the input signal A of the ALU. The accumulator output ANS is also selectively routed through the gate Gatb, when the latter is enabled by a signal ATB, so that it may be placed on the bus 10, as hereinafter explained.

In a conventional arithmetic unit, provision is made to place the ALU output F directly on the bus 10 for some operations. In the practice of the present invention, an alternative or second answer signal ANS' is formed by a sixteen bit exclusive OR array 106 which receives as one input the signal F from the ALU, and as a second input a sixteen bit control signal H. When an enabling signal EOR is applied to the gate GR the output ANS' of the exclusive OR array is transmitted to the bus 10. This arrangement permits the ALU signal F to be sent directly to the bus 10 (by-passing the accumulator 104) if the signal H is made all 0's so that ANS' is identical to F. On the other hand, if signal H is made all 1's, the signal F appears in inverted form (one's complement) an ANS'. The signal H is created by a selected bit control circuit 404 to be described later.

It should be noted at this point that the accumulator 104 may also be commanded to perform certain operations on the multi-bit word which it contains. Merely as a few examples, the accumulator is shown in FIG. 2a as receiving (under certain conditions to be noted below) a command signal SACR, SACL or CLR. When these command signals are so applied, the multi-bit word contained in the accumulator is respectively shifted one place to the right, shifted one place to the left or forced to all zeros, i.e., the accumulator is "cleared". It will be recognized that shifting a binary number held in the accumulator one place to the right or one place to the left has the effect of multiplying or dividing the represented numerical value by two.

The operation of the arithmetic system thus far described is well known and need only be summarized briefly by a very simplee example. Assume that the accumulator 104 has been cleared, and a first number N1 is entered into the AIR register so that it becomes the ALU input B, while a command A is applied to the ALU. The number N1 then appears as the ALU output F. If the "enable store" signal ACC' is now produced, number N1 is entered into the accumulator 104 and appears as the answer ANS (making the ALU input A equal to N1). If a second number N2 is now brought from bus 10 into the AIR register 102 and thus becomes the signal at ALU input B, while a command signal A+B is applied to the ALU, the output F becomes equal to the sum N1 plus N2 of the two numbers. A "store to accumulator" signal ACC' results in storage of this latter signal F=N1+N2 into the accumulator 104 so that it appears at ANS (and becomes a new value of the ALU input A). If a number N3 is next brought from the bus 10 to input B of the ALU while the latter is commanded with a signal A−B, the output F becomes the algebraic sum N1+N2−N3. An enable store ACC' signal transfers that value into the accumulator 104 and it appears at the output ANS. If the gate Gatb is now enabled to route the ANS signal to the bus 10, the result N1+N2−N3 of such chained arithmetic computations will appear on the trunk 10 (from which it may be stored into memory or otherwise utilized). The subtraction of two numbers involves forming, inside the ALU, the binary two's complement of the subtrahend and the binary addition of that subtrahend complement to the minuend, but such details and the manner in which negative numbers are handled are well known so that they need not burden the present description.

The sixteen bit exclusive OR array 106 is employed as an alternative device for transferring the ALU output signal F to the bus 10 in either its "true" or its one's complement form. Each bit portion of the circuit 106 is a simple "exclusive OR" gate which functions according to the well known truth table:

| INPUT | | EXCLUSIVE OR |
| --- | --- | --- |
| f | h | OUTPUT |
| 0 | 0 | 0 |
| 0 | 1 | 1 |
| 1 | 0 | 1 |
| 1 | 1 | 0 |

With the foregoing relationships in mind, it becomes apparent that if the multi-bit input H to the circuit 106 is made zero in all of its bits, the output ANS' is simply identical to the multi-bit ALU output signal F; conversely if the multi-bit input signal H is made one in all of its bits, then the output ANS' is the one's complement of the signal F, i.e., corresponds to the signal F with all of its bit values inverted. Control of the signal H and enabling of the gate Gr with a signal EOR therefore permits the signal F to be placed on the bus 10 in its true or its complement form.

The accumulator 104 and the exclusive OR array 106 may be viewed collectively as an arithmetic output register (AOR) since an output (ANS or ANS') may be taken from either one onto the bus 10.

The arithmetic unit 100 is sequentially controlled in the basic arithmetic system by the control unit 200 which supplies the necessary timing and command signals. The control unit may be viewed as including the instruction-address storage register 202 which is selectively enabled by the output IAR' of an AND circuit 201 to accept signals from bus 10. This register essentially always receives instruction-address words rather than data words, and it is treated as having two major portions which respectively receive first and second groups of bits in conventional format instruction words. The first group represents in coded form a desired operation (instruction), and the second group usually represents the memory address of a data word which is to be pulled from memory as an operand or into which a computational result is to be stored.

To provide a simple but concrete example, Table I shows that a basic arithmetic instruction-address word has a format, assumed for purposes of the present description, made up of sixteen bit places b0 through b15, the first ten places containing address binary values which represent any memory address from 0 to 1023. Bits b10 through b15 are coded to designate any one of several possible instructions such as LDA, i.e., "load accumulator", ADD, i.e. "add the operand to the number presently existing in the accumulator", or SUB, i.e., "subtract the operand from the number presently existing in the accumulator". A typical set of possible instructions will be treated more fully below for purposes of completing the present description.

In keeping with one aspect of the invention, and for a purpose to be explained below, the basic instruction-address word format (Table I) utilizes bit place b10 to indicate (by a 1 or 0 therein) that the instruction is "unconditional" or "conditional". This leaves five bit places b11 through b15 to contain binary bit values of 0 or 1 (labeled I in Table I) which, according to a preselected code may designate any one of thirty-two possible instructions. Again, the size of the system memory and the limited number of possible instructions here to be described are greatly reduced for brevity. A commercial product will, of course, have more than 1024 memory locations and be organized to handle many more instructions, including some which involve microprogrammed multiple steps.

It may be observed from Table I (line four) that the format of a basic data word involves simply binary representation of a numerical value. The combination of 0's and 1's in the bit places b0 through b14 permit the binary representation of any desired decimal numerical value between 0 and 32,767. The last bit place b15 is used to designate, by a one or zero, the sign of the number. Generally speaking, data word numbers of this format are fed to the arithmetic input register 102 rather than to the instruction-address register 202.

Figure 3:
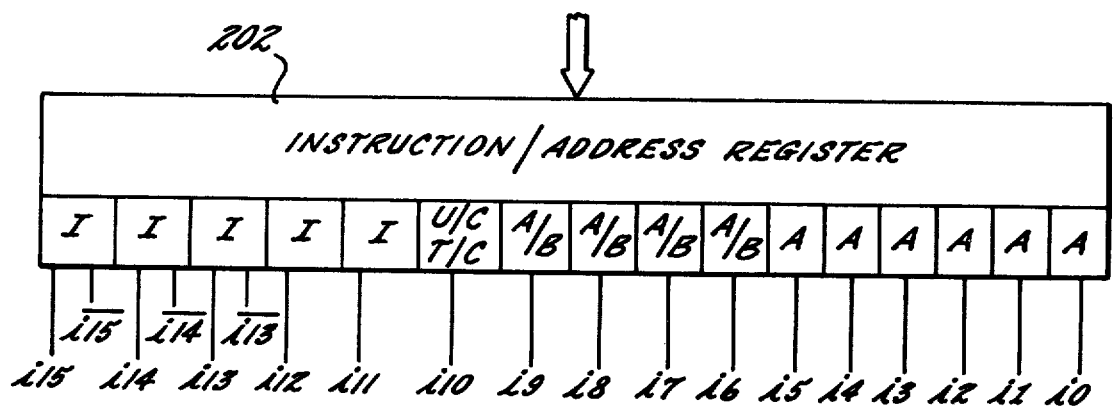

FIG. 3 is an enlarged illustration of the instruction-address register 202 which will aid in subsequent discussions. Each of the bit places in that storage register is formed, for example, as a flip-flop which is set or reset when the instruction word, accepted from the bus 10, contains a one or a zero in the corresponding bit location. The sixteen output lines from the instruction-address register are labeled i0 through i15 in FIG. 3, with complement signals $\overline{i15}$, $\overline{i14}$, $\overline{i13}$ also being taken from the three flip-flops at the left end of the register. Thus, by comparing Table I and FIG. 3, one may see that when a basic instruction-address word is entered into the instruction-address register 202, the output lines i0 through i9 will carry address-representing binary signals, whereas the output lines i10 through i15 will carry instruction-representing binary signals (although the signal on the output line i10 has a special significance).

Returning to FIGS. 2a and 2b, the address bit signals within an instruction-address word in the register 202 are normally carried on a trunk 204 from output lines i0 through i9 to the input of a 2:1 multiplex gate 205. When the latter is enabled by a control signal EA, its input signal OA from lines i0 through i9 is passed to the memory address trunk 11, thereby to designate the memory location from which a word is to be read, or into which a word is to be written. The lines i0 to i5 always carry signals for the ten bit input OA; and the signals on lines i6 to i9 normally are passed through an enabled masking AND gate 206 to form the remainder of the signal OA. Under certain conditions to be treated below, the masking gates 206 will be disabled to mask off and to set to 0 the signals in bit places b6 through b9 of the ten bit input signal OA. For the present, it may be considered that the input OA is constituted by the signals on all of the register output lines i0 through i9.

The instruction bit output lines i10 to i15 are carried by a trunk 208 to a direct decoder circuit 209 and a mapper ROM 210. They are utilized in the latter devices for ultimately controlling the nature of the operation performed during each part of a phase sequence carried out after any instruction word is received in the register 202.

Specifically, when an instruction word in the register 202 contains an instruction code requiring the use of an operand from memory, then the direct decode circuit 209 sends a "get operand" signal GETOP to a phase sequence generator 212, causing the latter to produce sequentially phase signals PH0, PH2, PH3 timed by a $\overline{CLK}$ signal from a master clock and timing signal generator 214. On the other hand, when an instruction word in the register 202 contains an operation code which does not require the use of an operand, the direct decode circuit 209 does not produce the GETOP signal, and the phase sequence generator 212 then sequentially produces only PH0 and PH3 phase signals.

As explained more fully below, the mapper ROM 210 is activated during the "execution" phase PH3 of each operational sequence; it decodes the instruction bit signals from output lines i11 to i15 to produce coded four bit microprogram input signals on a microprogram input trunk MPI. During Phase Zero or Phase Two when the signals PH0 and PH2 exist, the mapper ROM 210 is inactive and appropriate microprogram input signals are fed directly to the trunk MPI from the phase sequence generator 212.

The MPI trunk leads to the four controlling input terminals Xa, Xb, Xc, Xd of a microprogram "read only memory" ROM 220. The microprogram ROM is, in effect, a permanently connected coding matrix which, in response to sixteen possible input signal codes on lines Xa, Xb, Xc, Xd, produces output signals on a different combination of fifteen output lines (lines M1 through M15 in FIG. 9, later described). These fifteen lines are segregated into different "field" groups here labeled in FIG. 2b ADDR, BUS, ALU, STOR, MISC and IPC. The ADDR field signals, by the binary code combinations thereof, designate the source from which signals are to be applied to the memory address trunk 11. The BUS field signals, by the binary combination thereof, designate the source from which signals are to be taken for application to the system bus 10. The ALU field signals, by their binary code combination, designate the particular command which is to be applied to the ALU in order to cause it to produce a desired type of operation on its input signals A and B. The STOR field signals, by their binary code combination, designate the particular device or component into which signals are to be stored by taking such signals from the system bus 10. The MISC field signals, by their binary code combination, designate a particular one of several possible miscellaneous control signals which is to be produced. And the IPC field signal, consisting of but a single signal on a single line, designates, when present, that the program counter 226 is to be incremented.

The field group output lines of the microprogram ROM are passed into respective field decoders labeled FD1 through FD5 in FIG. 2b. These are simple decoders which produce an output signal on one of several output lines, the output line corresponding to the particular combinational code of input lines then receiving binary "1" signals. As will be apparent from FIG. 2b, the decoded address field signal may be either PC or EA. Likewise, the decoded BUS field signal may be either ADTR, MEM, ATB or EOR. The decoded ALU field signal may appear on one of five lines labeled A, B, $\overline{B}$, A+B and A−B. The decoded STOR field signal appears on one of six possible decoder output lines, while the decoded MISC field signal appears on one of five possible output lines.

It may be noted in passing that the STOR and MISC field decoders are "gated". That is, all output signals therefrom are clamped to the "0" level when a control signal K applied thereto is switched from its normal 1 value to a "0" level by a conditional control 403 to be described.

Finally, the control unit 200 includes a program counter 226 employed conventionally to advance the operation of the overall system from one program step to the next. The program counter 226 may contain ten tandem flip-flops producing binary output signals representing decimally any value from 0 to 1023, such signals being sent via a trunk 228 to form a ten bit input signal PA to the multiplex gate 205. When that gate is enabled by a PC signal, it transmits the counter output signals, constituting the input signal PA, to the address trunk 11 so that the system memory is instructed to read the word from that address onto the output lines 301, or to store the signals on the input lines 302 into that address location. The program counter 226 is normally incremented so that it advances sequentially from one count state to the next, such incrementing occurring in response to the positive-going transitions in pulses INC applied to the "count input" terminal of the program counter. The incrementing pulses are formed by an AND circuit 230 which is controlled in a manner to be detailed hereinafter.

As an alternative, however, the program counter 226 may be preset to a desired count state so as to make its output signal PA have a particular numerical value. This is done conventionally by a preset signal PPC' from an AND circuit 231 which presets the counter 226 to agree with the signals then existing on the b0 to b9 lines of the bus 10. Also, the program counter may be "cleared" to a zero count state, when the system is first placed in operation, by a power start pulse PWRS generated by means not shown when power is first applied to all of the system components.

3. Special Word Formats

As indicated above, a basic instruction-address word (first line in Table I) is set up so that the binary values in ten bit places (labeled A) represent an address, and the values in six bit places (labeled I and U/C) represent a particular instructed operation. In keeping with the invention, however, means are provided to respond in a unique way to any of several "special" instruction address words, namely, those which by their instruction codes in bit locations b11 through b15, call for the logic processing or manipulation of a single selected bit of a selected word in memory. Although the basic and special instruction word formats here described are only illustrative of the rationale involved, and other equivalent formats may be chosen to effect the same results, Table I shows the format of a machine language instruction code which will call for single bit operations of various specific types. Observe that in a "logic process instruction" bit locations b0 through b5 (labeled A) represents the address of an operand word, i.e., a selected word from which a selected bit is to be utilized. In any such "logic process instruction" word format, the binary values (labeled B) as they appear at bit locations b6 through b9 represent in binary format a number from 0 to 15 which identifies the desired single bit to be selected from the selected word and which is to be utilized in the various possible logic operations. Finally, the special format of a "logic process instruction" word contains binary values (labeled I and T/C) in bit locations b10 through b15 which designate, according to a pre-established code, the particular type of logic function (such as AND or OR) which is to be performed. As will become apparent, the binary value appearing in bit location b10 of a "logic process instruction" word is used to indicate whether the selected single bit operand is to be taken in its true or complement form, while the signals labeled I in bit places b11–b15 define the particular operation to be carried out.

There are two broad types of single bit logic operations. The first type (involving four possible different specific operations) utilizes the selected bit signal as an input operand to the logic processor. The second type (which may be any one of four specific operations) involves storing the logic answer LA in a selected bit location in a selected word of memory, or driving that selected bit to a desired state. The latter type of operation is here called "bit manipulation". As shown in Table I, a "logic bit manipulation" instruction address word is identical in format to a "logic process instruction" word, except the signal in bit location b10 (and labeled U/C in Table I) denotes whether the operation is to be effected "conditionally" or "unconditionally". The U/C as it appars in Table I for the "logic bit manipulation" instruction word, like that of a "basic instruction" word, signifies that if a 0 or a 1 appears in the b10 location, then the instruction represented by the entire word is to be respectively effected unconditionally (regardless of the value of the logic answer signal LA) or conditionally (only if the signal LA is then 1).

Single bit logic operations may be performed on a selected bit of an ordinary alpha/numeric data word. For example, the numerical "data word" format shown in Table I may have its single bit signal from location b14 examined and utilized as an indication of whether the total numerical value of the entire word is or is not greater than the decimal value of 16,384. As another example, the signal in the b15 location of a numerical data word may be selected as an indicator of whether the numerical value is positive or negative. In some instances, however, it may be desired to have a large plurality of unrelated single bit signals available for utilization and/or changing in or by logic operations. It is a feature of the present invention that some words, held at known addresses in the conventional memory 300 may simply each represent sixteen individual bistate or on/off values. While these memory words are in a true sense "data words" their individual bit signals do not collectively represent any numerical value. Such a data word containing individual logic bits labeled $Q_0$ through $Q_{15}$ is illustrated in Table I as a "logic bit word". Words of this type can be placed in memory just as if they were ordinary numerical data words, and individual bit signals can be accessed or changed as will become apparent below. Indeed, some of the "logic bit words" held in memory need not be stored in conventional core or LSI memory elements. They can be signals which reside at 0 or 1 levels according to whether corresponding respective individual switches are opened or closed; or they may represent the voltage output from flip-flops which are suceptible of being set or reset in order to turn external devices on or off.

4. The Logic Processing Elements

In carrying out the present invention, a few relatively simple elements are added to the basic arithmetic system to impart programmable single bit logic processing and manipulation capability—and to make it possible to program any ordinary instruction as being "unconditional" or "conditional" upon the results of previously performed chained Boolean single bit operations. As a preliminary introduction, FIG. 2a illustrates a logic processor 401 which, in essence, performs two types of operations upon a single bit operand input signal LB. It "loads" the LB signal by making LA agree therewith, or it combines the LB signal by way of an AND, OR or XR (exclusive OR) function with the existing logic answer signal LA, changing the latter to agree with the result of that operation. Alternatively, it utilizes the operand input signal LB to create a bit control output signal BC when is utilized to drive the selected bit in the selected word to agree with the logic answer LA or to take on a specific desired one of the two possible binary values.

To instruct the logic processor 401 as to the particular operation which it is to perform (as a result of a particular special instruction-address word fetched into the register 202) the direct anode circuit 209 is arranged to supply five input signals L0, L1, L2, COMP i12, i14 to the processor. By the particular combination of these signals which exist, one particular logic function (out of eight specific possible logic functions) is commanded. The COMP signal instructs the processor as to whether the input signal LB is to be treated for logic processing in its true or its complement form. In the present specification the symbols "dot", +, ⊕ are used according to familiar Boolean algebra to denote the logic operators "and", "or", "exclusive or" ("x and y" is written x·y; "x or y" is written x+y; "x OR y" exclusively is written x⊕Y). The other eight possible logic functions are listed in Table IV wherein the neumonic symbols mean;

LD: Load selected bit into the logic accumulator to make LA agree therewith.

AN: Make $LA_n$ equal to $LA_{o\cdot LB}$. (Note: $LA_o$ denotes the "old" value of LA; $LA_n$ denotes the "new" or resulting value of LA.)

OR: Make $LA_n$ equal to $LA_o + LB$.

XR: Make $LA_n$ equal to $LA_{o \oplus LB}$.

SV: Save (store) the LA signal at the selected bit location of the selected word.

IV: Store back into the selected bit location of the selected word the "inverted" (complement) form of the selected bit signal LB.

ST: Set the signal at the selected bit of the selected word to a binary 1 value.

RS: Reset the selected bit of the selected word to a binary 0 value.

Table IV will confirm that a five bit code (L0, L1, L2, i14, i12) uniquely represents, by the combination of binary values in those five signals, eight possible specific logic functions—so that operation code signals dictating the manner in which the logic processor 401 is to function are supplied to the processor from the direct decode circuit 209, the particular code being dependent upon the instruction bits appearing on the lines i11 through i15 of the register 202. The manner in which these operation code signals determine the specific operations of the logic processor will be explained later with reference to FIG. 10.

A 16:1 bit selector 402 pulls the LB signal from the selected bit location of an operand word which has been selected and fed into the arithmetic input register 102. It does so by using the "bit identification" signals of a special instruction word fetched into the instruction-address register 202. Those four signals (labeled BBBB in Table I and appearing on output lines i6 to i9 of register 202) represent in binary notation any decimal value from 0 to 15 and thus any bit place from b0 to b15. The bit selector 402 has sixteen input lines which are the output lines of the arithmetic input register 102. When the decimal value of the BBBB signals has a specific value within the range of 0 to 15, then the signal bit signal from the register 102 at its corresponding bit location b0 to b15 is transmitted to appear as the logic operand signal LB. For example, if the signals on lines i6 to i9 have the binary values 0101, then the signal from the bit location b5 of register 102 will be transmitted and appear as the single bit operand signal LB. If such output signals from the register 202 have the binary values 1011, the signal from the b11 location of register 102 will become the signal LB. Such 16:1 multiplex circuits are per se well known and commercially available, so that a more detailed description is unnecessary.

Whenever the logic answer LA is to be stored into a selected bit location of a selected word, or the selected bit otherwise manipulated (by instructions IV, ST or RS), the arithmetic unit 100 is employed to handle the entire selected word. The word is brought into the arithmetic input register 102 so it becomes input B to the ALU—and the latter is commanded with a $\overline{B}$ signal to make the signal F correspond to the one's complement of such word. If the input H to exclusive OR array 106 is made all 1's, then the output signal ANS' is the inverted form (one's complement) of signal F and thus identical to the original selected word. But a 0 signal in any bit of the signal H will cause the corresponding bit of the signal ANS' to be inverted relative to the value of the corresponding bit of the originally selected word. Thereafter, the signal ANS' can be restored into memory at the original selected word location.

To accomplish this selective bit inversion in the execution of special logic instructions SV, IV, ST, RS, the signal BC is transmitted as the input to a selected bit control 404 which is a 1:16 demultiplexer gate selectively conditioned by the four place "bit" identification signals then on register output lines i6 to i9 (and representing the bit address BBBB of a special instruction word in the register 202). That is, the bit control circuit 404 is a known type of 1:16 MUX gate which receives the same control signals on lines i6 to i9 as the bit selector 402. It passes the signal BC (which, as noted below, the logic processor makes a "one" only when the selected bit of the selected word must be inverted) as a 0 signal on that one of its sixteen output lines (carrying the signal H) which corresponds to the selected bit location. All other output lines from the control 404 carrying the signal H remain at the 1 level, —so if the signal BC is a 1, the signal ANS' becomes the same as the originally selected word except for inversion of the selected bit therein.

The signal ANS' may then be stored back into memory at the same address from which the originally selected word was taken, with the result that the newly stored word has one bit changed or unchanged, as necessary, to accomplish the "bit manipulation" instruction SV, IV, ST, or RS.

5. Exemplary Instructions and Their Codes

In the more specific and detailed explanation which follows, reference will be made to a limited number of eight arithmetic or conventional instructions, and to nine special logic instructions. To understand the overall operation of the entire computer system, it is necessary that the specific machine language codes for these respective instructions be concretely specified by way of example. Of course, a much larger number and variety of arithmetic or other conventional instructions may be formulated and accommodated by a full-scale, commercially manufactured computer, and different instruction codes may be adopted by following the rationale of the specific, simple and limited number of examples here given.

A. Ordinary Instructions

The first eight lines of Table II list the limited number (8) of conventional instructions which have been chosen for purposes of illustration, and give the specific five bit codes (in bit places b11 through b15 of a basic instruction code, as set out in the first line of Table I) which uniquely identify each. Brief explanation of these ordinary instructions follows:

|  | b15 to b11 |
| --- | --- |
| LDA | 00001: Load a data word from the address specified at bits b0 to b9 into the accumulator. |

-continued

| | b15 to b11 | |
|---|---|---|
| ADD | 00011: | Add a numerical data word from the address specified at bits b0 to b9 to the number then signaled in the accumulator, and put the new result into the accumulator. |
| SUB | 00101: | Subtract a numerical data word from the address specified at bits b0 to b9 from the number signaled in the accumulator, and put the new result into the accumulator. |
| STA | 00010: | Take the word ANS signaled by the accumulator and "store" it into the memory at the address specified by signals in bits b0 to b9. |
| CLA | 00100: | Clear the accumulator by setting all bit signals in ANS to binary 0. |
| SAR | 00110: | Shift the accumulator right one place, i.e., move each binary signal in the sixteen bit signal ANS one place to the right so that the number represented by ANS is, in effect, multiplied by two. |
| SAL | 01000. | Shift the accumulator left, i.e., shift each binary signal within the sixteen locations of the accumulator one place to the left so that the number represented by the signal ANS is in effect divided by two. |
| JMP | 01010: | Jump in the program sequence from the instruction word then addressed by the program counter to a memory address which is specified by the binary bit values in address places b0 through b9 (by presetting the program counter). |

In may be noted that some instructions (LDA, ADD, SUB) require that an operand be pulled from memory and fed into the arithmetic input register 102. Others of these instructions (STA, CLA, SAR, SAL, JMP) do not require any operand from memory. The code set here chosen as a simple example distinguishes between these two types of instructions by the presence or the absence of a 1 in the b11 place of any instruction word (and a corresponding one signal on line i11 after the instruction word has been fetched into the instruction-address register 202).

In each of these ordinary or basic instructions, location b10 is reserved for indicating whether the instruction is to be performed "unconditionally" or "conditionally". Any such word when brought into the register 202 will produce a binary "1" signal on line i10 when that instruction is to be executed only if the then-signaled logic signal LA is a 1. The signal on line i10 is directly decoded, as noted below, and is used to determine whether execution of the instruction should proceed or should be aborted. Execution will always proceed if the U/C signal on line i10 is a 0 (specifying "unconditional"). Execution will proceed if the U/C signal is a 1 and LA signal is a 1, but will be aborted if the U/C signal is a 1 but the LA signal is a 0 ($\overline{LA}=1$).

B. Special Instructions

There are nine special instructions characterized by some operation to be performed upon a selected bit of a selected word. They all involve one of the word formats labeled "logic process instructions" and "logic bit manipulation" in Table I. But the specific five bit instruction codes (in bit places b11 to b15) which respectively and uniquely identify these nine special instructions are tabulated in Table II and briefly summarized below (with reference to the signals appearing on lines i11 to i15 after fetching of the instruction word into the register 202).

| | b15 to b11 | |
|---|---|---|
| IF | 00111: | "If" a selected bit (identified by BBBB on lines i6–i9) of a selected word at the memory address (identified by AAAAAA on lines i0 to i5), when taken in true or complement form specified by a 0 or 1 on line i10), is a 1 —then skip or omit the next step of the program (by incrementing the program counter). |
| LD | 01011: | Load the selected bit of the selected word into the logic accumulator to make the signal LA agree therewith. The selected word is specified by adresss signals on lines i0 through i5; the selected bit location is identified by binary signals on lines i6 through i9. |
| AN | 01001: | Bring the selected bit (identified by signals on i6 through i9) of the selected word (having the memory address signaled on lines i0 through i5) to the logic processor, treat it by way of a logic AND function with the then-existing LA signal, and set the logic answer signal LA to the result of such "anding" operation. |
| OR | 01111: | Feed the selected bit (specified on lines i6 through i9) of the selected word (from memory address identified on lines i0 through i5) to the logic processor, and cause the logic processor to treat it by way of a logical OR function with the then-existing LA signal, driving the logic answer LA to the result of such OR operation. |
| XR | 01101: | Feed the selected bit (identified on lines i6 through i9) of the selected word (from memory location identified on lines i0 through i5) to the logic processor and cause the latter to treat it by way of a logic "exclusive OR" function with the then-existing LA signal; and drive the logic |

| | b15 to b11 | |
|---|---|---|
| | | answer LA to the result of such operation. |
| SV | 100001: | Store the then-existing binary value of the logic answer LA into memory at the selected bit location (identified by signals on lines b6 through b9) at the selected memory location (identified by signals on lines b0 through b5). |
| IV | 10011: | Invert (complement) the selected bit (identified on lines i6 through i9) of a selected word in memory (at the address identified on lines i0 through i5). |
| ST | 11011: | Set the selected bit (identified on lines i6 through i9) of a selected word (in memory address identified on lines i0 through i5) to the 1 state. |
| RS | 10111: | Reset the selected bit (identified on lines i6 through i9) of a selected word (in memory address identified on lines i0 through i5) to the 0 state. |

In the four "logic processing" instruction words LD, AN, OR, XR, the binary character in bit place b10 (signaled on register line i10) is reserved to designate whether the selected bit is to be treated in its true or complement (T/C) form. That is, a binary 0 on line i10 will cause the logic processor to treat the selected bit as a 0 or 1 if the LB signal is a 0 or 1; but a binary 1 signaled on line i10 will cause the logic processor to treat the signal LB as if it were a 1 or 0 when it is in fact a 0 or 1.

On the other hand, in each of the "logic bit manipulation" instruction words IF, SV, IV, ST, RS, the signal in bit location b10 (appearing on line i10) is reserved to indicate whether the instructions should be performed "unconditionally" or "conditionally" (U/C). The operation is the same as that noted above with respect to an ordinary logic instruction, i.e., any instruction word will be ignored and its execution aborted if the U/C signal on line i10 is a one and the logic answer LA is then 0.

It is to be observed from Tables I and II that the special logic instructions fall into two categories each embracing four specific instructions. That is, the instructions LD, AN, OR, XR are deemed as "logic processing" operations since they may result in changing the logic processor answer signal LA. The second category may be designated "bit manipulation" since these instructions (SV, IV, ST, RS) do not involve any changing of the logic answer LA but, on the contrary, result in the possible changing of a selected bit within a selected word of memory. The first category of logic instructions may be recognized in Table II by the presence of a 1 signal on lines i14 and i11 after any of those instruction words has been brought into the register 202. The second category may be recognized, and distinguished from all other instructions, by the presence of a binary "1" signal on line i15 after any such logic instruction word has been brought into the register 202. As will be noted below, these two categories of logic instructions are treated differently in activating the microprogram memory 220, but all logic instructions within a given category activate the microprogram memory in the same fashion.

Any of the nine special logic instruction words will utilize the signals in bit places b6 through b9 for selected bit identification, and these bit places are therefore unavailable to specify a memory address. This means that the selected words which can be pulled from memory in response to any special logic instruction must appear in memory locations which have numerical address values of 0 through 63. This limitation is not severe, however, since that is an adequate number of sixteen bit data words which will be necessary to accommodate a large number of special logic operations. Moreover, this limitation may be avoided by expanding the bit length or words, or by using some of the first sixty-three memory locations as scratch pads into which other words are brought from higher memory addresses by software programming prior to using that word in a logic operation.

6. Details of System Memory

Figure 11:
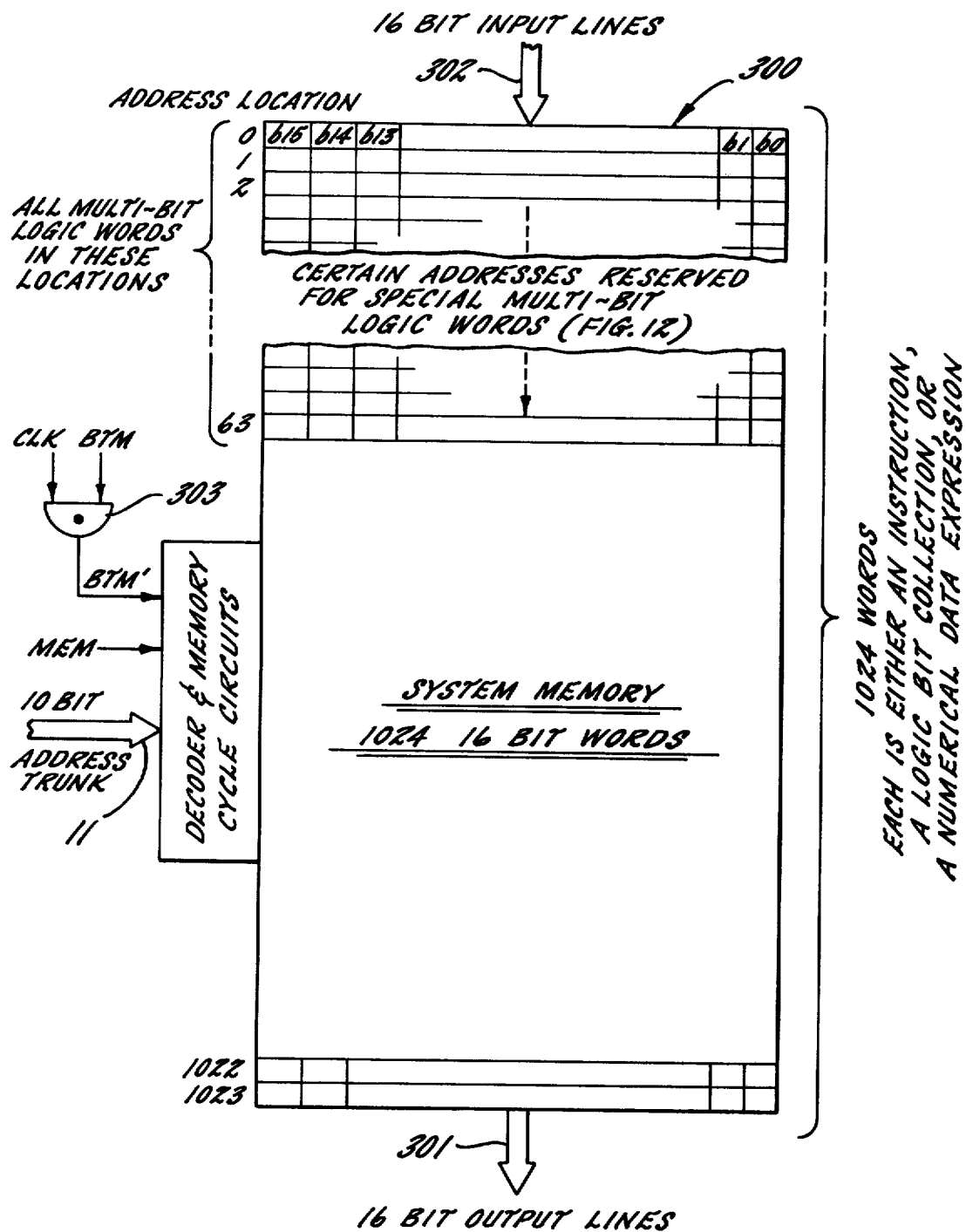
FIG. 11 is a functional block diagram illustration of an exemplary system memory which is more generally shown in FIG. 2b.
Figure 12:
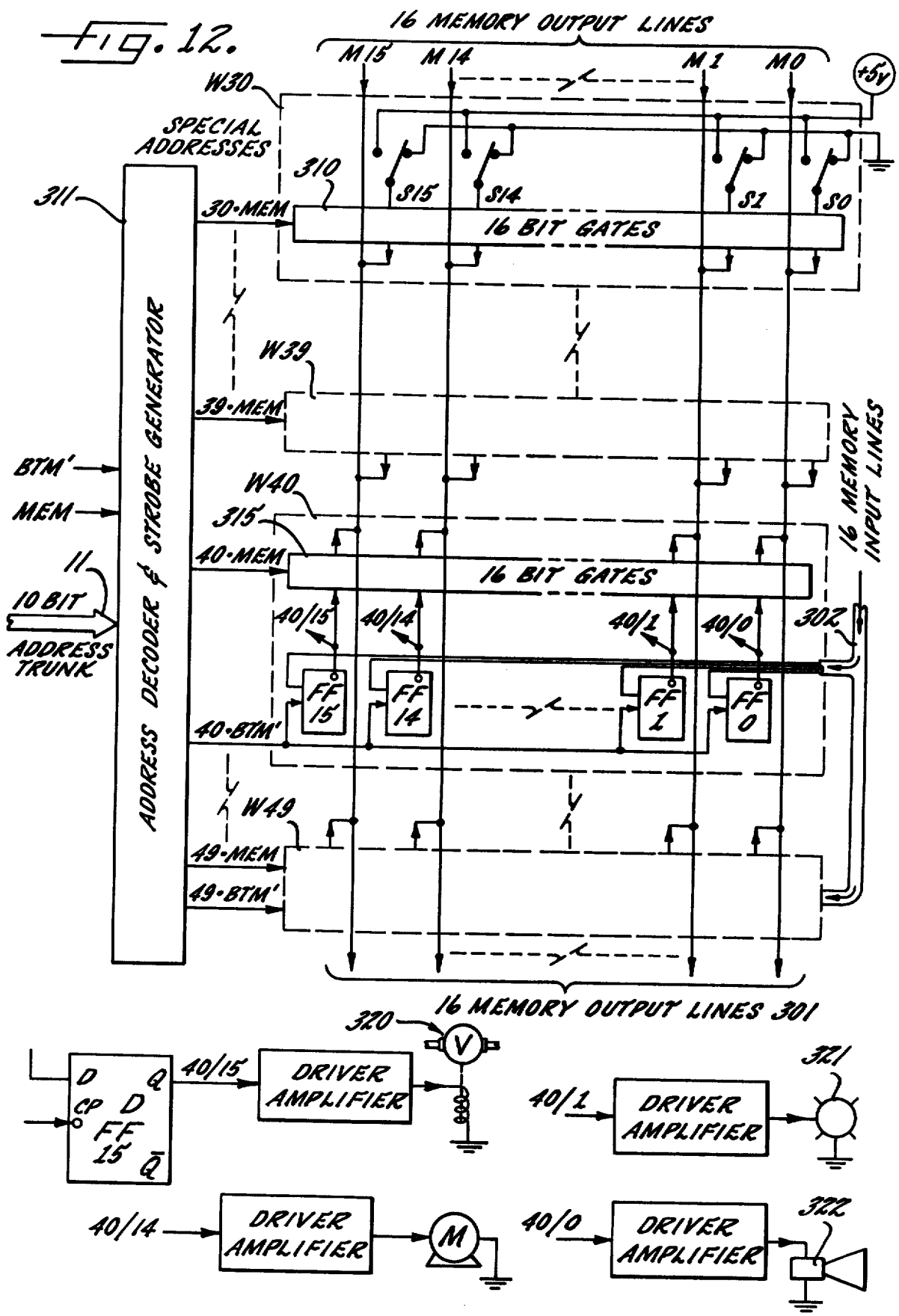
FIG. 12 is a fragmentary block diagram illustrating how certain words of the system memory are formed by external hardware components such as switches and flip-flops, each such hardware component constituting a logic bit which can be sensed or a logic bit which can be both sensed and set to one or the other of two possible states.

Referring to FIGS. 11 and 12, the system memory is there diagrammatically shown as comprising a relatively small capacity memory which is nevertheless an example sufficient for purposes of discussion. It contains 1024 words each having sixteen binary bit locations b0 through b15. The address locations are thus representable of decimal values of 0 through 1023—and the signaling of any such decimal value in binary notation on the ten bit address trunk "accesses" the corresponding word location through conventional decoder circuits (not shown). The sixteen input lines 302 lead into the sixteen bits of every word (except logic "read only" words discussed below) and the sixteen output lines 301 lead from the corresponding bits of every word.

Basic instruction words and special logic instruction words, with the formats and meanings described above, may be placed at any of the addresses of the memory, although a software program will usually organize the successive instructions of an overall program generally into sequential addresses. Data words may also be located at any of the memory addresses although they generally will be placed in the higher numbered addresses. Those particular words containing single bits to be sensed or to be changed by special single bit logic instructions will be placed within memory addresses 0 to 63, due to the fact that the six place operand address numbers in places b0 to b5 of any special instruction word containing a bit identification code BBBB (Table I) can represent decimal numbers only between 0 and 63. This limitation is created only because of the simplified exemplary embodiment here described, and it can be overcome in various ways such as building the system with known address indexing capability.

As is well known, when any word is "addressed" by signals on trunk 11, and when the "write" signal BTM" is applied to the memory decoder and control circuits, the signals then on the bus 10 (and input lines 302) are accepted into and stored in the corresponding bit places of that memory location. Conversely, when any word is "addressed" by signals on the trunk 11 and a "read" signal MEM is applied, the stored value of the bits in the addressed word appear on the output lines 301 and are routed through the gate Gmr to the bus 10 (FIG. 2b).

To provide full programmable controller capability, storage units for certain address locations of the system memory 300 may be formed by external devices rather than magnetic cores. As indicated in FIGS. 11 and 12, and as an arbitrary example, address locations 30–39 and 40–49 are designated and used for words which each contain sixteen single bits of bistate signals Q0 through Q15 (see Table I) representing on-off or binary logic data. As an illustration, word addresses 30–39 are each formed by sixteen "read only" bistate devices such as single pole, double-throw switches. These switches may be associated with some external machine to indicate the status of various conditions therein and may, for example, be mechanical limit switches, pressure-sensitive switches or push-button switches. On the other hand, addresses 40–49 are formed by sixteen single bit "read-write" bistate devices such as flip-flops, each of which may be set or reset by writing binary signals from the computer system and each of which may turn on or off an associated device such as a motor, an indicator light or a solenoid valve. The state of such flip-flops and thus of the devices which they control may be sensed at any time by "reading" the output voltage which the flip-flop produces. The conventional core portion of memory 300 (FIG. 11) is here assumed to have no core locations 30 through 49, so that address signals 30–49 produce no core response but instead activate (for reading or writing) the memory locations 30–49 as constructed according to FIG. 12.

Referring to FIG. 12, the external devices for words W30–W39 for each of memory address locations 30–39 are identical. Referring to the apparatus for word W30, there are sixteen external switches S0–S15 having their movable wipers coupled through a normally closed sixteen bit gate 310 to the respective memory address output lines MO0–MO15. When in the normal state (deactuated as shown) each switch connects to ground and provides a binary 0 signal. When actuated, each switch connects to a +5 volt source and provides a binary 1 signal. The "word" of zero's and one's so formed is placed on the output lines MO0–MO15 when the "address 30" is decoded and a "read" signal MEM is received by address decoder circuits 311. Such signals are then transmitted through the gate Gmr to bus 10 and may be transferred into the register 102 or 202 (FIGS. 2a and 2b).

The rapidity with which the switches in any or all of the words 30–39 may be "looked at" (for example, every twenty milliseconds) by appropriate programming yields the effect of continuous sensing of switch states. Obviously, the states of these switches cannot be changed by "writing" signals from the bus 10; their open or closed status depends entirely upon external conditions. And, of course, the 160 switches incorporated into the memory system according to the present example can be expanded to a much greater quantity by forming even more memory words with structure like that here described for the word W30.

The external hardware for each of memory locations W40–W49 shown in FIG. 12 is substantially identical. The organization of the structure for word W40 will apply to all. As shown, the "bit places" of word W40 are created by sixteen D type flip-flops $FF_0$ through $FF_{15}$. The sixteen memory input lines 302 connect respectively to the D inputs of these flip-flops, while the clock pulse or triggering inputs are all connected to a decoder output line labeled 40·BTM'. Thus, when word 40 is addressed by signals on trunk 11 and a BTM' "write" signal is received, each of the sixteen flip-flops is driven to that state (set or reset) corresponding to the binary signal on the corresponding one of the memory input lines. When set, each flip-flop produces a binary 1 signal, and when reset each flip-flop produces a binary 0 signal. These signals are connected via output terminals 40/0 through 40/15 to external devices as noted below. But they are also applied to the respective inputs of a sixteen bit gate array 315 which has its respective output coupled to the memory output lines. The gate array 315 is normally disabled but when the decoder circuits 311 receive signals on trunk 11 designating address 40 and a "read" signal MEM, the gates 315 are enabled by a signal 40·MEM so that the corresponding binary signals are transmitted to the memory output lines 301 from which they are transmitted to the system bus 10. Thus, the sixteen flip-flops within the structure constituting memory word W40 may not only be set or reset to particular states by signals taken (written) from the system bus, they may also supply signals read to the system bus indicating their respective states for use in Boolean logic processing.

As a few examples of the manner in which various external devices may be controlled according to the state of the bit signals stored in memory word 40, FIG. 12 shows the D type flip-flop $FF_{15}$ having its Q output terminal 40/15 coupled to a driver amplifier to energize the solenoid of an on-off electric valve 320 when that flip-flop is set or reset. In similar fashion, the output line 40/14 is connected through a driver amplifier to turn on or off a motor M according to the state of the flip-flop $FF_{14}$. As another example, output line 40/1 is coupled through a driver amplifier to turn a signal light 321 on or off when flip-flop $FF_1$ is set or rest. As a final example, the output conductor 40/0 from flip-flop $FF_0$ is shown as acting through a driver amplifier to control the energization of an alarm annunciator 322 such as a siren or bell.

Insofar as the computer system itself is concerned, it neither knows nor cares that some words within the system memory 300 are constituted conventionally by magnetic cores while other words are constituted by switches, and still other words are formed by flip-flops which may control the turning on or off of external devices. Yet, the computer system, in a fashion to be explained more fully below, may process signals which designate the states of external switches (such as those forming the word W30); it may sense the states of flip-flops (such as those forming the word W40) and the devices controlled thereby; and it may selectively change the state of any such flip-flop, so as to turn an associated electric device on or off, by "writing" a one or a zero into a particular bit place of a word such as that at address 40.

7. Details of Direct Decoding

Figure 4:
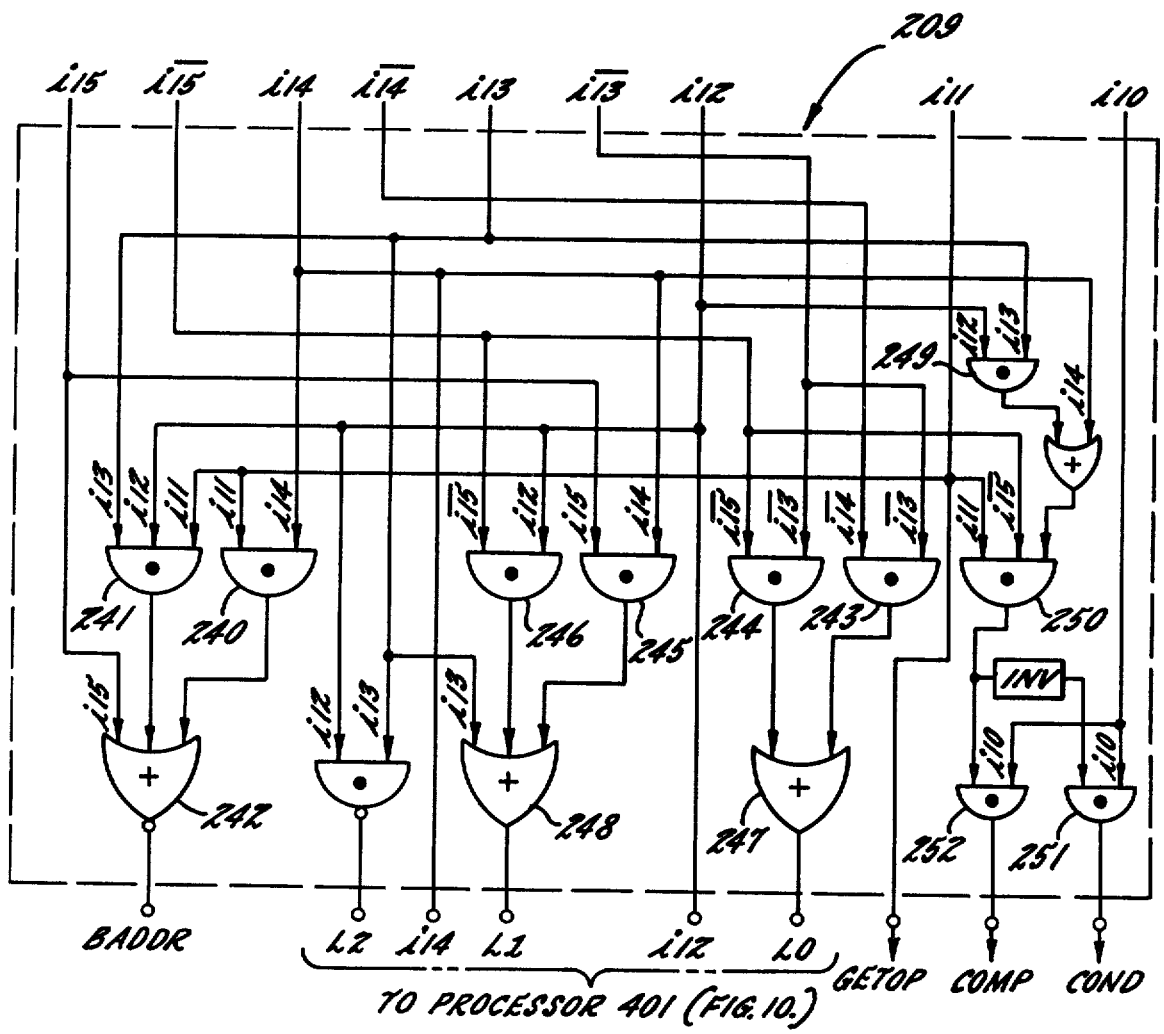

The direct decode circuit 209 (FIG. 2a) is shown in detail by FIG. 4. Its purpose is to provide coded operation signals L0, L1, L2, i12, i14 and COMP to the logic processor 401 and to furnish the GETOP and COND signals when required. It recognizes whether an instruction word in the instruction-address register calls for a basic or a special logic operation, and in the latter event, it makes a signal BADDR (which is normally 1) revert to a 0 level, thereby causing gates 206 to mask off the bit signals fed via lines i6 to i9 to input OA of the MUX gate 205.

AND circuits 240, 241 and NOR circuit 242 create the signal BADDR from inputs on lines i15, i14, i13, i12, i11. From the instruction codes set shown in Column (c) of Table II, it will be seen that if the instruction in register 202 calls for "bit manipulation" (SV, IV, ST or RS), the signal at i15 causes NOR 242 to make BADDR a 0. If the instruction calls for logic processing (LD, AN, OR, XR), the signals at i14 and i11 make the output of AND 240 a 1, and thus make BADDR a 0. If the instruction is IF, then AND 241 produces a 1 output and makes BADDR a 0. For any other than these nine "special" instructions (which contain bit-identifying information on lines i6 through i9), the signal BADDR will be a 1 and the gates 206 (FIG. 26) will be qualified so that a full word address from lines i0 to i9 will be transmitted to the input OA of MUX gate 205.

Column (d) in Table II lists the values which appear on the operation code lines L0, L1, L2, i12, i14 for each of the "logic process" instructions LD, AN, OR, XR and the "bit manipulation" instructions SV, IV, ST and RS. A moment's study will confirm that AND circuits 243, 244, 245, 246 with OR circuits 247, 248 (FIG. 4) will produce the operation code signals L0, L1, L2 (with straight feedthrough of signals on i12 and i14) according to Table II. As will become apparent, the signals L0, L1, L2 have no effect for the first time instructions listed in Table II and the spaces representing such signals are thus left blank in the first nine lines of that table.

As noted previously, any instruction which contains a 1 in bit place b11, and thus produces on line i11 a 1 level signal, involves the use of an operand from memory. Thus FIG. 4 indicates that the GETOP signal is simply the same as the i11 signal.

For the instructions LD, AN, OR, XR and IF listed in Table II, the signal on line i10 designates that the selected bit is to be treated in a true or complement T/C sense. For all other instructions, it denotes that the function is to be unconditionally performed (if bit b10 is a 0) or conditionally performed (if the b10 signal is a 1) only if the logic Answer signal LA is then a 1. This involves producing a COMP signal only if the i10 signal is a 1 in a LD, AN, OR or XR instruction, and producing a COND signal only if i10 is a 1 in any other instruction. As shown in FIG. 4, AND circuits 249, 250, 251, 252 with OR circuit 253 serve this purpose. Inspection of the instruction code sets in Table II will confirm that the output of AND circuit 250 will be a 1 when any of the instructions LD, AN, OR, XR or IF is in the register 202. The first four such instructions make i14=i11=$\overline{i15}$=1; the IF instruction makes i13=i12 =i11 =$\overline{i15}$=1. In either case, if the i10 lines carries a one signal, the COMP signal is a 1. But if the output of AND circuit 250 is a 0 (because there is an instruction other than the five named above) and if line i10 carries a 1, AND circuit 251 will make the COND signal a 1.

8. Details of the Phase Sequence Generator and Master Clock

To time the successive elemental operations of the computer system, the master clock 214 (FIGS. 2a and 5) comprises a conventional crystal controlled clock pulse oscillator 260 operating at a selected frequency, e.g., 2.0 MHz. It drives a one-shot multivibrator 261 to produce timed pulses CLK and $\overline{CLK}$ which are, for example, 100 nanoseconds wide and spaced apart in time by 500 nanoseconds. The CLK and $\overline{CLK}$ timing signals are represented at 262 and 263 in FIGS. 6 and 7. The CLK signal is used to time the operation of various gates and the presetting of various registers throughout the system, as noted below.

The phase sequence generator 212 times the elemental operations which are carried out after each successive instruction is brought into the instruction register 202. For those instructions which require obtaining and utilizing an operand word, the phase sequence generator measures off three elemental time intervals, here called Phase Zero, Phase Two and Phase Three. During Phase Zero, the next instruction word in a software program is fetched from a memory address, signaled by the program counter 226, into the instruction-address register 202; during Phase Two, the operand required is obtained from the memory address signaled by the active instruction word and fed to the arithmetic input register 102; and during Phase Three, the instructed operations are executed.

By contrast, some instructions do not require feeding of an operand from memory into the arithmetic input register 102. In these circumstances, the phase sequence generator simply measures off a Phase Zero interval and then a Phase Three interval, skipping a Phase Two period.

Figure 5:
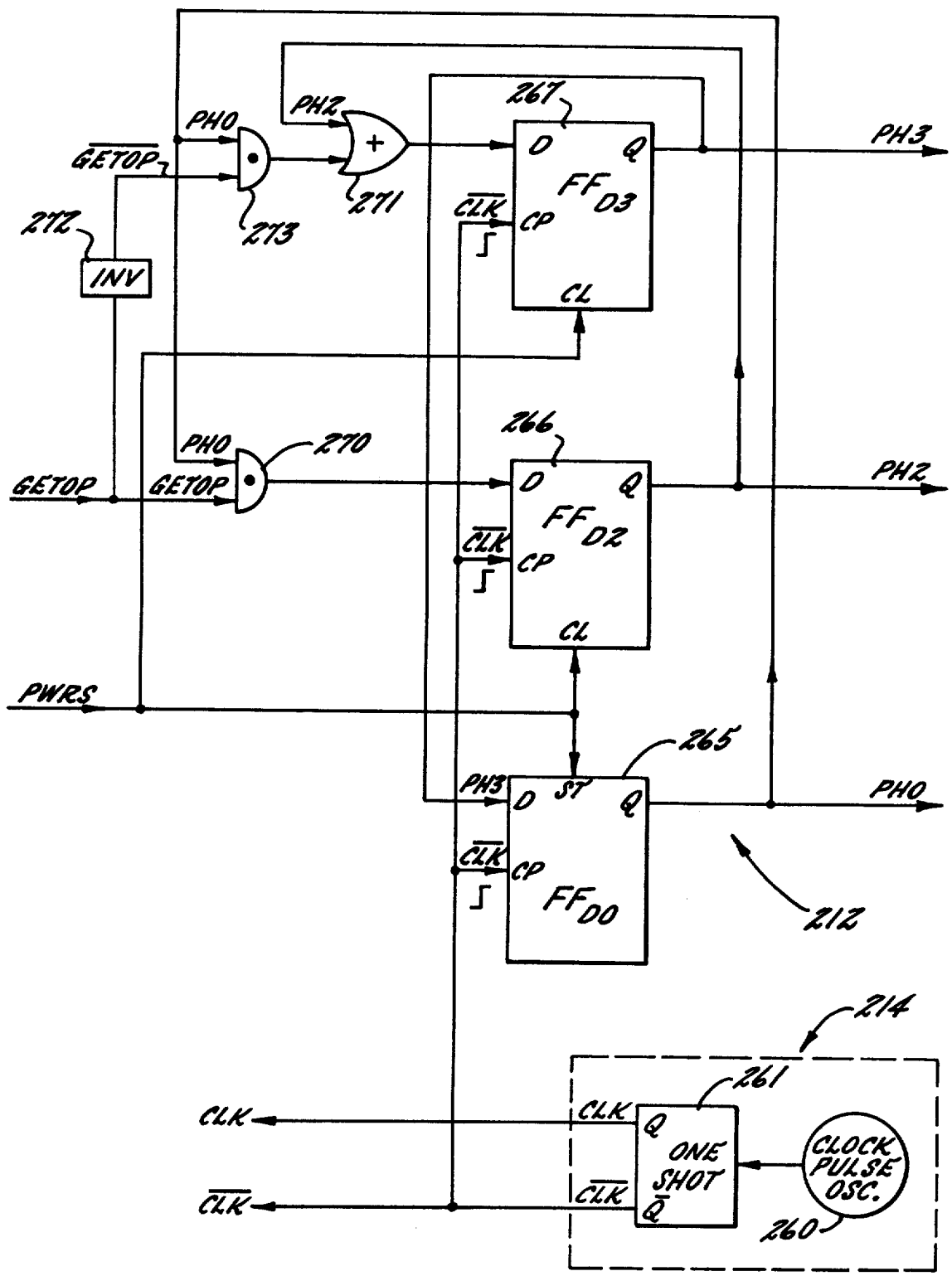

As shown in FIG. 5, the sequence generator 212 may be a three-state counter constructed from three "D type" flip-flops 265, 266, 267. uch flip-flops are per se well known in the art, and it is assumed here that each such flip-flop switches or triggers to a state which corresponds to the level of the signal applied to its D input terminal at the instant when a positive-going voltage transition is fed to its "clock pulse" input terminal CP. In FIG. 5, each of the three flip-flops receives $\overline{CLK}$ pulses on its clock pulse input CP, while its D input or control terminal receives a signal to control the setting or resetting thereof according to the existence of other signals.

Assuming first that the signal GETOP from direct decoder 209 (FIG. 4) is present, that flip-flop 265 is initially set and that flip-flops 266, 267 are both reset, it will be seen that the output signal PH0 is at a 1 level while the signals PH2 and PH3 are at 0 levels. When the trailing edge of the next $\overline{CLK}$ pulse arrives at instant $t_2$ (FIG. 6), an AND circuit 270 is qualifying the flip-flop 266 by feeding a 1 signal to its D input (because GETOP and PH0 are both at a 1 level). Thus, at instant $t_2$ when the $\overline{CLK}$ pulse has its positive-going transition, flip-flop 265 will be reset and flip-flop 266 will be set. The output signal PH2 is now at a 1 level (between instants $t_2$ and $t_3$ shown in FIG. 6). In this latter "Phase Two" state, the signal PH2 passes through an OR circuit 271 to qualify the flip-flop 267, whereas the input signal to the D terminal of the flip-flop 266 is now at a 0 level. Thus, when the next $\overline{CLK}$ pulse ends at instant $t_4$ (FIG. 6), the flip-flop 266 is reset but the flip-flop 267 is set. This makes the output signal PH3 reside at a 1 level. It also results in a qualifying 1 level signal to the D terminal of flip-flop 265 and removes the qualifying signal to the D terminal of the flip-flop 267. Therefore, on the next succeeding $\overline{CLK}$ pulse, flip-flop 267 is reset while flip-flop 265 is set—so that the signal PH0 now resides at a 1 level. This three-state sequence of PH0, PH2, PH3 will continue indefinitely so long as the GETOP signal remains at a 1 level.

By contrast, however, when the signal GETOP is at a 0 level (and this occurs whenever any instruction not requiring the use of an operand from memory is present in the instruction register 202), the gate 270 in FIG. 5 is disabled, but an inverter 272 supplies a 1 level $\overline{GETOP}$ signal to the input of another AND circuit 273 which can produce a 1 level output signal when further qualified with the PH0 signal. Thus, with GETOP at a 0 level and $\overline{\text{GETOP}}$ at a "1" level, it may be assumed that the sequence generator 212 is initially in a state with flip-flop 265 set and flip-flops 266, 267 reset. Now, the PH0 signal is transmitted through gate 270 and OR circuit 271 to qualify flip-flop 267—so that when the next trailing edge of a $\overline{\text{CLK}}$ pulse appears at instant $t_2$ (FIG. 7), the flip-flop 265 is reset but the flip-flop 267 is set. Thus, the signal PH0 disappears and the signal PH3 appears. In these circumstances, the flip-flop 265 is qualified by the PH3 signal applied to its D terminal, but the flip-flop 267 is disqualified, i.e., a 0 signal appears on its D terminal. Thus, when the next $\overline{\text{CLK}}$ pulse arrives, flip-flop 267 is reset but flip-flop 265 is set. As indicated by the PH0, PH2, PH3 waveforms in FIG. 7, in this mode of operation the PH0 and PH3 signals appear alternately in response to successive clock pulses, and the PH2 signal simply remains at a 0 level.

In summary, when an instruction is decoded to produce a GETOP signal, the phase sequence generator in response to successive clock pulses produces signals PH0, PH2, PH3 in sequence; whereas, when an instruction is decoded which does not require the use of an operand, and the signal GETOP is not present, the phase sequence generator simply produces PH0, PH3 signals in sequence in response to successive clock pulses. Each "phase" is, merely as an example, one microsecond in duration, and the CLK pulse which appears just prior to the end of each phase may be 200 nanoseconds in width.

To be certain that the phase sequence generator of FIG. 5 always starts in the proper state when power is first applied to the computer system, a power start pulse PWRS is generated (by means not shown) when power is first turned on. As illustrated in FIG. 5, this pulse PWRS is routed to the setting input ST of flip-flop 265 and into the clearing inputs CL of flip-flops 266 and 267. Thus, when power is first applied the phase sequence generator 212 is initialized to its Phase Zero state with the signal PH0 at a 1 level and the signals PH2 and PH3 at 0 levels.

9. Details of Mapper ROM and Input Signals to Microprogram ROM

Figure 8:
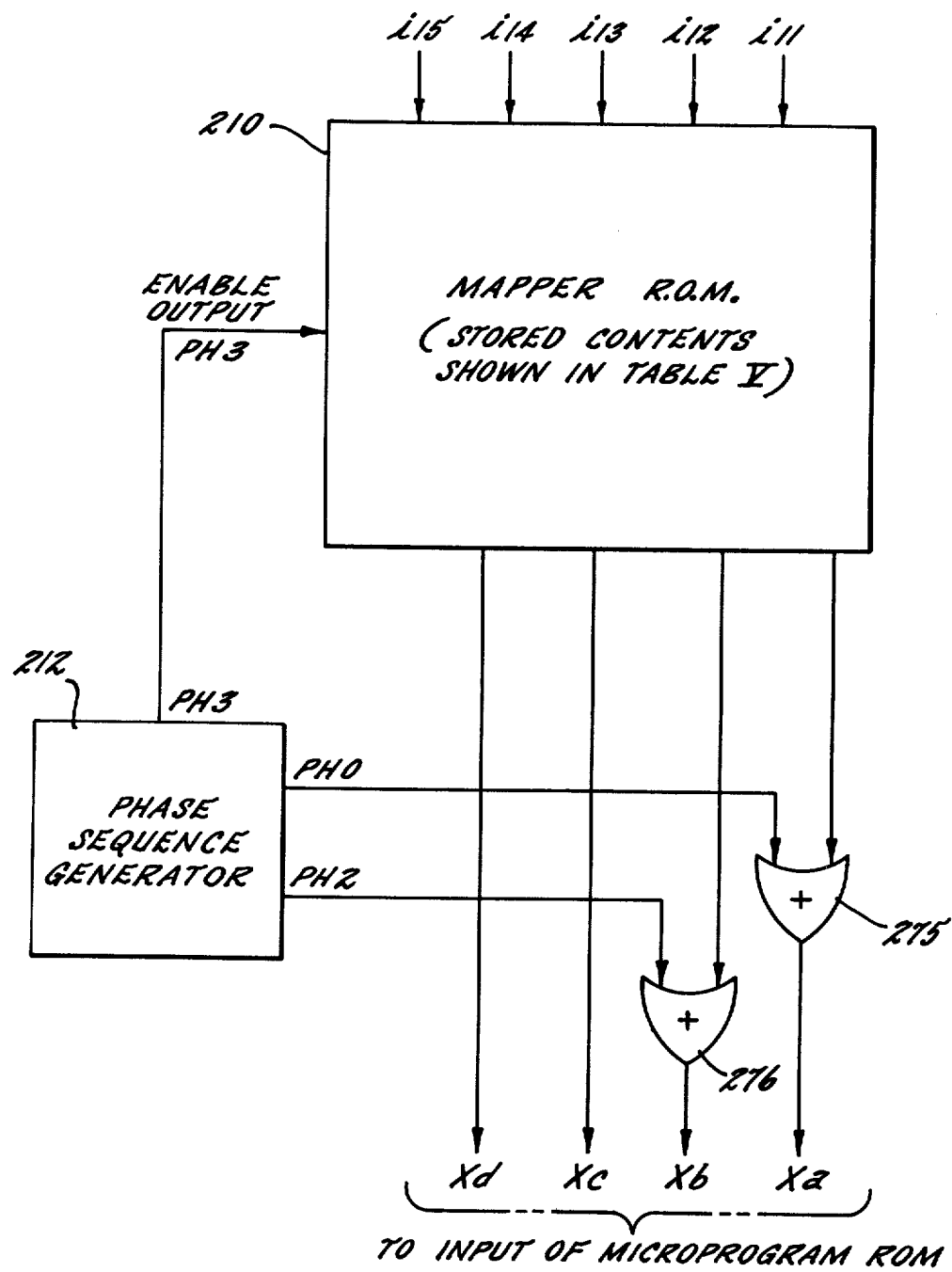
FIG. 8 is a diagram showing the interconnections between the phase sequence generator and a mapper "read only memory" (ROM) for producing coded input signals to a microprogram ROM.

The mapper ROM 210 (FIG. 2a) is a convenient code converter. Although in the very simple system here described as an example it might not be required to employ a mapper ROM, in full-scale commercial systems accommodating a wide number of possible instructions, a mapper ROM with an address counter and adder will usually be employed. For purposes of the present case, however, it may be noted simply that the mapper ROM 200 receives instruction-representing signals on lines i11 through i15 from register 202 and, when enabled by a PH3 signal as shown in FIG. 8, supplies a particular corresponding four bit code to its output lines. Those four output lines all normally reside at the 0 level in the absence of an enabling PH3 signal. Because the mapper ROM 210 is constructed by "burning" matrix connections therein permanently according to well known practice, its structure is best described by Table V which in the last eleven lines shows the combinations of input signals on lines i11 to i15 which produce different combinations of coded output signals on lines Xa, Xb, Xc, Xd. Any of the "logic process" instructions for controlling LA (i.e., LD, AN, OR, XR, Table II) which produces 1 level signals on lines i11 and i14 causes the mapper ROM to produce a common output code 1100; likewise, any of the "bit manipulation" instructions SV, IV, ST, RS which, according to Table II produces 1 signals on lines i11 and i15, is decoded by the mapper ROM into a common output code 1101 on lines Xa through Xd.

As shown in FIG. 8, the phase sequence generator 212 supplies the signals PH0 and PH2 via OR circuits 275 and 276 directly to the lines Xa and Xb. Thus, as indicated in Table V when the Phase Zero or Phase Two signals exist, a four-bit code of 0001 or 0010 is fed as an input to the microprogram ROM 220 to call for a "fetch" or a "get operand" operation. Then, during any Phase Three which follows, the input to the microprogram ROM 220 is determined by the mapper ROM 200, that input to the microprogram ROM on lines Xa, Xb, Xc, Xd being shown in Column (e) of Table II.

10. Details of the Microprogramming ROM

Figure 9:
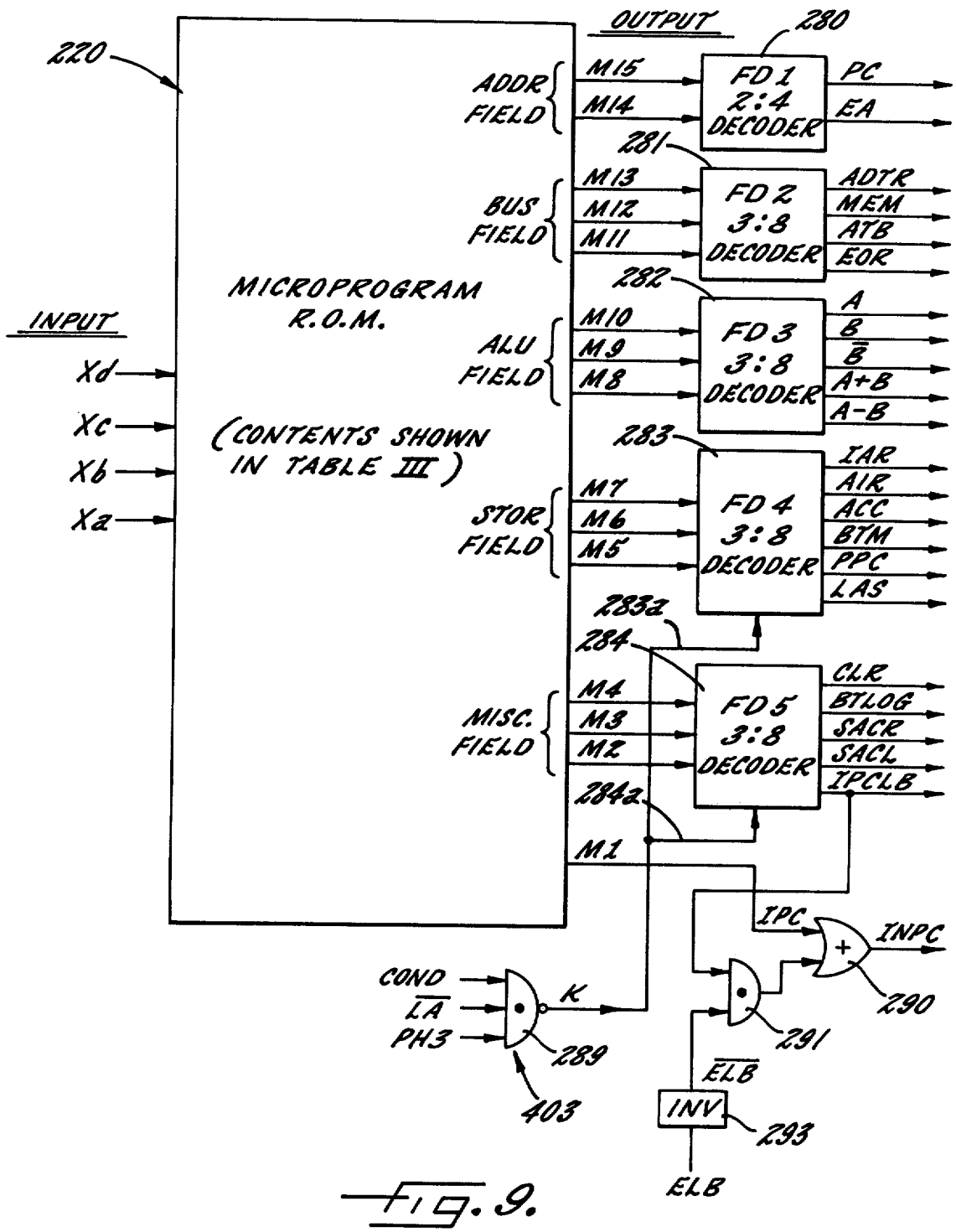
FIG. 9 is a block diagram of a microprogram ROM and associated decoders for producing various combinations of control signals at different times in response to the handling of different instructions.

FIG. 9 illustrates in more detail the microprogram ROM 220 of FIG. 2b. The construction of the microprogram memory itself is well known to those skilled in the art, involving permanent storage of connections in a matrix. Therefore, it only need be noted that the microprogram ROM receives various coded input signals on lines Xa, Xb, Xc, Xd and produces particular corresponding combinations of signals on fifteen output lines here labeled M1 through M15. These output lines are segregated into or treated as different "fields", as labeled in FIG. 9. Generally speaking, lines M14 and M15 constitute an "address field" which by the code of signals appearing thereon designate the source from which signals are to be fed to the memory address trunk 11. Lines M11, M12, M13 constitute a "BUS field" and by the combination of signals thereon can represent any of eight possible specific signals which designate the source from which signals are to be fed to the system bus.

Similarly, lines M8, M9, M10 constitute the "ALU field" and the coded combination of signals thereon designates one of several possible operation commands which is to be supplied to the ALU in order to govern its operation for different instructions. Also, lines M5, M6, M7 constitute the "STORE field" and the combination of signals thereon represents the particular register or unit into which signals then appearing on the system bus 10 are to be stored. Lines M2, M3, M4 constitute a "miscellaneous field", and by the combination of signals thereon may call for one of various miscellaneous operations to be effected. Finally, output line M1 is a single line field here labeled IPC; this line receives a 1 signal whenever the program counter is to be incremented.

As shown in both FIG. 2b and FIG. 9, the ADDR, BUS, ALU, STORE and MISC field outputs of the microprogram ROM are fed to field decoders 280 through 284. Each of these decoders is simply a conventional multiple input to single output matrix, and their organization and operation will be fully understood by those skilled in the art. The decoders 283 and 284 are, however, "gated" decoders and will produce an output signal on one of their output lines only when enabled by a 1 level signal applied to an enabling input 283a or 284a, respectively. Table III illustrates both the structural arrangements of the microprogram ROM 220 as well as its output signals on lines M1 through M15 for the various possible instruction codes which produce different coded input signals on lines Xa through Xd. Where blanks appear in Table III it is indicative of the fact that 0's appear on the microprogram output lines. Table VII shows the truth tables for the decoders 280 through 284 and indicates the single output signal produced on one of the output lines of each decoder for different combinations of input signals appearing on the input lines to those decoders. Table III taken with Table VII, therefore, makes the construction and operation of the microprogram ROM 220 and its associated decoders fully understandable to one skilled in the art.

It will be seen from Table III, line 1 that during any "fetch" operation represented by the code 0001 as an input to the microprogram ROM, the address field decoder 280 produces a PC output signal—designating that the address to be fed to the trunk 11 is to be taken from the program counter 226. Note that this signal enables MUX gate 205 in FIG. 2b to pass the counter output PA to the address trunk 11. On the other hand, during GETOP, JUMP, or "bit manipulation" operations the combination of input signals fed to the microprogram ROM 220 produces an EA output signal from the address field decoder 280—thereby enabling MUX gate 205 to transmit its input OA (taken from lines i0 to i9 but excluding lines i6 to i9 if gate 206 is disabled) to the trunk 11. The addressed location is thus determined by the address portion of an instruction word then in the instruction-address register 202.

It will be useful to briefly list the meanings of the symbols employed to designate the outputs of the several decoders shown in FIG. 9 and FIG. 2b. In the BUS field, ADTR means that the address trunk signals are to be applied to the bus; MEM means that the output of the memory is to be applied to the bus; ATB means the accumulator output is to be applied to the bus, and EOR means that the output ANS' of the sixteen bit exclusive OR array 106 is to be applied to the bus. Observe that the ADTR signal controls gate Gad; the MEM signal controls "reading" of the memory and also opens gate Gmr; the ATB signal controls gate Gatb; and the EOR signal controls gate Gr.

In the ALU field, the command signals A and B designate that the arithmetic logic unit or ALU is to be conditioned such that it simply applies its input signals at A or B on its output lines at F. By contrast, the ALU command signal $\overline{B}$ designates that the ALU is to apply its input signals from the B input in complemented form at its output F. The command signals here designated A+B and A−B condition the ALU so that its output F becomes the sum or the difference of the numerical binary signals A and B applied to its two inputs. These signals from ALU decoder 282 are fed directly to the correspondingly labeled command inputs of the ALU (FIG. 2a).

In the STORE field, the signals IAR and AIR respectively designate that signals then appearing on the bus are to be stored into the instruction address register 202 or the arithmetic input register 102, respectively. They are coupled to AND circuits 203 and 101, respectively. The signal ACC designates that the output F from the ALU is to be stored into the accumulator 104; such signal is coupled to an AND circuit 103 in FIG. 2a. The signal BTM (FIG. 9) designates that the signals then appearing on the bus are to be stored into the main system memory 300; it is fed to an AND circuit 303 which produces the BTM' "write" signal when a timing CLK pulse occurs. The signal PPC designates that the signals then appearing on the bus are to be accepted into the program counter 226; it is applied to the AND circuit 231 which produces signal PPC' to cause presetting the counter to a number represented by those signals then on the bus. The signal LAS designates that the result of some logic processing operation is to be "stored" into a logic accumulator flip-flop to be described later in connection with FIG. 10.

In the miscellaneous field, the signal designated CLR, when it appears, causes the accumulator 104 (FIG. 2a) is to be cleared or set with its bits all at 0. The signal BTLOG designates that the logic processor is to be conditioned for a "bit manipulation" operation (this signal appearing in response to any of the instructions SV, IV, ST, RS). The signals SACR and SACL are fed directly to accumulator 104 and cause the contents then held within the accumulator to be shifted one place to the right or to the left. The signal IPCLB designates that the program counter is to be incremented if the selected "logic bit signal" then has a particular one of two possible states;—this signal being used to perform an IF instruction as described hereinafter.

In summary, the microprogram ROM 220 with its associated decoders 280–284 receives coded instruction signals on the inputs Xa through Xd during any particular phase. In response only one of each field decoder output lines will receive a 1 signal (although in many operations a given field decoder will produce no response at all). These control signals from the microprogram field decoders are routed to various locations in the system to control the application of signals to the memory address trunk and the system bus 10; they are also routed to the ALU to determine the particular function which it performs, and they are routed to various registers or gates in order to determine which of the several components receives for storage the signals then on the system bus.

It is to be noted again that the output from the store and miscellaneous field decoders 283, 284 is gated off if those decoders do not receive an enabling 1 level input on the respective terminals 283a and 284a. The purpose of this turning off of all store field and all miscellaneous field output signals is to abort the execution of arithmetic instructions if those instructions have been made "conditional" and if the condition required is unfulfilled. This subject will be explained more fully below. For the present it is sufficient to note that the condition control 403 (FIG. 2b) supplies a signal K to control inputs 283a and 284a. That device 403 is formed by a NAND circuit 289 (FIG. 9) having three input signals COND, $\overline{LA}$ and PH3. The output K of NAND circuit 289 normally resides at a 1 level. But if COND, $\overline{LA}$ and PH3 all simultaneously exist at a 1 level, then the output K reverts to a 0 level, and none of the output signals from the decoders 283 and 284 can exist.

FIG. 9 also shows the logic circuitry for producing a control signal labeled INPC which results in incrementing of the program counter. The microprogram signal IPC will pass through an OR circuit 290 to form the signal INPC; but the latter signal may also be created by an inverter 293 and an AND circuit 291 when the signal IPCLB and an "effective logic bit" signal ELB (formed from signal ELB in FIG. 10) are 1's. The signal INPC is routed to an AND circuit 227 associated with the program counter 226 in FIG. 2b. When it appears simultaneously with a CLK pulse, the output INC goes through a negative-going transition (at the trailing edge of the CLK pulse) to cause the counter 226 to count up (increment) one unit.

11. Details of the Logic Processor and Bit Manipulation Circuitry

As shown in FIG. 2a and noted above, the logic processor 401 receives a single bit input signal LB (selected from a sixteen bit word) which can have either a 0 or a 1 value. It receives "operation function" signals L2, L1, L0, COMP, i12, i14 from the direct decode circuitry 209 (FIG. 4). And it produces output signals ELB, LA, $\overline{LA}$ and BC according to the function which it is commanded to perform, correctly modifying the signal LA as each successive operation within a Boolean chain of steps is performed.

Figure 10:
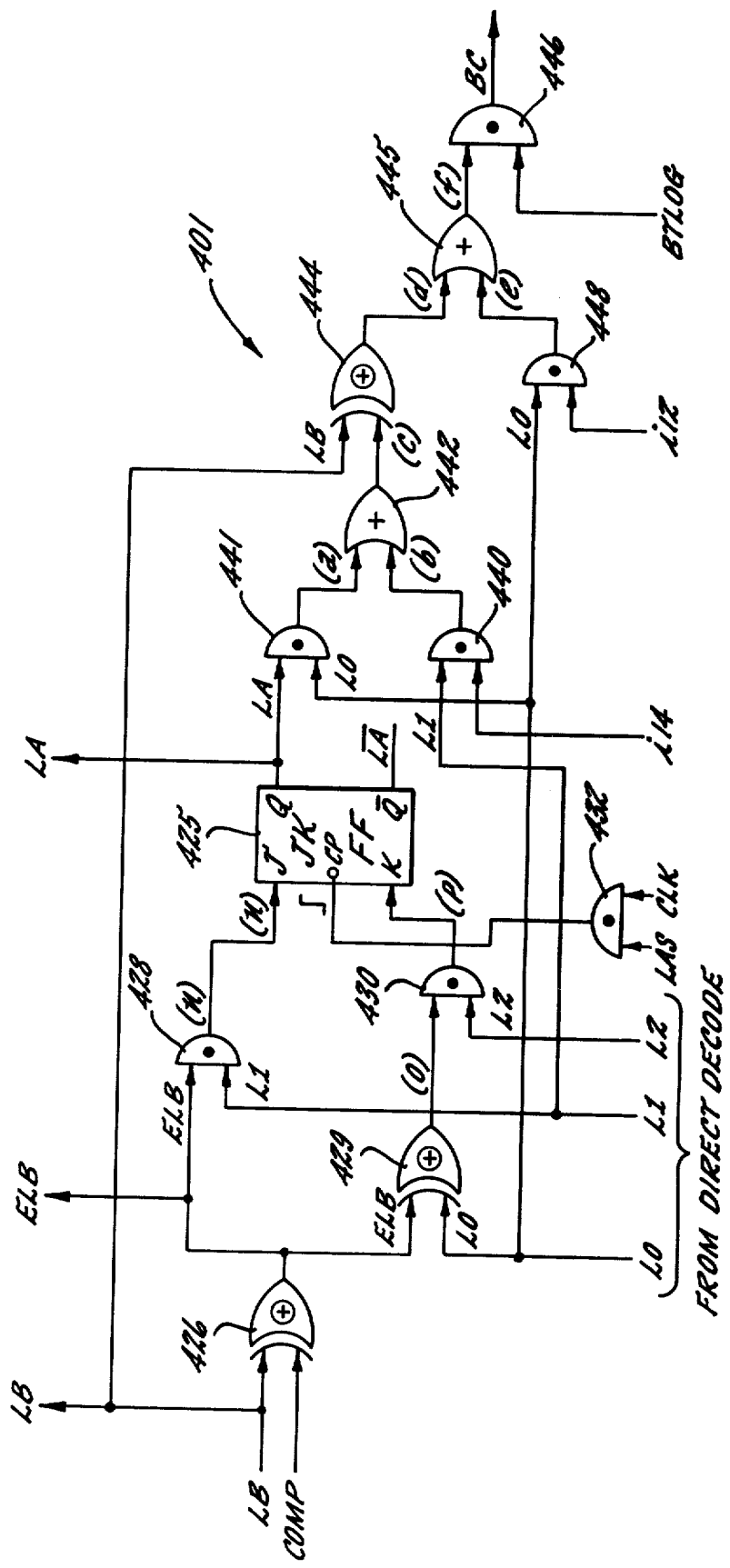

While different specific circuits may be utilized, the details of one suitable logic processor 401 are shown in FIG. 10. They will be treated first with regard to chained Boolean logic operations and thereafter with regard to bit manipulation and storage.

A JK type flip-flop 425 in FIG. 10 is utilized as a single bit logic accumulator. It is chosen for the following characteristics: If a binary 1 level voltage is applied to its J or its K input, then the flip-flop is driven to (or left in) its set or reset state respectively in response to a positive-going voltage transition applied to its clock input CP; if neither of the input terminals J or K receives a 1 level control voltage, no response is made to a triggering signal on the clock input CP; but if a 1 level voltage is applied to both terminals J and K when the positive-going voltage transition is applied to input CP, then the flip-flop toggles or reverses from its existing state (set or reset) to its opposite state (reset or set). Of course, when in the set state the flip-flop 425 makes its output signals LA and $\overline{LA}$ respectively 1 and 0; when in the reset state, it makes LA and $\overline{LA}$ respectively 0 and 1.

Consider now the operation if the logic function code signals L2, L1, L0 are 111—corresponding to a "load accumulator" logic instruction LD (Table VI). If the input signal LB is a 0 or 1 and the control signal COMP is 0, then the effective logic bit signal ELB produced by an exclusive OR circuit 426 will be 0 or 1. If ELB is 0, the output (n) of an AND circuit 428 will be 0, but the output (o) of an exclusive OR circuit 429 will be a 1 (recalling that L0 is a 1)—thus making the output (p) of AND circuit 430 a 1 and causing LA to be driven to (or left at) 0 when the flip-flop 425 is clocked. On the other hand, if ELB is a 1, signals (o) and (p) will be zero but signal (n) will be 1—causing signal LA to be driven to (or left at) the 1 level when flip-flop 425 is clocked. Thus, as indicated by the first line in Table VI, an LD instruction causes the selected bit input signal LB to be "loaded" into the accumulator flip-flop 425 to make the logic answer signal LA agree therewith.

Of course, the exclusive OR circuit 426 causes ELB to be the complement of LB if, and only if, the signal COMP is a 1. Thus, if COMP is a 1, the apparatus of FIG. 10 acts as if the input signal LB is the inverse of its actual value.

Assume next that the logic instruction word in register 202 calls for AN, so that the L2, L1, L0 code is 101. The signal LA in these circumstances is to be driven to (or left at) that level which is the answer of the logical AND function: $LA_n = LA_o \cdot LB$. If the flip-flop 425 is already in the 1 state, LA does not have to be changed if LB is a 1. Only if LB is a 0 is it necessary to clock flip-flop 425 to the reset state. Since the signals at L0 and L2 are both one, the signals (o) and (p) will be a 1 or 0 if ELB is a 1 or a 0, respectively. Thus, flip-flop 425 will be reset (or left reset) by a clock pulse if ELB is zero. The end result is that the new value of LA will always be a 1 or 0 if the AND function $LA_o \cdot LB$ (assuming COMP is zero) is or is not satisfied. This truism is reflected in the second line of Table VI for the various conditions which may exist (LB being 1 or 0 and COMP being 1 or 0).

If the logic instruction is OR, so that the L2, L1, L0 function code is 010 (Table VI), then signal $LA_o$ is to be kept so it becomes $LA_n$ if $LA_o$ is a 1. But if $LA_o$ is a 0, it is to be switched to a 1 only if ELB is a 1. The AND circuit 428 will be qualified to make signal (n) a 1 in the latter case. And in any case, AND circuit 420 will be disqualified so flip-flop 425 cannot be reset. Clearly, therefore, when the OR function code is received, and the flip-flop 425 is clocked, LA will stay at a 1 level if it previously existed at that level; and LA will be switched from 0 to 1 if the signal ELB is a 1. This fulfills the logical OR function such that $LA_n = LA_o + LB$, as indicated by the third line in Table VI.

If the logic instruction is XOR, and the L2, L1, L0 code 110 (Table VI), then the signal LA is to be converted to a 0 or a 1 if it previously was a 1 or a 0 and the input signal ELB is a 1. As here shown, if the signal ELB is 1, signal (n) is a 1 and signals (o) and (p) are 1's so that a pulse on CP toggles flip-flop 425. If ELB is a 0, then both (n) and (p) and 0 and the flip-flop 425 does not respond to a clock input. In consequence, whenever the instruction XOR is received and decoded to make L2, L1, L0 take on values 110, the apparatus of FIG. 10 responds to a clock pulse so as to make certain that $LA_n = LA_o \oplus LB$, where the symbol $\oplus$ represents the exclusive OR function.

As indicated by Table VI and the foregoing description, the logic processor of FIG. 10 takes a single input signal LB and converts it into an effective logic bit signal ELB which is identical to LB or the inverted form thereof if the signal COMP is a 0 or a 1. This operation is performed by the exclusive OR circuit 426. In response to the signal ELB, the apparatus produces a new logic answer signal LA which is the result of the logic function commanded by coded signals L2, L1, L0 (the codes of these signals corresponding to instructions LD, AN, OR, XOR appearing in Table II). To "clock" the logic processing circuitry for successive operations, an AND circuit 432 receives the "store" signal LAS (from the field decoder FD5) and the timing signal CLK after the signal LB has been created and the proper voltage levels established at the flip-flop control terminals J and K. Those control signals result from the single input signal LB which is created by feeding the selected word into the arithmetic input register 102 (FIG. 2a) and causing the bit selector circuit 402 to feed the selected bit (responsive to bit selection signals on lines i6 to i9) as the input signal LB to the logic processor.

From Table VI and FIG. 10 it will be seen that the 3-place function code signals L2, L1, L0 and the input signal LB act as inputs to (1) means (formed by 428, 429, 430) responsive solely to "load" function code signals (1, 1, 1) and the input signal LB for applying to terminal J or K a 1 level when LB is respectively at a 1 or 0 level;

(2) means (formed by 428, 429, 430) responsive solely to "and" function code signals (1, 0, 1) the input signal LB for applying to the K function a 1 level signal only when LB is at a 0 level;

(3) means (formed by 428, 429, 430) responsive solely to "or" function code signals (0, 1, 0) for applying to the J terminal a 1 level only when LB is at a 1 level, and (4) means (formed by 428, 429, 430) responsive solely to "exclusive OR" function code signals (1, 1, 0) for applying to both the J and K terminals a 1 level only when LB is at a 1 level,—such means placing 0 level voltages on the J and K terminals except in the cases specified. Therefore, the logic processor 401 functions completely without feedback of its output signal LA and the latter does not affect the operation of the means (1) through (4). After the operation code signals and the input signal LB are present in any of their various 0 or 1 level combinations (Table VI), the clock pulse applied from AND circuit 432 to terminal CP simply triggers (or leaves untriggered) the flip-flop 425 to make LA take on (or keep) the bistate value which is the correct result of the function represented by the coded operation signals—as shown in the right column of Table VI. Of course, the signal ELB is the same as LB if the true/complement signal COMP is 0; and is the complement of LB if COMP is 1—so that LB is selectively treated in its true or complement sense.

Although other and known forms of accumulating logic processors may be used in the overall practice of the present invention in some of its aspects, the novel processor shown in FIG. 10 is advantageous because it requires no feedback and is easily "instructed" by three-place function code signals.

One may appreciate that if a Boolean chain of operations is to be performed according to a simple, exemplary expression such as:

$$X = (N1 + \overline{N2}) \cdot N3 \oplus N4$$

where
N1 is the tenth bit b9 of memory word 44,
N2 is the eighth bit b7 of memory word 25,
N3 is the first bit b0 of memory word 61, and
N4 is the fifteenth bit b14 of memory word 35,
then it is possible to write program steps in machine language, as follows:

|        | LD    | T | b10  | addr. 44 |
|--------|-------|---|------|----------|
| Step 1 | 01011 | 0 | 1010 | 101100   |

After execution, LA = N1

|        | OR    | C | b8   | addr. 25 |
|--------|-------|---|------|----------|
| Step 2 | 01111 | 1 | 0100 | 011001   |

After execution, LA = N1 + $\overline{N2}$

|        | AN    | T | b0   | addr. 61 |
|--------|-------|---|------|----------|
| Step 3 | 01001 | 0 | 0000 | 111101   |

After execution, LA = (N1 + $\overline{N2}$) . N3

|        | XR    | T | b14  | addr. 35 |
|--------|-------|---|------|----------|
| Step 4 | 01101 | 0 | 1110 | 100011   |

After execution, LA = (N1 + $\overline{N2}$) · N3 $\oplus$ N4

When instruction word for Step 1 is brought into instruction register 202, the direct decode unit 209 (FIGS. 2a and 4) makes the signal BADDR go to zero, so gates 206 (FIG. 2b) close to mask off lines i6 to i9. The direct decoding circuits also respond to instruction-coded signals on lines i11 to i15 (in the foregoing Step 1 example, 01011) to make the L2, L1, L0 signals have values 111 (Table II), and the 0 on line i10 from register 202 makes the COMP signal a 0. When the MUX gate 205 (FIG. 2b) transmits its input signal OA to address trunk 11, the word stored at memory location 44 is fed to the AIR register 102 (in a manner to be detailed below). With instruction register output lines i6 to i9 controlling bit selector 402 by a combination of signals 0110, the b9 place output from register 102 becomes the signal LB. Thereafter when a clock pulse appears, the logic answer LA becomes equal to the signal N1 which is the eleventh bit of the word taken from memory location 44. This happens for the reasons explained above with reference to FIG. 10 and Table VI.

In like manner, the exemplary logic program steps 2, 3 and 4 may be executed successively—so that after the fourth step the signal LA will represent the result X of the exemplary Boolean expression.

Until another "logic process" step is performed, the signal LA will remain unchanged. This is because the control signal LAS can never appear, and the flip-flop 425 cannot be clocked, unless the decoded instruction is LD, AN, OR or XR. But the signal LA may be "saved" or stored for future reference; alternatively it may be stored into a hardware flip-flop bit of memory so as to turn on or off some external device. More importantly, the signal LA (or its complement $\overline{LA}$) may be used to determine whether a conditional instruction is in fact to be executed as will be pointed out more fully below.

To store the signal LA in any selected bit of a selected word of memory, the bit manipulation portion of FIG. 10, plus the bit control 404 and the exclusive OR array 106 of FIG. 2a, are utilized. Assume that an SV instruction has been brought into the instruction register 202—that instruction containing codes calling for the bit place b7 signal of the word stored at memory location 14. In machine language, the instruction as it will appear in the register 202 will take the form 10001/0/0111/001110/. As a result, the sixteen bit word W from memory location 14 will be placed in the arithmetic input register 102, and the bit signal from place b7 will become the signal LB. Now if the signal LB is a 1 or a 0 and the signal LA is a 1 or 0, the original b7 signal of word 14 agrees with LA and need not be changed. But if the signal LB is at a 0 or 1, and the signal LA is a 1 or 0, then the signal at the b7 place of word 14 must be toggled (inverted) to make it agree with the logic answer signal LA.

Referring to FIG. 10, and recalling from Table II that the logic instruction SV results in operation code signals L1, L0 taking on the values 0, 1, a first AND circuit 440 will be disqualified while a second AND circuit 441 will be qualified when an SV instruction is being processed. Thus, the signal at (a) will be a 0 or 1 if the logic answer signal LA is a zero or a one. An OR circuit 442 passes the signal (a) so that it becomes the signal (c) forming one input to an exclusive OR circuit 444 which receives as a second input the single bit input logic signal LB. Thus, the signal at (d) is at the 1 level only if the signals LB and LA are unlike, that is, one of them is a 1 and the other of them is a 0. The signal at (d) passes through an OR circuit 445 to become the signal (f) fed to an AND circuit 446 whose output is the bit control signal BC. The signal BC can be a 1 only if a control signal BTLOG from the microprogram ROM miscellaneous field decoder 284 (FIG. 9) is then at a 1 level (this latter condition occurring during Phase Three of an SV operation). In summary, when a "save" instruction SV is to be performed, the selected bit of the selected word is brought in as the signal LB and the bit control signal BC is placed at a 1 level only if the signals LB and LA are unlike—which signifies that the selected bit of the selected word must be "toggled" to make it agree with the then-existing value of the signal LA.

Referring to FIG. 2a, the bit control signal BC is supplied as an input to the selected bit control circuit 404 which has the single input and sixteen output lines carrying the signal H. As noted above, the bit control circuit 404 normally supplies a 1 level signal on all of its sixteen output lines H excepting that when the bit control signal BC is a one, then the corresponding bit of the signal H (which is established by the code of signals on lines i6 to i9 from the register 202) is converted to a 0 level. Thus, the signal H is either sixteen bits of all 1's or it is fifteen bits of 1's with one bit at a 0 level if BC is a 0, and the particular bit at the 0 level is the "selected bit" (in the example from place b7 of register 102).

Recalling that the selected word W (in the example, word 14 from memory) still resides in the arithmetic input register 102, and assuming for the moment that the control circuit $\overline{B}$ is applied to the ALU in FIG. 2a, the signal F will be the one's complement of the selected word, i.e., $F = \overline{W}$. The complement signal $\overline{W}$ forms one multi-bit input to the sixteen bit exclusive OR array 106 which is also receiving the sixteen bit input H with the selected bit (in the present example, the bit in location b7) at the 0 level. Therefore, the output of the sixteen bit exclusive OR array 106 is a sixteen bit signal ANS' which is the original word (i.e., $\overline{W}$ reinverted to W) taken from memory—except the selected bit will be inverted from its original value to the opposite value by the exclusive OR circuit through which it passes (unless the selected bit signal originally agreed with the signal LA). In the present example, when the signal BC is a 1, then the signal H from the bit control circuit 404 will contain all one's except for a 0 in bit place b7. Therefore, the signal ANS' will be the signal F (which is $\overline{W}$) inverted excepting that the signal at ANS' does not have its b7 bit signal reinverted and it appears in the signal ANS' as the complement of the b7 signal of the original word W held in the arithmetic register 102.

Once the signal ANS' has thus been formed, with the selected bit switched (if necessary) to agree with the logic answer LA, then the gate Gr may be enabled by a signal EOR to place the signal ANS' on the system bus 10. After this is done, that set of signals may be stored into the memory at the original word location 14. As so stored, the value in bit place b7 will agree with the signal LA formed after one or more logic processing operations of the processor 401.

From this explanation made with reference to a specific example (referring to memory word location 14 and bit place b7 therein), and by inspection of line 5 in Table VI, it will be understood that any word of memory (within the first sixty-four locations 0 through 63) may be brought into the arithmetic input register 102 by means of an SV instruction, the selected bit of that word defined by the instruction sent as a signal LB to the logic processor 401, the bit control signal BC formed to create the signal H to the exclusive OR array 106, and the latter then produces a signal ANS' which represents the original word with the selected bit signal at a value of 1 or 0 which agrees with the logic answer LA. Noteworthy is the fact that the basic arithmetic system components such as the input register 102, the arithmetic logic unit ALU, the instruction-address register 202—as well as most all of the control unit components—are utilized. The bit control signal BC becomes a 1 and a selected bit of the selected word is toggled only if it is necessary to change that selected bit signal to make it agree with the then-existing value of the signal LA.

Various signals, whether they be represented by external switches, external flip-flops or the state of memory cores, may be brought in sequentially with logic processing instructions in a chained succession of Boolean logic operations to form a final logic answer LA. After one such answer is formed and utilized or stored, another Boolean sequence may create another answer. Suppose the result of such a Boolean expression determines whether or not a solenoid valve in a controlled machine is to be turned on or off. After the signal LA is finally formed, a word of memory containing a control flip-flop for that solenoid may be brought into the arithmetic register 102. The selected bit corresponding to a selected flip-flop (e.g., the output of $FF_7$ of word W40, FIG. 12) will then be manipulated to agree with the final logic answer LA, and the signal ANS' will then be written back into the same memory location here shown as word W40 in FIG. 12. If LA is a 1 or a 0, the flip-flop $FF_7$ will be set or reset and the control solenoid valve will therefore be turned on or off.

Still other "bit manipulation" instructions are possible. These are IV, ST, RS. The first causes the selected bit of the selected word to be inverted; the second causes the selected bit of a selected word to be driven to (or left in) the 1 state; and the third causes the selected bit of the selected word to be driven to (or left in) the reset or 0 state).

Referring first to the ST instruction (which according to Tables II and IV results in the L1, L0, i14 signals having values of 1, 0, 1) it will be apparent that AND gate 441 in FIG. 10 is disqualified and so the signal at (a) must be at a 0 level. On the other hand, the signals L1 and i14 are both at the 1 level so the signal (b) in FIG. 10 is a 1 and passes through circuit 442 to make signal (c) a 1. If now the LB signal is a 0 or a 1, the output of exclusive OR circuit 444 will make the signal at (d) a 1 or a 0, signal (d) reappears as the signal (f) and when the enabling BTLOG signal appears, the output signal BC will become a 1 or a 0. As explained previously, when a selected word is brought into the arithmetic register 102 and the selected bit routed as the input signal LB to the logic processor 401, the selected word appears in inverted form at input F to the sixteen bit exclusive OR array 106. Thus, if the selected bit signal is not a 1, the bit control signal BC becomes a 1 and after the operation of the exclusive OR array, the corresponding bit in the signal ANS' is inverted from its original 0 value to a 1 value. This operation is made plain by line seven in Table VI which confirms that the ST instruction always results in the selected bit being established at a 1 value either by inverting it from its original 0 value or by leaving it at a pre-existing 1 value.

Consider next the bit manipulation instruction RS (see Table VI, line 8). It results in the signals at L1, L0 and i14 having respective values of 1, 0, 0. Gates 441 and 440 are both disqualified, therefore, and the signal (c) must reside at a 0 level. If the selected logic bit signal LB is a 0 or a 1, the output at (d) and the signal at (f) is a 0 or a 1. Thus, the signal BC will exist at a 1 level (when the control signal BTLOG appears) only if the selected bit represented by the signal LB is then at a 1 level. When the signal BC becomes a 1, and the selected word reappears at ANS' (FIG. 2a), the selected bit will be inverted from an original 1 value to a new 0 value, or it will be left in its original 0 value. Thus, the "reset" instruction RS always results in the selected bit of a selected word being switched to or left in a 0 state. Of course, thereafter the signal ANS' is re-stored in the original location of the system memory.

The "invert" instruction IV (see Table VI, line 6) results in the signals at L1, L0, i12 having respective values of 0, 1, 1. With these control signals applied to the circuit of FIG. 10, an AND circuit 448 is fully qualified to make its output signal (e) have a 1 level so that the output (f) of OR circuit 445 also resides at a 1 level (irrespective of whether the signal (d) is a 0 or a 1). Thus, the IV instruction always results in the signal (f) being at a 1 level and the signal BC taking on a 1 value when the control signal BTLOG appears. Accordingly, since an IV instruction always produces the signal BC with the 1 value, the selected bit of the selected word will always appear at ANS' inverted from its original value. Any word drawn from a memory location into the arithmetic register 102 as a result of an invert instruction IV will therefore appear at ANS' with the selected bit designated in that instruction inverted. Thereafter, the signal ANS' is re-stored into system memory at the original memory location.

As an overview, any one of the instructions SV, IV, ST or RS will result in the selected word being brought to the arithmetic register 102. An inverted form of that word appears as the input signal F to the sixteen bit exclusive OR array 106. If it is necessary for the selected bit of that word to be changed (according to the instruction being then handled, whether it be save, invert, set or reset), then the bit control signal BC takes on a 1 value, makes the corresponding selected bit of the signal H have a zero value (with all other bits within the signal H at a "1" level) so that the signal ANS' is the original word with the selected bit inverted from its original value. On the other hand, if the original value of the selected bit is proper as the result of an SV, ST or RS instruction, the bit control signal BC remains at a 0 level and the signal ANS' is simply the original word with the selected bit left at its original value.

12. System Operation—In General

A. The Fetching Operation (Phase Zero)

Figure 6:
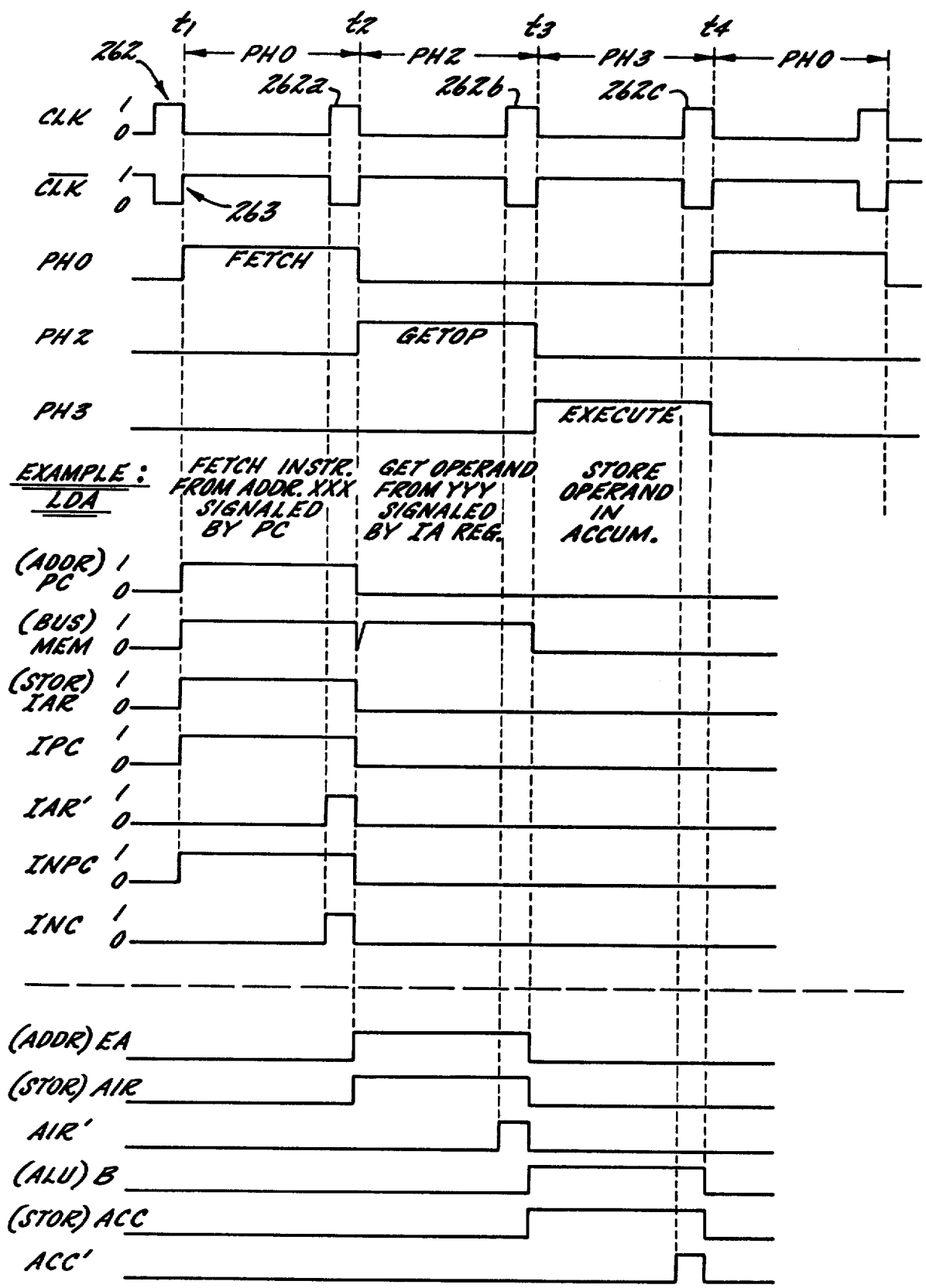
FIGS. 6 and 7 are graphic illustrations of waveforms, plotted against time, representing variations in different signals of the computer system during operation according to exemplary types of instruction sequences.

When the execution of any particular instruction has been completed (always at the end of a Phase Three interval which terminates on the trailing edge of a CLK pulse—see FIG. 6), the program counter 226 has been previously incremented so that it signals numerically the next instruction address in a program of steps. Assume that at the instant when a particular Phase Three ends (e.g., instant $t_1$ in FIG. 6) and a Phase Zero begins, the program counter output signal represents a particular address decimal number xxx. When the PH0 signal forming a "fetch" code applied to the line Xa of the microprogram ROM appears, the decoders FD1 through FD5 produce control signals PC, MEM, A, AIR and IPC, as indicated by line (1) of Table III. These particular control signals are graphically shown in FIG. 6 as existing at the 1 level during the time interval between instants $t_1$ and $t_2$. Those particular control signals are routed respectively to MUX gate 205, memory 300 and gate Gmr, the ALU, AND circuit 203, and OR circuit 290 (FIG. 9) during the entire Phase Zero interval. The signal IPC creates the signal INPC which is applied to AND circuit 230 in FIG. 2b. A CLK pulse 262a appears only in the latter portion of the Phase Zero interval and thus is transmitted through AND circuits 203 and 230.

The signal PC causes MUX gate 205 to place the program counter output PA on the address trunk 11 so that the instruction word at that memory address is fed (by virtue of the "read" signal MEM) to the memory output lines and through the gate Gmr to the system bus 10. The memory access time is on the order of 200 nanoseconds in state of the art memories, so that the selected instruction word will be signaled on the bus well before the CLK pulse 262a appears near the end of the Phase Zero interval.

When that CLK pulse 262a appears, however, it activates the AND circuit 203 to produce an "enable preset" pulse IAR', causing the instruction-address register 202 (during the existence of CLK pulse 262a) to store the instruction word then transmitted from memory onto the bus 10. Moreover, since the AND gate 230 is partially enabled by the INPC signal, the CLK pulse 262a produces a corresponding positive pulse INC at the incrementing or "count input" terminal of the program counter 226, and the latter responds to the negative-going trailing edge of the pulse INC to increase its count state by one unit, i.e., from xxx to xxx+1.

At the instant that the program counter 226 is incremented, however, the phase sequence generator 212 replaces the signal PH0 with the signal PH2 in those cases where the instruction just fetched into the instruction register 202 requires an operand and causes the direct decoder 209 to produce the GETOP signal.

B. Feeding the Operand to the Arithmetic Register (Phase Two)

As soon as the PH2 signal appears, the input code (Column (b) of Table III) applied to the microprogram ROM switches from that shown in line (1) to that shown in line (2) of Table III. Accordingly, the field decoder output signals are changed to a combination of the signals EA, MEM, A and AIR. The signal EA arising during Phase Two is shown graphically in the lower portion of FIG. 6 and the signal MEM continues at a 1 level as shown in FIG. 6. The signal AIR present during Phase Two is also shown in FIG. 6.

In response to the signal EA, the MUX gate 205 is conditioned to route its input signals OA (coming from the address output lines i0 to i9 of register 202) to the address trunk 11, and the signal MEM conditions the memory 300 and the gate Gmr to "read" the contents (operand) from the addressed location onto the system bus 10. Thus, the operand word which is called for by an instruction word is pulled from memory and signaled on the system bus.

The signal AIR which appears during Phase Two partially enables the AND circuit 101, and when the CLK pulse 262b appears near the end of the Phase Two interval, that circuit is fully activated to produce a pulse AIR' which (during the existence of CLK pulse 262b) causes the arithmetic input register 102 to receive and store the operand signals then on the bus. Therefore, a "feed operand" operation during any Phase Two involves transferring from memory the particular data word which is identified by the operand address in the instruction word then contained in the instruction register 202.

It may be noted in passing that the command signal A applied to the ALU during a fetching Phase Zero or an operand feeding Phase Two merely transfers the contents of the accumulator through the ALU to the output F. This has no particular significance in the simplified, exemplary system here disclosed, but in actual practice it permits the contents of the accumulator to be monitored during Phase Zero and Phase Two by treating the signal F as a status word. For the present example, the command A to the ALU during Phase Zero and Phase Two may be ignored.

C. Execution of the Instruction (Phase Three)

Coincidentally with the trailing edge of the CLK pulse 262b the phase sequence generator 212 replaces the signal PH2 with the signal PH3. Accordingly, the mapper ROM 210 (FIG. 8) is activated and supplies coded input signals to the microprogram ROM, the combination of such input signals uniquely representing the particular instruction designated by the five upper bit signals appearing on lines i11 through i15 as a result of the instruction word then stored in register 202. Thus, during each execution Phase III, the combination of outputs from the field decoders (FIG. 9) corresponds to those decoded output signals which are shown in Columns (c) through (h) of Table III for each of the several possible instructions. Each particular combination of control signals so produced creates a different result.

Merely as an example, the Phase Three execution of the instruction LDA is graphically illustrated in the lower portion of FIG. 6. It will be seen from Table III that during Phase Three of an LDA operation sequence, the control signals B and ACC are produced at the field decoder outputs. Accordingly, the signal B applied to the ALU causes the latter to transfer input signals B (representing the data word previously fed as an operand into the input register 102) to the output F during the entire Phase Three interval between instants $t_3$ and $t_4$ (FIG. 6) Moreover, the signal ACC partially enables the AND circuit 103 so that when a clock pulse 262c appears at the end of the Phase Three interval, a corresponding pulse ACC' (the lowermost line of FIG. 6) is applied to the "enable store" terminal of the accumulator 104. The accumulator now stores and signals at ANS the operand data word which was previously fed from memory and stored in the arithmetic input register 102 during Phase Two. Thus, a "load accumulator" instruction LDA causes a designated operand to be taken from memory, placed in the input register 102, and then transferred (during Phase 3) to the accumulator 104, after which that operand word is signaled at ANS. FIG. 6 by the example of the instruction LDA typifies the three step operation which follows the fetching of any instruction which requires the use of an operand (such instructions being designated by asterisks in Table III).

In the case of instructions (STA, CLA, SAR, SAL, JMP) not requiring the use of an operand, the GETOP siginal does not result during the fetching Phase Zero. Thus, as indicated in FIG. 7 the phase sequence generator does not produce a PH2 signal, and alternate Phase Zero, Phase Three intervals are measured off by PH0 and PH3 signals.

In this situation the operation during the "fetching" Phase Zero interval is exactly the same as previously described with reference to FIG. 6—and indeed, the fetching operation is always the same for every instruction. But, as indicated in FIG. 7, since the PH2 signal does not arise and the PH3 signal immediately follows the PH0 signal, an execution Phase Three proceeds immediately after fetching of an instruction word into the instruction-address register 202. The signals on lines i11–i15 from the fetched instruction word thus cause the mapper ROM 210 to supply coded input signals to the microprogram ROM 220 immediately after Phase Zero, and the field decoders produce the required combination of control signals to effect the particular operations necessary according to the particular instruction word in the register 202.

Figure 7:
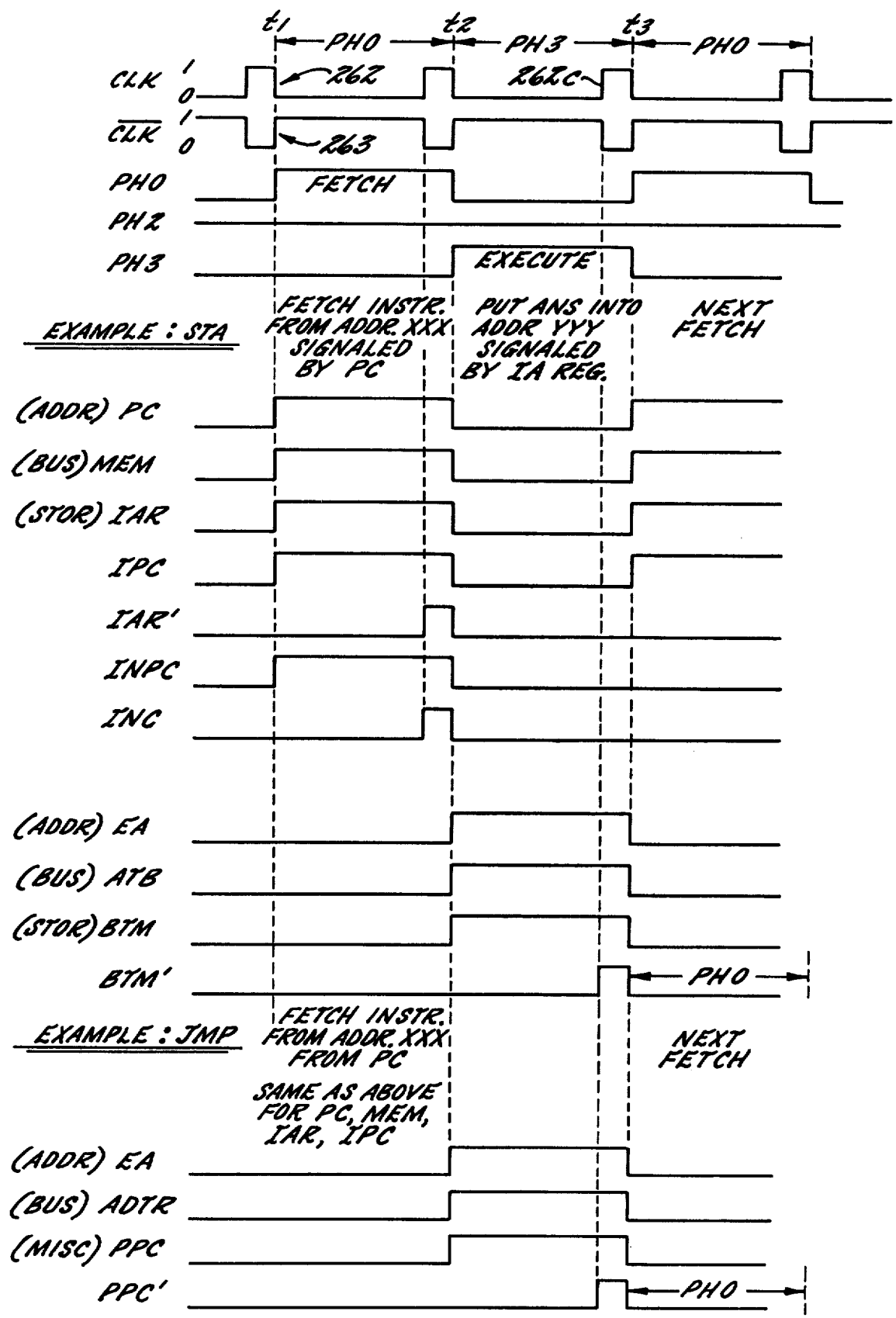

Two examples of instructions not utilizing operands are graphically illustrated in FIG. 7. Attention is directed particularly to the execution Phase Three interval there represented. Assuming that the instruction STA has been fetched during Phase Zero into register 202, then beginning at instant $t_2$ in FIG. 6 when the PH3 signal appears, the microprogram field decoders produce output signals EA, ATB and BTM as indicated in Table III and shown graphically in FIG. 7. The signal EA causes the MUX gate 205 to transmit the address-representing bits of the instruction word then appearing on line i0 to i9 onto the address trunk 11 so as to condition the memory system 300 to accept or "write" signals into the desired memory location. The signal ATB is applied to open the gate Gatb so that the accumulator output ANS is transferred onto the bus 10. The signal BTM partially enables the memory control AND circuit 303 and when the latter receives a CLK pulse 262c near the end of the PH3 interval, it produces a pulse BTM' which enables the system memory to store into the addressed location the signals then supplied onto the bus from the accumulator 104. Thus, a "store accumulator" instruction STA causes the signal ANS then existing in the accumulator (and possibly formed previously as a result of several chained arithmetic computations) into the designated location of the system memory.

As indicated in FIG. 7 after the Phase Three interval ends at instant $t_2$, the phase sequence generator 212 causes the signal PH0 to arise and measure off the next Phase Zero interval, so that the next instruction word will be fetched from the memory address signaled by the program counter 226 which was previously incremented during the terminal portion of the preceding Phase Zero interval.

FIG. 7 also illustrates the operations which result from a JMP instruction. If during any Phase Zero the JMP instruction is fetched into the instruction register 202, no GETOP signal is produced, and the phase sequence generator proceeds directly to Phase Three. The lower order bit places of a JMP instruction word designate the address of another instruction word which is next to be utilized and which does not follow in numerical sequence the address PA then signaled by the program counter 226. When the JMP code on lines i11 through i15 causes mapper ROM 210 to supply corresponding input signals to the microprogram ROM 220, the field decoders produce output control signals EA, ADTR, PPC as indicated in Table III and shown graphically in the lower portion of FIG. 7. The signal EA conditions MUX gate 205 to transfer onto address trunk 11 the signals from lines i0 to i9, but the system memory 300 does not respond since it receives neither a BTM nor a MEM signal. The signal ADTR opens the gate Gad so that the numerical address value then on trunk 11 is transmitted to the system bus 10. The signal PPC partially enables the AND circuit 231 which also receives the CLK pulse 262c during the terminal portion of the Phase Three interval shown in FIG. 7. The output of circuit 231 is a pulse PPC' which enables the program counter 226 to be preset to the numerical count state represented by the signals then on the bus 10 and which represent numerically the address location of the next instruction to be utilized. For example, if the program counter were residing in state 126 so that in normal operation it would next cause an instruction word to be taken from memory location 126, the execution of the JMP instruction may cause the program counter to be preset to a count state of 285 or 63—and so that when the next Phase Zero interval begins an instruction word appearing at memory location 285 or 63 will be utilized.

From the foregoing, it will be seen that the present computer system will respond to a variety of instructions (only a few of which are given for purposes of discussion), some of those instructions involving the use of an operand taken from memory, and others being executed directly without requiring an operand. The conventional or basic arithmetic instructions will be utilized in a sequence of programmed steps (with "jumps" if desired) in a fashion well known in the art to create answers to single or chained arithmetic operations, such answers appearing as signals ANS from the accumulator 104 and then being storable into any desired memory location by execution of a "store accumulator" instruction STA.

D. Performance of Special Logic Instructions

The execution of the special logic instructions generally follows the same sequence here described for instructions which utilize an operand, but they do not result in arithmetic computations. In other words, any arithmetic execution is aborted. On the contrary, they result in Boolean logic processing or bit manipulation in the logic processor 401, utilizing as an input signal LB the selected bit of a selected word, both designated by a special instruction word fetched into the instruction register 202.

1. Logic Process Instructions

As explained briefly above, whenever one of the four "logic process" instructions listed in lines (12) through (15) of Table III is fetched into the instruction register 202, the signal BADDR switches from a 1 to a 0 level to disable the masking gates 206. Also, the signal GETOP appears immediately when any special instruction word is placed in register 202 during a Phase Zero interval. Thus, when one of these "logic process" instructions is fetched, the system goes through a Phase Two operation and a selected word corresponding to the signals on lines i0 to i5 is fed to the arithmetic input register 102. The signals on lines i6 to i9 condition the bit selector 402 so that the selected bit signal of the selected word appears as the input LB to the logic processor 401. Moreover, direct decoding of signals on lines i10 to i15 resulting from the fetched instruction word create correspondingly coded control signals L2, L1, L0, COMP, i12, i14. These determine the particular function which the logic processor 401 will carry out in utilizing the single bit input signal LB.

After the completion of Phase Two in response to any "logic process" instruction, and a Phase Three interval begins, the mapper ROM 210 will supply an input code 1100 (Table III) to the microprogram ROM 220, and the field decoders of the latter will produce only the "logic answer store" control signal LAS. Since no operation signal goes to the ALU, arithmetic operation of the latter is aborted. As noted above, the control signal LAS partially conditions AND circuit 432 in FIG. 10, and when the CLK pulse appears near the end of the Phase Three interval, the flip-flop 425 is "clocked" to store the result of the commanded logic function performed on the input signal LB. Thus, the signal LA is switched to or left in that state which constitutes the answer or result of the executed logic processing function (LD, AN, OR or XR). Of course, while various logic voltage combinations may appear on the control lines L2, L1, L0 when ordinary arithmetic instructions are being handled, the signal LAS under these conditions will not appear, the flip-flop 425 in FIG. 10 thus is not clocked, and it does not change in response to voltage levels at its J or K inputs.

2. Bit Manipulation Instructions

When any of the "bit manipulation" logic instructions SV, IV, ST or RS is fetched (by a Phase Zero operation identical to that described above) into the instruction register 202, the signal BADDR will revert to a 0 level to disable masking gates 206 and the input signal OA to MUX gate 205 will thus be formed by the instruction word signals appearing on lines i0 to i5. During the Phase Two interval, therefore, the selected word will be transferred from memory into the arithmetic input register 102. The bit selector 412, controlled by signals on lines i6 to i9, will cause the selected bit of the selected word to appear as the input signal LB to the logic processor 401. Also, the signals of the logic instruction word as they appear on lines i10 to i15 will cause the direct decoder 209 to supply function-designating signals L1, L0, i12 and i14 to the logic procesor. This will result in the components of FIG. 10 producing a signal (f) which determines whether or not the signal BC will be at a 1 level when the gate 446 is later enabled by a BTLOG control signal.

During Phase Three execution of a "bit manipulation" logic instruction, the mapper ROM 210 will supply the input signals 1011 to the microprogram ROM 220, and the associated decoders FD1 through FD5 will (as indicated in Table III) produce the control signals EA, EOR, $\bar{B}$, BTM and BTLOG. In response to the signal EA, the MUX gate 205 will be conditioned to pass its signal OA to the address trunk 11. The memory address signals will therefore represent the same location from which the selected word was read during the preceding Phase Two. The control signal $\bar{B}$ will command the ALU to make the output signal F the complement of the input signal B, the latter being the selected word fed from memory into the input register 102 during the preceding Phase Two. The signal BTLOG will enable the gate 446 (FIG. 10) to make the control signal BC a zero or a one depending upon the value of the signal (f) which is determined by the nature of the instructed bit manipulation function and the value of the input signal LB—all as previously explained. The signal BC will act upon the bit control circuit 404 (conditioned by bit selection signals on lines i6 to i9) which will then create the input signal H to the exclusive OR array 106 with the selected bit therein at either a 0 or 1 value if the signal BC is a 1 or a 0. The output ANS' of the array 106 will thus be the original selected word with the selected bit thereof inverted or non-inverted, as required for the commanded logic function and the value of the signal LB.

The signal EOR will open the gate Gr to place the signal ANS' on the bus 10—this multi-bit signal corresponding exactly to the data word originally taken from memory during the preceding Phase Two and with the selected bit "manipulated" as required to execute the bit manipulation instruction word contained in register 202.

The signal BTM exists during the entire Phase Three and partially enables the AND circuit 303. When the CLK pulse appears in the terminal portion of the Phase Three interval, the signal BTM' will appear as a pulse to effect the "writing" of the signals then on bus 10 into the memory location designated by the signals on address trunk 11. Thus, the originally selected word from memory will be written back into the same memory location—with a single selected bit therein changed as required to effect the SV, IV, ST or RS instruction.

3. Conditional Arithmetic Instructions

In accordance with the present invention means are provided to disable the control or executing means for any instruction (other than a "logic process" instruction) which is coded to be "conditional" unless the logic answer signal LA has a predetermined value, here 1.

From line 1 of Table I, the "U/C" in place b10 means simply that if a 0 or 1 is coded into the instruction word, the instruction is "unconditional" or "conditional". When it is conditional, then the signal COND (FIGS. 4 and 9) is 1 as soon as that instruction is fetched into register 202.

In the present embodiment, during the execution Phase Three at least one control signal will be produced by the field decoder FD4 or FD5 which causes the final "execution" step. For example, on Phase Three of an ADD instruction, the signal ACC (Table III) appears; it enables AND circuit 103 so the ACC' pulse may be produced to transfer the ALU result F into the accumulator 104. But if the ACC signal is aborted, the entry cannot occur and the execution is killed. To thus disable execution of any conditional instruction when COND is 1, the signal K (FIG. 9) is made 0 if $\overline{LA}$ is 1 (LA=0). And the signal K at a 0 level simply gates off field decoders FD4 and FD5—so that even though a Phase Three interval is measured off, no execution of any instruction may occur.

Alternative and equivalent circuit components and connections, to obtain the same result, will be apparent. For example, the phase sequence generator could be controlled by signals COND and LA such that it simply skips from Phase Two to Phase Zero when both such signals exist. This would kill the execution because the mapper ROM would not be enabled by a PH3 signal. As a second example, the microprogram ROM could be constructed to receive the signal COND as an input—so as to produce output signals during Phase Three which decode into no control signals at all. As a third example, the signal K could be applied as a third input to all of the AND circuits (e.g., AND circuit 103) to disable them during PH3 when $\overline{LA}$ is 1 and COND is 1. While many specific forms of apparatus may thus be employed, it is essential only to disable the control unit to prevent "execution" of an instruction coded "conditional " unless the previously formed logic answer LA is then in a predetermined one of its two states (here 1).

E. The IF Instruction

There is one instruction which involves selecting a particular bit of a particular word, and which thus bears some similarity to a special logic instruction even though it does not utilize the selected bit for either logic processing or manipulation. That instruction is here designated IF, and it is utilized to cause the next operational instruction within a program sequence to be skipped if the selected bit of a selected word (when taken in either a true or complement sense) is a 0. It will thus be appropriate here to describe the operations which result when the IF instruction is fetched into the instruction register 202 during any Phase Zero interval.

The first six bit places b0 through b5 of an IF instruction word designate the operand word to be selected, and the bit places b6 through b9 designate the particular bit within that word which is to be examined. The bit place signal at b10 in an IF instruction word designates (by 0 or 1) whether the selected bit is to be taken in its true or complement sense; and the remaining bit places b11 through b15 designate the IF instruction code shown in Table II.

After fetching of an IF instruction word into register 202, the Phase Two operations are exactly the same as for any of the logic instruction words heretofore described. That is, the selected word is taken from memory onto the bus 10 and placed in the arithmetic input register 102, and the bit selector 402 in responding to signals on lines i6 to i9 makes the input signal LB to the logic processor 401 correspond to the value of the selected bit in the selected word. Referring to FIGS. 4 and 10, if the signal on line i10 is a 1 (designating that the selected bit is to be treated in its complement form), the signal COMP is a 1. In that case, the exclusive OR circuit 426 makes the signal ELB the complement of LB; otherwise ELB is the same as LB. At the end of the Phase Two interval for an IF instruction, the signal ELB exists in the logic processor shown by FIG. 10 and it is coupled via an inverter 293 as signal $\overline{ELB}$ to the AND circuit 291 shown in FIG. 9.

When the phase sequence generator 212 enters execution Phase Three and the mapper ROM 210 is enabled, the latter responds to the IF instruction code to supply a unique combination of input signals to the microprogram ROM 220. The field decoders of the latter then produce, as shown in Table III, only the IPCLB control signal. When the IPCLB signal exists during a Phase Three interval and if the ELB signal is a 0 so that $\overline{ELB}$ is a 1, the AND circuit 291 (FIG. 9) produces a 1 output signal which passes through OR circuit 290 to apply the signal INPC to the AND circuit 230 of FIG. 2b. When the CLK pulse appears near the end of this Phase Three interval, a corresponding INC pulse is applied to the counting input terminal of program counter 226. On the trailing edge of that pulse, i.e., at the very end of the Phase Three interval, the program counter 226 counts up by one unit. Recalling that the program counter was incremented at the end of the preceding Phase Zero interval so as to be ready to call from memory the instruction word which normally is next to be used in a program sequence, the incrementing of the program counter during Phase Three performed in response to an IF instruction causes double incrementing of the program counter. When the next Phase Zero begins, one step of the program is simply skipped.

The IF instruction is thus a convenient way of examining any bit of any word (whether it be an ordinary numerical data word or a word containing purely logic bit signals formed by external switches or flip-flops) and causing the next program step to be skipped if the examined bit is either a 1 or a 0. When value of the "time/-complement" bit b10 signal in the IF instruction word is a 0, the next program step instruction is skipped if the examined bit is a 0; but when the value of the bit b10 signal in the IF instruction word is a 1, the next program step instruction is skipped if the examined bit is a 1.

13. Typical Program Sequences Which the Present System Will Carry Out

Because the reader is now familiar with the various machine language instructions, and the detailed operations which will result from each, the following discussion will refer to instructions in "English language" symbols which might be used by a programmer in formulating program sequences. As an introduction, however, it is necessary to assign specific, memory locations for numerical data words and logic bit data words so as to facilitate description of exemplary software program sequences.

| Assume that: |
|---|
| Number N1 is stored at memory location 452 |
| Number N2 is stored at memory location 25 |
| Number N3 is stored at memory location 85 |
| Number N4 is stored at memory location 96 |
| Bistate signal R is stored at place b14 of memory location 29 |
| Bistate signal S is stored at place b3 of memory location 18 |
| Bistate signal T is formed by switch S8 of memory location 30 (FIG. 12) |
| Bistate signal U is formed by switch S12 of memory location 30 (FIG. 12) |
| Bistate signal V is formed by flip-flop $FF_6$ of memory location 40 (FIG. 12) |
| Bistate signal W is formed by flip-flop $FF_{15}$ of memory location 40 and controls solenoid valve 320 (FIG. 12) |
| Bistate signal X is formed by flip-flop $FF_1$ of memory location 40 (FIG. 12) |

A. Boolean Processing With Control of External On-Off Devices

Suppose at some portion of an overall arithmetic-/logic program it is desired to turn on the solenoid valve 320 (FIG. 12) if the number N2 is positive and the signal R is 1, or if the switch S8 is closed (T=1) and $FF_6$ is set (V=1). A 0 or 1 stored in the b15 place of word 25 designates that the number N2 is positive or negative. This may be expressed as a Boolean expression:

Turn on valve 320 when $[(N2 \text{ is pos}) \cdot R + (S8 \cdot FF_6)]$.

$$W = (N2\text{pos} \cdot R) + (T \cdot V)$$

If this is to be carried out starting on program step 442, for example, then a program would be written with instructions, as follows:

| Step and Memory Location | Instruction | | |
|---|---|---|---|
| 442 | LD comp. | b15 | word 25 |
| 443 | AN true | b14 | word 29 |
| 444 | SV uncond. | b0 | word 63 |
| 445 | LD true | b8 | word 30 |
| 446 | AN true | b6 | word 40 |
| 447 | OR true | b0 | word 63 |
| 448 | SV uncond. | b15 | word 40 |

Those program instructions would be entered (conventionally by a punched tape or card reader, not shown) into memory locations 442 to 448.

In later operations, when the program counter 226 reaches count state 442, the bit 15 of word 25 will be loaded in complement form into accumulator flip-flop 425 (FIG. 10) so that LA becomes 1 or 0 if the number N2 is positive or negative, respectively. The program counter increments to state 443.

Next, pursuant to the instruction taken from location 443, the bit 14 from location 29 is brought to the logic processor 401 with an "and" operation code so that $LA_n$ becomes equal to (N2pos·R). The program counter increments to state 444.

Then, the LA signal is saved at a "scratch pad" location. Word 63 is brought to register 102 and bit b0 thereof fed to logic processor 401 which receives a "save" operation code. That word is restored into location 63 with its b0 bit in agreement with LA, i.e., representing the result of (N2pos·R). The counter 226 increments to 445.

From address 445 a logic instruction word is fetched. It causes bit b8 of word 30 (i.e., T) to be "loaded" so that LA agrees therewith.

Thereafter, a logic instruction word is fetched from location 446 to make LB correspond to bit b6 of word 40 (i.e., V) and to make the logic function code call for "anding". $LA_n$ becomes (T·V). The program counter advances to 447.

Next, the instruction from location 447 is fetched; and it makes LB correspond to bit b0 of word 63—which was stored on previous step 443 to represent (N2pos·R)—and supplies an "OR" function code to processor 401. $LA_n$ now becomes an answer representing $$(N2\text{pos} \cdot R) + (T \cdot V)$$

When LA has been so formed, and the program counter reaches state 448, the "save" instruction word is fetched. It causes word 40 to be fed to register 102 and LB to correspond to bit b15 from that register. The control signal BC is made a 0 or a 1 if LA then is like or unlike LB. BC thus makes b15 of signal H a 1 or 0 and the exclusive OR array 106 makes ANS' the same as the original word from location 40 but with the b15 signal in agreement with LA. ANS' is then stored or rewritten into location 40. From FIG. 12 one sees that if LA at this time is a 1, flip-flop $FF_{15}$ is set (or left set) to make W a 1; but if LA is 0, $FF_{15}$ is reset (or left reset) to make W a 0. Thus, the final result of the chained Boolean operations is to turn on or off the solenoid valve 320 according to the Boolean logic answer.

It will be recognized that the apparatus of the invention permits many other types of Boolean equations to be implemented by appropriate programming. Note that logic "one bit" signals formed by a switch or the like (e.g., T in the above program example) may be used in the Boolean sequences, but also selected bits of numerical data words (e.g., N2 in the foregoing example) may also be used. The purely logic words (last line in Table I) can be used intermixed with numerical words (next-to-last line in Table I) to obtain Boolean inputs. The logic answer LA at the conclusion of a Boolean sequence need not be "stored" into a flip-flop; it may be stored as a flag in a particular bit of a particular word of core memory and then recalled at a later time for examination or usage. Moreover, a Boolean chain of operations need not involve sequential program steps. Some of the logic operations may be performed, then arithmetic operations performed, and the Boolean chain resumed, because LA will hold the partial result.

B. Conditional Arithmetic Operations

Suppose, as an example, that it is desired (as a part of an overall software program) to store as a new value of the number N3 the sum of N1 and N4, but with N2 subtracted therefrom if and only if one but not both of logic signal S and U reside in the one state—, and then to divide the result by two if (and only if) logic signal X from flip-flop FF$_1$ (FIG. 12) is in the reset state. Restated, this requires:

(a) Add N4 to N1.
(b) Subtract N2 from the result of (a) if S⊕U.
(c) Divide the result of (a) and (b) by two if logic signal X at 40/1 (FIGS. 12) is 0.
(d) Store the result as a new value N3.

To carry out those operations with the stated conditions, part of a program, for example beginning at step 183 may be written:

| Step | Instruction | | | |
|---|---|---|---|---|
| 183 | LDA | uncond. | | word 452 |
| 184 | ADD | uncond. | | word 96 |
| 185 | LD | true | bit 3 | word 18 |
| 186 | XR | true | bit 12 | word 30 |
| 187 | SUB | cond. | | word 25 |
| 188 | IF | comp. | bit 1 | word 40 |
| 189 | SA/R | uncond. | | |
| 190 | STA | uncond. | | word 85 |

When program counter 226 reaches count state 183, the basic LDA instruction from memory location 183 will be fetched. The number N1 from location 452 is brought into the accumulator 104 and is signaled at ANS. The ALU will receive a "B" command signal for this operation, as shown in Table III.

With the program counter at state 184, the "add" instruction from location 184 will be fetched. It causes ANS and N4 (the operand from location 96) to be added, and the result stored into the accumulator as a new value of ANS. Of course, the ALU receives the "A+B" command during this operation.

With the program counter at state 185, the special instruction at location 185 is fetched, and bit 3 of word 18 (i.e., S) is loaded to become the signal LA—by a logic process operation previously described.

With program counter 226 at state 186, the special instruction word at location 186 is fetched. The bit signal b12 (switch S12, FIG. 12) of word 30 is applied as the signal LB, while logic processor 401 receives an operation code for "exclusive OR" on lines L2, L1, L0. LA is clocked to or left in that state which corresponds to S⊕U—and will be a 1 only if S or U (but not both) is a 1. Note that the steps 185 and 186 did not disturb ANS which still represents the sum of N1 and N4.

With program counter 226 at state 187, the "conditional" arithmetic instruction "subtract" is fetched from location 187. The operand N2 from location 25 is brought to input register 102, and the ALU is given an "A−B" command. The signal at F becomes equal to N1+N4−N2. But observe from FIGS. 4 and 9 that the COND signal is 1, and thus during Phase Three (when PH3 is 1) the signal K will be 0 providing that $\overline{LA}$ is 1 (i.e., LA is 0). Thus, if LA (representing the result of S⊕U) is 0, then the field decoders FD4 and FD5 are gated off and the ACC store signal (which normally would be produced, Table III) remains 0. Therefore, the signal at F is not transferred into accumulator 104 if LA is 0, but is so transferred if LA is 1. Manifestly, the subtraction step 187 is "conditional" and is executed only on the condition that LA is 1 (which, in this example of programming is the condition that S⊕U=1). Depending on the state of S and U, therefore, the signal ANS at the end of step 187 will be either (N1+N4) or (N1+N4−N2).

When the next special IF instruction word 188 is fetched (and the counter is incremented to state 189 during Phase Zero), bit 1 of word 40 is made the input signal LB, and because the instruction contains a "complement" designation (1 in place b10) the signal COMP (FIG. 4 and FIG. 10) will be a 1, so the signal ELB will be 0 or 1 if the selected X bit b1 is a 1 or 0 (FF$_1$ in FIG. 12 is set or reset). Thus, during Phase Three execution, the signal IPCLB will be a 1 (Table III and FIG. 9) and INPC will be a 0 or 1 if ELB is 1 or 0. In the former case, the signal INCP will be a 1, and the program counter 226 will be incremented from count state 189 to 190 at the end of Phase Three—as explained earlier with reference to FIG. 7. In the latter case, the count state remains at 189.

In such latter case, the instruction from location 189 is next fetched, and the Phase Three execution results in the control signal SACR to the accumulator 104—to shift the contents one place to the right. The signal ANS in this case will be either N1+N4/2 or N1+N4−N2/2 depending on whether S⊕U=1 or 0.

But if the signal 40/1 (the bit 1 of word 40 from FF$_1$, FIG. 12 representing X) is a 1, so that ELB is a 0 and ELB is a 1 during step 188, then step 189 is skipped and step 190 is next performed. Whether step 190 follows 188 or 189, it results in fetching of the STA instruction from location 190, and the storing of ANS to word location 85 where it represents the number N3.

The computed value so stored at N3 is therefore either:

(i) N1+N2−N4/2 if S⊖U=1 and FF$_1$ is reset.
(ii) N1+N2/2 if S⊕U=0 and FF$_1$ is reset.
(iii) N1+N2−N4 if S⊕U=1 and FF$_1$ is set, or
(iv) N1+N2 if S⊕U=0 and FF$_1$ is set.

Several important features of such "conditional" arithmetic operations may be noted. First, the logic operations which lead to the result of a Boolean answer may be more or less randomly interspersed with arithmetic operations—since neither ordinarily affects the other. In the example, the preliminary sum N1+N4 is left in the accumulator 104 while logic processing steps 185 and 186 are performed. It is only necessary that the end result of a Boolean chain be formed (and signaled by LA) before an arithmetic operation, which is to be conditional on that end result, is performed. Secondly, the answer to a long chain of Boolean sequences will stay as the signal LA until some further "logic process" step is executed. Therefore, it may be used as the "condition factor" for several subsequent arithmetic steps. Moreover, the final answer LA to a Boolean chain of logic instructions may be stored ("saved") at a known bit of a known word, and then be pulled back into the logic processor by a one-step LD instruction just prior to an arithmetic step which is to be conditional upon that final answer. Alternatively, a final logic answer may be stored or saved at a known bit address within a known word address, and then such answer employed as the selected bit in an IF instruction which precedes any step (either arithmetic or logic) that is to be conditional upon such answer. In the foregoing example, the flip-flop FF$_1$ of word 40 may have been set or reset by a logic answer formed prior to program step 183; and yet the programmed step 189 is executed only if the signal at bit 1 of word 40 is 0 (i.e., the flip-flop FF₁ is reset).

The apparatus of the present invention therefore provides extremely flexible and convenient programming possibilities wherein the final result (or indeed even the performance) of several arithmetic computation steps leads to different numerical answers according to specific relationships of several single bit bistate logic signals—which may be created by individual cores within multiple core word address of a conventional memory system, or by external switches, flip-flops or other on/off devices. Indeed, it should be noted that a chain of Boolean operations may be performed by programming on say steps 465 to 475 to create an answer at LA which, if 1, designates that a whole series of arithmetic steps 477 to 485 is unnecessary on a given pass through an entire program. In that situation, the jump instruction JMP may be programmed on step 476, made "conditional", and formed to signal "486" in its bits b0 to b9. If executed, it will cause a jump to step 486. Thus, steps 477 to 485 will be skipped if a preformed Boolean logic result LA is a 1.

While many other examples of program sequences possible with the present apparatus system might be given, the two specific and simple examples treated above will be sufficient for one skilled in the art to visualize the flexibility and advantages which are here achieved. Indeed, in a full-scale computer accommodating all of the normal arithmetic instruction codes (such as multiply, divide, square root, reciprocal, etc.)—rather than only the limited basic instructions of the present example—, the logic and "conditional" programming possibilities are almost limitless to meet the needs of any particular controlled system.

As noted, the logic processing portion of the present system cooperates with the arithmetic computation portion by qualifying or making "conditional" certain operations of the latter portion. But The arithmetic portion may cooperate with the logic portion by taking over and doing some of the elementary logic work to save time. Visualize a process or machine control system having a vast number of switches such as those shown at S0–S15 in FIG. 12. It might include 160 words of 16 switches each, or a total of 2560 switches. Often it is only necessary to determine if any one switch in a group of, say, 160 (ten words) is close. If a programmable controller alone were used, it would be conventional practice to examine those switches by chained "OR" operations involving 160 program steps. In the present system, however, it is possible simply to bring each of the ten words into the accumulator and compare it to zero by ten arithmetic program steps. "Compare to zero" is a conventional arithmetic instruction, although not described in the foregoing embodiment of a simple digital computer. If any of such ten comparisons yields a "not zero" answer for the entire word, a flag (flip-flop) may be set to designate that at least one of the 160 switches is closed. Subsequent operations may be controlled by the flag. While the present invention may function purely as a programmable controller, it is faster and more flexible in carrying out some of the programmable controller functions because its arithmetic portion can be used for some such functions.

Consider further that in many practical applications of programmable controllers or computers, whole portions of an entire program need to be performed (and otherwise can be skipped) only if the state of at least one of many (e.g., 256) switches has changed since the previous pass through the program. In a programmable controller this would require storing the state of each switch and comparing the stored state with the state existing during the next pass. In the present system, however, sixteen words of switch state signals may be stored on each pass, and compared for identical numerical value of the same "switch words" drawn into the arithmetic unit on the next pass. "Compare" is a conventional and well known arithmetic instruction. Thus, by only sixteen compare program steps, the arithmetic portion of the present system may signal if the state of any of 256 switches has been changed since the last pass—and this may replace 256 program steps required if a single bit logic processor were employed for this purpose.

RESUME'

The apparatus of the present invention starts with a basic and somewhat conventional alpha/numeric arithmetic digital computer unit, system memory and control unit. By adding and interconnecting additional components (e.g., the logic processor 401, the bit selector 402, the bit control 404, portions of the direct decode circuits for producing signals L2, L1, L0—and so on) the overall system is given the capability of responding differently to ordinary arithmetic or other conventional format instruction words and special format logic instruction words. The modified system is thus given all the operational capability of a logic programmable controller—while making use of the otherwise present arithmetic digital computer components (such as the instruction-address register 202, the arithmetic input register 102, the master clock 214, the phase sequence generator 212, the system memory 300—and so on). But still further, the basic arithmetic system and the logic processing components participate in synergistic cooperation since one may modify the operation of the other, as in the "conditional" performance of arithmetic steps explained above. The memory system may be entirely conventional, yet the overall system will accommodate both arithmetic and logic instructions which may be programmed essentially in a random and interleaved sequence—and indeed with external logic devices (such as switches or flip-flops) treated as forming bits of words in the memory system.

To shorten the description while setting forth an exemplary embodiment which illustrates the principles of the invention, a very simple arithmetic digital computer has been treated here. It omits known parts such as input/output interfaces coupling to external devices, such as keyboards, tape readers and the like for loading a program of instructions into memory and entering data manually, or such devices as CRT displays, typewriters, or digital-to-analog converters for taking from memory and displaying or utilizing data words which are formed in value by computations or logic operations. These latter adjuncts of commercial digital computers are well known to those skilled in the art and may be provided by routine design in association with a combined arithmetic computer/logic processor system embodying the features of the present invention.

TABLE I

Exemplary Word Formats

| b15 | b14 | b13 | b12 | b11 | b10 | b9 | b8 | b7 | b6 | b5 | b4 | b3 | b2 | b1 | b0 | Bit Locations |
|---|---|---|---|---|---|---|---|---|---|---|---|---|---|---|---|---|
| I | I | I | I | I | U/C | A | A | A | A | A | A | A | A | A | A | Basic Instruction |
| I | I | I | I | I | T/C | B | B | B | B | A | A | A | A | A | A | Logic Process Instruction |
| I | I | I | I | I | U/C | B | B | B | B | A | A | A | A | A | A | Logic Bit Manipulation |
| ± | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ | Data Word |
| $Q_{15}$ | $Q_{14}$ | $Q_{13}$ | $Q_{12}$ | $Q_{11}$ | $Q_{10}$ | $Q_9$ | $Q_8$ | $Q_7$ | $Q_6$ | $Q_5$ | $Q_4$ | $Q_3$ | $Q_2$ | $Q_1$ | $Q_0$ | Logic Bit Word |

TABLE II

Exemplary Machine Language Instruction Codes As They Appear In Instruction Register

| (a) | (b) | (c) | | | | | (d) | | | | (e) | | | | |
|---|---|---|---|---|---|---|---|---|---|---|---|---|---|---|---|
| | | | | | | | Direct Decode | | | | Micro. Pr. Input on PH3 | | | | |
| Operation | SYM-BOL | i15 | i14 | i13 | i12 | i11 | GET-OP | L2 | L1 | L0 | Cond. or T/C | $X_d$ | $X_c$ | $X_b$ | $X_a$ |
| Load | LDA | 0 | 0 | 0 | 0 | 1 | 1 | | | | i10 | 0 | 0 | 1 | 1 (3) |
| Add | ADD | 0 | 0 | 0 | 1 | 1 | 1 | | | | i10 | 0 | 1 | 0 | 0 (4) |
| Subtract | SUB | 0 | 0 | 1 | 0 | 1 | 1 | | | | i10 | 0 | 1 | 0 | 1 (5) |
| Store to Acc. | STA | 0 | 0 | 0 | 1 | 0 | 0 | | | | i10 | 0 | 1 | 1 | 0 (6) |
| Clear Acc. | CLA | 0 | 0 | 1 | 0 | 0 | 0 | | | | i10 | 0 | 1 | 1 | 1 (7) |
| Shift Acc. Rt. | SAR | 0 | 0 | 1 | 1 | 0 | 0 | | | | i10 | 1 | 0 | 0 | 0 (8) |
| Shift Acc. Lft. | SAL | 0 | 1 | 0 | 0 | 0 | 0 | | | | i10 | 1 | 0 | 0 | 1 (9) |
| Jump | JMP | 0 | 1 | 0 | 1 | 0 | 0 | | | | i10 | 1 | 0 | 1 | 0 (10) |
| If | IF | 0 | 0 | 1 | 1 | 1 | 1 | | | | i10 | 1 | 0 | 1 | 1 (11) |
| Load Log. Bit | LD | 0 | 1 | 0 | 1 | 1 | 1 | 1 | 1 | 1 | i10 | | | | |
| And | AN | 0 | 1 | 0 | 0 | 1 | 1 | 1 | 0 | 1 | i10 | | | | |
| Or | OR | 0 | 1 | 1 | 1 | 1 | 1 | 0 | 1 | 0 | i10 | 1 | 1 | 0 | 0 (12) |
| Excl. Or | XR | 0 | 1 | 1 | 0 | 1 | 1 | 1 | 1 | 0 | i10 | | | | |
| Save LA | SV | 1 | 0 | 0 | 0 | 1 | 1 | | 0 | 1 | i10 | | | | |
| Invert | IV | 1 | 0 | 0 | 1 | 1 | 1 | | 0 | 1 | i10 | 1 | 1 | 0 | 1 (13) |
| Set | ST | 1 | 1 | 0 | 1 | 1 | 1 | | 1 | 0 | i10 | | | | |
| Reset | RS | 1 | 0 | 1 | 1 | 1 | 1 | | 1 | 0 | i10 | | | | |
| DURING PH0 FETCH = 1 | | | | | | | | | | | | 0 | 0 | 0 | 1 (1) |
| DURING PH2 GETOP = 1 | | | | | | | | | | | | 0 | 0 | 1 | 0 (2) |

TABLE III

Microprogram ROM Truth Table

| (a) | (b) | | | | (c) | | (d) | | | (e) | | | (f) | | | (g) | | | (h) |
|---|---|---|---|---|---|---|---|---|---|---|---|---|---|---|---|---|---|---|---|
| | Mic. Pr. Input | | | | ADDR FIELD | | BUS FIELD | | | ALU FIELD | | | STORE FIELD | | | MISC FIELD | | | IPC |
| Oper. | $X_d$ | $X_c$ | $X_b$ | $X_a$ | M15 | M14 | M13 | M12 | M11 | M10 | M9 | M8 | M7 | M6 | M5 | M4 | M3 | M2 | M1 |
| | | | | | PC | | MEM | | | A | | | LAR | | | | | | IPC |
| (1) FETCH | 0 | 0 | 0 | 1 | 0 | 1 | 0 | 1 | 0 | 0 | 0 | 0 | 1 | 0 | 0 | | | | 1 |
| | | | | | EA | | MEM | | | A | | | AIR | | | | | | |
| (2) GETOP | 0 | 0 | 1 | 0 | 1 | 0 | 0 | 1 | 0 | 0 | 0 | 0 | 0 | 1 | 0 | | | | 0 |
| | | | | | | | | | | B | | | ACC | | | | | | |
| (3) LDA* | 0 | 0 | 1 | 1 | | | | | | 0 | 0 | 1 | 0 | 1 | 1 | | | | 0 |
| | | | | | | | | | | A + B | | | ACC | | | | | | |
| (4) ADD* | 0 | 1 | 0 | 0 | | | | | | 0 | 1 | 1 | 0 | 1 | 1 | | | | 0 |
| | | | | | | | | | | A − B | | | ACC | | | | | | |
| (5) SUB* | 0 | 1 | 0 | 1 | | | | | | 1 | 0 | 0 | 0 | 1 | 1 | | | | 0 |

TABLE III-continued

Microprogram ROM Truth Table

| (a) | (b) | | | | (c) | | (d) | | | (e) | | | (f) | | | (g) | | | (h) |
|---|---|---|---|---|---|---|---|---|---|---|---|---|---|---|---|---|---|---|---|
| | Mic. Pr. Input | | | | ADDR FIELD | | BUS FIELD | | | ALU FIELD | | | STORE FIELD | | | MISC FIELD | | | IPC |
| Oper. | Xd | Xc | Xb | Xa | M15 | M14 | M13 | M12 | M11 | M10 | M9 | M8 | M7 | M6 | M5 | M4 | M3 | M2 | M1 |
| (6) STA | 0 | 1 | 1 | 0 | EA 1 | 0 | ATB 0 | 1 | 1 | | | | BTM 1 | 0 | 0 | | | | 0 |
| (7) CLA | 0 | 1 | 1 | 1 | | | | | | | | | | | | CLR 0 | 0 | 0 | 0 |
| (8) SAR | 1 | 0 | 0 | 0 | | | | | | | | | | | | SACR 1 | 0 | 0 | |
| (9) SAL | 1 | 0 | 0 | 1 | | | | | | | | | | | | SACL 1 | 0 | 1 | |
| (10) JMP | 1 | 0 | 1 | 0 | EA 1 | 0 | ADTR 0 | 0 | 1 | | | | PPC 1 | 1 | 1 | | | | 0 |
| (11) IF* | 1 | 0 | 1 | 1 | | | | | | | | | | | | IPCLB 0 | 1 | 1 | 0 |
| (12) LD* (13) AN* (14) OR* (15) XR* (16) SV* | 1 | 1 | 0 | 0 | | | | | | | | | LAS 1 | 1 | 0 | | | | |
| (17) IV* (18) ST* (19) RS* | 1 | 1 | 0 | 1 | EA 1 | 0 | EOR 1 | 0 | 0 | $\bar{B}$ 0 | 1 | 0 | BTM 1 | 0 | 0 | BTLOG 1 | 0 | 0 | 0 |

*These instructions produce a PH2 and "Get Operand" operation. The others involve only PH0 and PH3.

TABLE IV

Instruction Direct Decoder Truth Table

| | INPUT | | | | OUTPUT | | | |
|---|---|---|---|---|---|---|---|---|
| INSTR. | i15 | i14 | i13 | i12 | L2 | L1 | L0 | i14 i12 |
| LD | 0 | 1 | 0 | 1 | 1 | 1 | 1 | |
| AN | 0 | 1 | 0 | 0 | 1 | 0 | 1 | |
| OR | 0 | 1 | 1 | 1 | 0 | 1 | 0 | |
| XR | 0 | 1 | 1 | 0 | 1 | 1 | 0 | |
| SV | 1 | 0 | 0 | 0 | 0 | 1 | | 0 |
| IV | 1 | 0 | 0 | 1 | 0 | 1 | | 1 |
| ST | 1 | 1 | 0 | 1 | 1 | 0 | 1 | |
| RS | 1 | 0 | 1 | 1 | 1 | 0 | 0 | |

Bit signal i11 becomes signal GETOP

TABLE V

Microprogram ROM Input Signals From Sequence Generator and Mapper ROM

| | PHASE SIGNAL | | | MAPPER INPUT | | | | | MAPPER OUTPUT | | | |
|---|---|---|---|---|---|---|---|---|---|---|---|---|
| OPERATION | PH0 | PH2 | PH3 | i15 | i14 | i13 | i12 | i11 | Xd | Xc | Xb | Xa |
| Fetch Instr. | 1 | 0 | 0 | — | — | — | — | — | 0 | 0 | 0 | 1 |
| GET OP | 0 | 1 | 0 | — | — | — | — | — | 0 | 0 | 1 | 0 |
| LDA | 0 | 0 | 1 | 0 | 0 | 0 | 0 | 1 | 0 | 0 | 1 | 1 |
| ADD | 0 | 0 | 1 | 0 | 0 | 0 | 1 | 1 | 0 | 1 | 0 | 0 |
| SUB | 0 | 0 | 1 | 0 | 0 | 1 | 0 | 1 | 0 | 1 | 0 | 1 |
| STA | 0 | 0 | 1 | 0 | 0 | 0 | 1 | 0 | 0 | 1 | 1 | 0 |
| CLA | 0 | 0 | 1 | 0 | 0 | 1 | 0 | 0 | 0 | 1 | 1 | 1 |
| SAR | 0 | 0 | 1 | 0 | 0 | 1 | 1 | 0 | 1 | 0 | 0 | 0 |
| SAL | 0 | 0 | 1 | 0 | 1 | 0 | 0 | 0 | 1 | 0 | 0 | 1 |
| JMP | 0 | 0 | 1 | 0 | 1 | 0 | 1 | 0 | 1 | 0 | 1 | 0 |
| IF | 0 | 0 | 1 | 0 | 0 | 1 | 1 | 1 | 1 | 0 | 1 | 1 |
| Control LA | 0 | 0 | 1 | | 1 | | | | 1 | 1 | 0 | 0 |
| Bit Manip. | 0 | 0 | 1 | 1 | | | | | 1 | 1 | 0 | 1 |

TABLE VI

Logic Processor Operation

| INSTRUCTION | Function Code | | | LB | T/C | ELB | (n) | (o) | (p) | LA new after clocking | |
|---|---|---|---|---|---|---|---|---|---|---|---|
| | L2 | L1 | L0 | | | | | | | | |
| LD | 1 | 1 | 1 | 0 / 0 | 1 / 1 | 0 / 1 | 0 / 1 | 0 / 0 | 1 / 0 | 0 / 1 | $LA_{new} = ELB$ |
| AN | 1 | 0 | 1 | " | " | 0 / 1 | 0 | 1 / 0 | 1 / 0 | 0 / 1 | $LA_{new} = LA_0 \cdot ELB$ |
| OR | 0 | 1 | 0 | " | " | 0 / 1 | 0 / 1 | 0 / 1 | 0 | 0 / 1 | $LA_{new} = LA_0 + ELB$ |
| XR | 1 | 1 | 0 | " | " | 0 / 1 | 0 / 0 | 0 / 0 | 0 / 0 | 1 | $LA_{new} = LA_0 \oplus ELB$ |

TABLE VI-continued

|   |   |   |   |
|---|---|---|---|
| 1 | 1 | 1 | 0 |

Bit Storage and Manipulation Operation

| INSTRUCTION | Function Code L1 | L0 | LB | LA | i14 | i12 | (a) | (b) | (c) | (d) | (e) | (f) | BC when strobed |
|---|---|---|---|---|---|---|---|---|---|---|---|---|---|
| SV | 0 | 1 | 0/0, 1/1 | 0 0 | — | 0 | 0 0 / 1 1 | 0 | 0 0 0 / 1 1 0 | 0 | 0 1 / 1 0 | 0 | 0 1 / 1 0 |
| IV | 0 | 1 | — | — | — | 1 | — | 0 | — | — | 1 | 1 | 1 |
| ST | 1 | 0 | 0 / 1 | — | 1 | — | 0 | 1 | 1 | 1 | 0 0 / 1 0 | 1 | 1 0 / 0 |
| RS | 1 | 0 | 0 / 1 | — | 0 | — | 0 | 0 | 0 | 0 | 0 0 / 1 0 | 0 | 0 1 / 1 |

TABLE VII
Microprogram Field Decoder Truth Tables

ADDR FIELD DECODER

| INPUT |  | OUTPUT |  |
|---|---|---|---|
| M15 | M14 | PC | EA |
| 0 | 0 |   |   |
| 0 | 1 | X |   |
| 1 | 0 |   | X |
| 1 | 1 |   |   |

BUS FIELD DECODER

| INPUT |  |  | OUTPUT |  |  |  |
|---|---|---|---|---|---|---|
| M13 | M12 | M11 | ADTR | MEM | ATB | EOR |
| 0 | 0 | 1 | X |   |   |   |
| 0 | 1 | 0 |   | X |   |   |
| 0 | 1 | 1 |   |   | X |   |
| 1 | 0 | 0 |   |   |   | X |

ALU FIELD DECODER

| INPUT |  |  | OUTPUT |  |  |  |  |
|---|---|---|---|---|---|---|---|
| M10 | M9 | M8 | A | B | $\bar{B}$ | A+B | A−B |
| 0 | 0 | 0 | X |   |   |   |   |
| 0 | 0 | 1 |   | X |   |   |   |
| 0 | 1 | 0 |   |   | X |   |   |
| 0 | 1 | 1 |   |   |   | X |   |
| 1 | 0 | 0 |   |   |   |   | X |

STORE FIELD DECODER - if enabled

| INPUT |  |  | OUTPUT |  |  |  |  |  |
|---|---|---|---|---|---|---|---|---|
| M7 | M6 | M5 | IAR | AIR | ACC | BTM | LAS | PPC |
| 0 | 0 | 1 | X |   |   |   |   |   |
| 0 | 1 | 0 |   | X |   |   |   |   |
| 0 | 1 | 1 |   |   | X |   |   |   |
| 1 | 0 | 0 |   |   |   | X |   |   |
| 1 | 1 | 0 |   |   |   |   | X |   |
| 1 | 1 | 1 |   |   |   |   |   | X |

MISC FIELD DECODER - if enabled

| INPUT |  |  | OUTPUT |  |  |  |  |
|---|---|---|---|---|---|---|---|
| M4 | M3 | M2 | CLR | BTLOG | SACR | SACL | IPCLB |
| 0 | 0 | 1 | X |   |   |   |   |
| 0 | 1 | 0 |   | X |   |   |   |
| 0 | 1 | 1 |   |   | X |   |   |
| 1 | 0 | 0 |   |   |   | X |   |
| 1 | 0 | 1 |   |   |   |   | X |

I claim

1. In a digital computer, the combination comprising
   (a) a basic arithmetic system including
      (a1) a read/write system memory adapted to hold mutli-bit words at a plurality of address locations,
         (i) some of said words representing coded instructions and addresses,
         (ii) some of said words representing data, and
         (iii) some of said instruction-address words being of special code format to represent a logic instruction, a bit address, and a memory address,
      (a2) an arithmetic unit having multi-bit inputs and outputs,
      (a3) a bus between said system memory and said arithmetic unit, and
      (a4) a control unit including means for producing successive operational sequences which include
         (i) fetching an instruction/address word from memory,
         (ii) feeding from memory to the arithmetic unit the operand represented by the address portion of the fetched word, and
         (iii) executing the function represented by the instruction portion of the fetched word,
   (b) a one-bit logic processor responsive to various logic operation codes to perform different functional operations upon a bistate input signal (LB) fed thereto,
   (c) said control unit (a4) further including means responsive to a special instruction word fetched from memory for
      (i) transmitting from the operand fed to said arithmetic unit, as an input signal to said logic processor, the particular bit which corresponds to the bit address portion of the fetched word, and
      (ii) actuating said logic processor (b) to execute the function represented by the logic instruction portion of the fetched word.

2. The combination set forth in claim 1 and wherein said control unit (a4) further includes means responsive to a special instruction word fetched from memory for controlling said arithmetic unit to abort any arithmetic operation on the operand fed thereto as a result of the fetched instruction word.

3. The combination set forth in claim 1 wherein said control unit (a4) includes means responsive to the logic instruction portion of the fetches word instruction for causing said logic processor to process said input signal in its true or its complement form.

4. In a digital computer, the combination comprising:
   (a) a basic arithemtic system including
      (a1) a read/write system memory adapted to hold and signal multi-bit words at a plurality of address locations,
         (i) some of said words representing coded instructions and addresses,
         (ii) some of said words representing data, and
         (iii) some of said instruction-address words having a special code format with a first group of bits representing a logic instruction, a second group of bits representing a bit location within a word, and a third group of bits representing a memory address, (a2) an arithmetic unit including an input register and an output register, (a3) an instruction-address register, (a4) a bus between said system memory and said input, output and instruction-address registers, (a5) a control unit including means for producing successive operational sequences which include
  (i) fetching from memory to the instruction-address register an instruction-address word,
  (ii) feeding from memory to the input register the operand represented at the memory location designated by the then-signaled address output of instruction-address register, and
  (iii) executing the function represented by the then-signaled instruction-address register, (b) a one-bit logic processor responsive to various logic operation code signals to perform different functional operations (e.g., LD, AND, OR, EOR, SV, IV, ST, RS) upon a bistate input signal (LB) fed thereto taken appropriately in relation to a logic accumulator signal (LA), (c) said control unit (a5) further including
  (c1) means responsive to said second group of bit signals from said instruction-address register when the latter contains a special code format word, for routing as an input signal (LB) to said logic processor that particular bit signal from said input register which corresponds to the represented bit location,
  (c2) means responsive to said first group of bit signals from said instruction-address register, when the latter contains a special code format word, for routing to said logic processor logic operation code signals corresponding to the logic instruction represented by said first group of bits signals, and
  (c3) means for activating said logic processor to carry out the logic function represented by the code signal supplied thereto on the input signal then supplied thereto.

5. The combination set forth in claim 4 wherein said control unit (a5) further includes
  (c4) means responsive to said first group of bit signals from said instruction-address register, when the latter contains a special code format word, for causing said logic processor to process said input bit signal in either its true or its complement form.

6. The combination set forth in claim 4 further characterized in that said first group of bits in representing a logic instruction in any special instruction word fall into two code categories, namely, logic processing and bit manipulation, and said control means (c2) further include
  (c4) means responsive to said first group of bit signals from said instruction-address register, when the represented function is in the first category, for causing said logic processor to change a signaled logic accumulator output signal (LA) according to a Boolean function represented by such first group of bit signals applied to the input signal then received by the logic processor, and
  (c5) means responsive to said first group of bit signals from said instruction-address register, when the represented function is in the second category, for returning the word then signaled in the input register to the memory address location then signaled by said third group of bits in the instruction-address register after changing or not changing the bit of such word which forms the input signal (LB) to the logic processor, the changing or not changing being determined by the logic code operation signals routed to the logic processor.

7. In a digital computer, the combination comprising
(a) a basic arithmetic system including
  (a1) a memory adapted to hold multi-bit words at a plurality of addressed locations,
    (i) some of said words representing conventional coded instructions and addresses,
    (ii) some of said words representing data, and
    (iii) some of said words representing special logic instructions, bit addresses within a word, and word addresses,
  (a2) an arithmetic unit having multi-bit inputs and outputs,
  (a3) a bus between the memory and the arithmetic unit, and
  (a4) a control unit including means for producing successive operational sequences which include
    (i) fetching an addressed instruction word from memory,
    (ii) feeding to the arithmetic unit the operand from the memory location represented by the address in the fetched word, and
    (iii) executing the function represented by the fetched instruction word,
(b) a one-bit Boolean logic processor including
  (b1) means for signaling an accumulated output bit (LA),
  (b2) means responsive to logic operation code signals for changing said output bit according to the logic operation taken with a single bit input signal (LB),
(c) means responsive to any special instruction word fetched by said means (a4) for sending to said logic processor logic operation code (LOC) signals corresponding to a logic instruction represented by the fetched word,
(d) means responsive to the operand fed to the arithmetic unit by said means (a4) as a result of a fetched special instruction word for routing as a single bit input signal (LB) to said logic processor a particular bit of the operand corresponding to the bit address portion of the special instruction, and
(e) means for activating said logic processor to change said accumulated bit,
whereby, successive special instructions utilize selected bits of desired words to carry out Boolean chain operations according to a program of steps, interspersed with arithmetic steps, with the end result represented by the accumulated bit signal.

8. The combination set forth in claim 7 wherein said control means (a4) includes means for causing said arithmetic unit to omit any arithmetic operation on the operand fed to the arithmetic unit as a result of a fetched special instruction word.

9. The combination set forth in claim 7 wherein said means (d) includes means responsive to any special instruction word fetched by said means (a4) for causing said logic processor to process said single bit input signal selectively in either its true or complement form.

10. The combination set forth in claim 7 further including means responsive to said signaled accumulated output bit (LA) state for affecting the execution of instructions as carried out by said control means (a4) and arithmetic unit (a2).

11. The combination set forth in claim 10 further characterized in that said words representing conventional coded instructions and addresses include an unconditional/conditional designating bit, said arithmetic system includes means responsive to a fetched instruction word for producing a conditional signal when the designating bit in such word denotes "conditional", and means responsive to the existence of said conditional signal for preventing the execution of a fetched instruction if said conditional signal exists and said signaled accumulated output bit (LA) has a predetermined one of its two possible states.

12. In a digital computer, the combination comprising
(a) a basic arithmetic system including
 (a1) a read/write system memory adapted to receive and signal multi-bit words at a plurality of address locations,
  (i) some of said words representing coded instruction and addresses,
  (ii) some of said words representing numerical data and/or multiple on/off type binary bits, and
  (ia) some of said instruction-address words being of a special code format with a first group of bits representing a logic instruction (e.g., LD, AN, OR, XR), a second group of bits representing a bit location within a word, and a third group of bits representing a memory address of a data operand,
 (a2) an arithmetic unit including
  (i) an input register (AIR)
  (ii) an output register (ACCUM & EOR), and
  (iii) an instruction-address register (IAR),
 (a3) a bus between said memory system and said three registers, and
 (a4) a control unit including means for producing successive operational sequences which include
  (i) fetching an addressed instruction word signals from memory and storing the same in said IAR register,
  (ii) feeding data operand word signals from the memory address representing by the third group of bits then signaled from the IAR register, and storing them in said AIR register, and
  (iii) executing the instruction represented by the first group of bits then signaled by said IAR register,
(b) a one-bit logic processor including
 (b1) means for producing a one-bit accumulated logic output signal (LA), and
 (b2) means responsive to (i) a one-bit logic input signal (LB) and to (ii) logic operation code signals designating various logic functions (e.g., LD, AN, OR, XR) for changing said output signal (LA) according to the input signal (LB) and the designated logic function (e.g., $LA_n = LA_0 \cdot LB$ if function is AN),
(c) said control unit further including
 (c1) means for detecting when said IAR register holds a special format instruction word calling for some logic operation,
 (c2) means responsive to such detection for sending to said logic processor as its input signal (LB) the signaled bit from the bit location of said AIR register which corresponds to the bit location represented by the second bit group signals from said IAR register,
 (c3) means also responsive to such detection for routing to said logic processor operation code signals corresponding to the logic function represented by the first group bit signals from said IAR register,
 (c4) means for activating said logic processor to change said output bit signal (LA) according to the logic operation represented by said operation code signals and the then-existing value of said input and output signals,
whereby said logic output signal (LA) may represent the value of chained Boolean logic operations performed successively selected bits of selected memory data words, such operations being carried out by program steps randomly or systematically interspersed with arithmetic operation program steps, and said arithmetic unit input and instruction address registers are utilized in the Boolean operations as well as in the arithmetic operations.

13. The combination set forth in claim 12 wherein said control unit (a4) further includes means responsive to operation code signals derived from the first group bit signals from said IAR register for causing said logic processor to treat its received input signal (LB) in true or complement form.

14. The combination set forth in claim 12 further including means responsive to said logic output signal (LA) state for modifying the operation of said control unit means (a4) and the execution of instructions brought into said IAR register.

15. The combination set forth in claim 12 characterized in that each conventional instruction and address word includes coding of the instruction bits to designate if the arithmetic operation is to be performed conditionally, and further including
 (d) means responsive to the first bit group of signals from said IAR register for producing a conditional signal (COND) if the coding of such bits so designates, and
 (e) means responsive to the existence of said conditional signal (COND), but only if said logic output signal is in a predetermined one of its two states, for modifying the operation of said control unit means (a4) abort the execution of the instruction represented by the first group of bits then signaled by the IAR register,
whereby any program step excepting logic operations may be made selectively dependent upon the result of one or more previous Boolean logic steps.

16. In a digital computer, the combination comprising
(a) a basic arithmetic system including
 (a1) a read/write system memory adapted to hold and signal a plurality of multi-bit words at address locations,
  (i) some of said words having a code format to represent instructions and addresses,
  (ii) some of said words having a code format to represent data, and
  (iii) some of said words having a code format by which a first group of bits represents one of a plurality of special logic instructions, a second group of bits represents a desired bit address within a word, and a third group of bits represents a word address,
 (a2) an arithmetic unit having multi-bit input lines and output lines, (a3) a bus coupling said input and output lines to said memory, and (a4) a control unit including means for producing successive operaional sequences some of which include (i) fetching an instruction-address word from an address location of said memory and transmitting it to said arithmetic unit, (ii) feeding a data word operand from an address location of memory to the arithmetic unit, such address location corresponding to the address represented in the fetched word, and (iii) executing with said operand the instruction represented by the fetched instruction-address word, (a5) said control unit further including means for producing some of said sequences in which the execution includes storing the signals (ANS) from the output lines of said arithmetic unit in the address location of memory which corresponds to the address represented by the fetched instruction-address word, (b) a logic bit manipulator including (b1) operation code inputs (L1, L0, i12, i14), (b2) a one-bit input adapted to receive a logic signal (LB), (b3) means for producing a bit control signal (BC) having a state which depends jointly upon operation code signals applied to said inputs and the state of said logic signal (LB) applied to said one-bit input, (c) means for applying to said one-bit input a selected signal of the data word fed to said arithmetic unit, said selected bit signal corresponding in its bit location to the bit address represented by said second group of bits in a fetched special logic instruction-address word, (d) means for applying to said operation code inputs logic operation code signals corresponding to the logic instruction represented by the first group of bits in a fetched special logic instruction-address word, (e) means for applying the data word fed to the arithmetic unit input lines to the arithmetic unit output lines but with a selected bit inverted or non-inverted according to the state of said bit control signal (BC) produced by said bit manipulator, said one-bit corresponding to the bit location represented by the second group of bits in a fetched special logic-instruction word, whereupon restoring of the output of the arithmetic unit to the memory address location represented by the third group of bits of a fetched special logic instruction-address word results in the selected bit of the data word having the desired state.

17. The combination set forth in claim 16 further including means for signaling a logic accumulator output (LA), and wherein said means (b3) and said means (e) jointly comprise means to cause the data word fed to the arithmetic unit to be restored in the memory at its original address location but with the selected bit of such data word in the same state as the accumulator output.

18. The combination set forth in claim 16 wherein the logic operation code signals applied by said means (d) represent either SET, RESET or INVERT, and said means (b3) and said means (e) jointly comprise means to cause the data word fed to the arithmetic unit to be restored in the memory at its original address location but with the selected bit of such data word respectively in the 1 state, 0 state or inverted to a state opposite its original state.

19. The combination set forth in claim 16 further characterized in that any of said instruction-address words, including those with said format of first, second and third bit groups, includes within the instruction code a designation that the instruction is to be performed unconditionally or conditionally, and further comprising (f) means for signaling a logic accumulator output (LA), and (g) means forming a part of said control unit (a4 and a5) for responding to any instruction address word fetched to the arithmetic unit by aborting the execution of the instruction whenever its designation is conditional and said accumulator output (LA) has a predetermined one of two possible states.

20. In a digital computer, the combination comprising (a) a basic arithmetic system including (a1) a read/write system memory adapted to receive and hold multi-bit words at a plurality of address locations, (i) some of said words having a code format to represent ordinary instructions and addresses, (ii) some of said words having a code format to represent data, and (iii) some of said instruction-address words having a special code format by which a first group of bits represents one of a plurality of special logic instructions, a second group of bits represents a desired bit address within a word, and a third group of bits represents a memory address location of a word, (a2) an arithmetic unit including an input register AIR, an output register AOR, (a3) an instruction-address register IAR, (a4) a bus coupling said input, output and instruction-address registers to said memory, (a5) a control unit including means for producing successive operational sequences some of which include (i) fetching an instruction-address signals from an address signal from an address location of said memory into said register IAR, (ii) feeding data word operand signals from the address location of memory to said AIR register, such address location corresponding to the address represented by signals from said IAR register, (iii) executing, with said data word operand signals from said AIR register, the function represented by the instruction portion of the word previously fetched into said IAR register, and (iv) transmitting for storage in said memory the word signals appearing at the output of said AOR register, such storage being at the address location represented by the instruction-address word then signaled by said IAR register, (b) a logic bit manipulator including (b1) operation code input terminals, (b2) a single bit operand input terminal, and (b3) means for producing a bit control signal (BC) which in its state depends jointly upon the signals applied to said code input terminals and said operand input terminal, (c) means for applying to said operand input terminal a single bit input signal (LB) from said AIR register, the bit location of such signal corresponding to that bit address represented by the second group of bits within the output signals from said IAR register after the latter contains a fetched special code format instruction word, (d) means for applying to said operation code input terminals signals which represent a logic operation corresponding to the logic operation corresponding to the logic instruction represented by the first group of bits within the output signals from said IAR register after the latter contains a fetched special instruction word, (e) means for routing the data word signaled by said AIR register to said AOR register but with one selected bit of such word controlled in its state according to the state of said bit control signal (BC), said means (e) being controlled by bit signals in said second group from said IAR register to make the selected bit correspond in location to the bit address in a special code format instruction word, and (f) means responsive to the first group of bits in the special code format signals from said IAR register for restoring in memory, at the address location represented by the third group of bits in the signals from said IAR register, the signals then produced by said AOR register.

21. The combination set forth in claim 20 further including (g) a single bit logic processor connected to said bit manipulator (b) and including (g1) means for producing a single bit accumulated signal (LA) which in its state is changed according to a logic processing operation code supplied to said input terminals (b1) as successive single bit input signals (LB) are brought to said input terminal (b2), and (h) means responsive to said accumulated signal (LA) for determining the state of said control signal BC.

22. In a digital computer, the combination comprising (a) a basic arithmetic system including (a1) a system memory for holding a plurality of multi-bit words, some of which are instruction words and some of which are data words, (a2) a multi-bit instruction-address register IAR, (a3) means for fetching different instruction words from memory into the IAR register, (a4) means coupled to a first predetermined plurality of the bit outputs of said IAR register for executing an arithmetic instruction represented by a fetched word, (b) means coupled to a second predetermined plurality of the bit outputs of said IAR register for selecting a bit signal from a selected multi-bit signal of a word elsewhere signaled in the computer, the selected bit corresponding to a bit location represented by the code of said second plurality of said bit outputs, and (c) means for utilizing the selected bit signal.

23. In a digital computer, the combination comprising (a) an arithmetic system including (a1) a read/write system memory having n word locations each m bits wide adapted to hold and signal multi-bit words, (i) some of said words being ordinary instruction-address words with p bits representing different coded instructions and n-p bits representing a memory address location of an operand word to be employed, (ii) some of said words being special instruction-address words with p bits representing different special coded instructions, b bits representing one of m different bit locations within a word, and n-p-b bits representing a memory address location of an operand word to be employed, (a2) an arithmetic unit having an instruction-address register IAR, and an arithmetic input register AIR, (a3) a bus between said system memory and said arithmetic unit including said registers IAR and AIR, and (a4) a control unit including means for fetching successively programmed instruction-address words into said IAR register at the beginning of successive operational sequences, said control means further having means for effecting during each sequence (1) the feeding of an operand word, from the memory location corresponding to the code of said n-p or n-p-b bits signaled by said IAR register, into said AIR register, and (2) executing the function corresponding to the code of said p bits signaled by said IAR register, (b) means connected to receive the b bit signals from said IAR register and operative to route the signal of a selected bit from the AIR register to a selected bit terminal, said selected bit corresponding to bit location represented by the b bit signals from the IAR register, and (c) means for utilizing said selected bit signal on said terminal, whereby any desired bit of various desired memory words may be brought to said bit terminal by the fetching of a special instruction-address word.

24. The combination set forth in claim 23 wherein said utilizing means (c) comprises a Boolean logic processor producing an output signal (LA).

25. The combination set forth in claim 24 further including, as a part of said control unit (a4), control means responsive to the p bits signaled from the IAR register to cause said Boolean logic processor to execute a Boolean function corresponding to the code of the p bits in a fetched special instruction word.

26. The combination set forth in claim 25 further including means for storing the output signal (LA) of said logic processor in any selected bit location of a desired one of the memory word locations.

27. The combination set forth in claim 26 wherein said means for storing is responsive to a "save" code represented by the p bits of a special instruction word fetched into said IAR register; means for feeding a word, from the memory location corresponding to that represented by the n-p-b bits signaled by the IAR register, into said AIR register; and means responsive to the b bit signals from said IAR register for matching the selected bit of said fed word to the output signal (LA) prior to re-storing the fed word back into its original memory location.

28. In a digital computer, the combination comprising (a) a basic arithmetic system including an instruction-address register, a system memory, means to fetch an instruction-address word from memory into said register, and means responsive to instruction-address signals from said register for executing the instruction represented by the fetched word, (b) a single bit Boolean logic processor including means to produce a master control signal (LA) according to chained Boolean operations performed upon single bits of data taken from system memory and according to functions represented by special instruction-address words fetched from memory into said register, (c) means responsive to instruction-address signals from said register for producing a condition signal (COND) whenever the instruction represented by the word fetched into such register is "conditional", and (d) means for causing said executing means to abort the execution of the instruction whenever the condition signal (COND) is present and said master control signal (LA) has a predetermined one of two states.

29. The combination set forth in claim 28 further including (e) means responsive to a first group of bit signals from said instruction-address register, after a special instruction-address word has been fetched, for feeding a word from an address of said system memory which is represented by said first group of bit signals, to an input register (AIR), and (f) means responsive to a second group of bit signals from said instruction-address register, when it contains the fetched special instruction-address word, for feeding as an operand input to said Boolean logic processor a selected bit signal from said input register, the bit location of the selected bit signal being represented by said second group of bit signals.

30. The combination set forth in claim 29 further including (g) means responsive to a third group of bit signals from said instruction-address register, after the special instruction-address word has been fetched, for supplying to said Boolean logic processor operation code signals which condition said processor to perform that one of a plurality of functions (e.g., LD, AN, OR, EOR) represented by said third group of bit signals.

31. In a digital computer, the combination comprising
(a) a basic arithmetic system including
  (a1) a read/write system memory adapted to hold and signal multi-bit words at respective address locations,
    (i) some of said words having a first code format to represent arithmetic instructions and addresses,
    (ii) some of said words having a second code format to represent single bit logic instructions and addresses,
    (iii) some of said words having a code format to represent data, and
    (iv) said instruction-address words having a common code characteristic (e.g., 0 or 1 in bit b10) designating that the instruction is unconditional or conditional,
  (a2) an arithmetic unit including an instruction-address register IAR, an arithmetic input register AIR, and an arithmetic output register AOR,
  (a3) a bus between said system memory and said registers IAR, AIR and AOR, and
  (a4) a control unit for producing successive operational sequences and including
    (i) means for fetching from a programmed memory address location to said IAR register signals representing an instruction address word,
    (ii) means for feeding to the register AIR, from the memory address location represented by the fetched signals from said IAR register, signals representing a data word, and
    (iii) means for executing, with the data word in said AIR register as an operand, the arithmetic function represented by the signals from the IAR register which constitute a fetched first code format instruction word,
(b) a single bit Boolean logic processor including means for producing a bistate one-bit accumulator signal (LA) according to chained Boolean operations performed upon single operand bit signals (LB) supplied thereto,
(c) said control unit further including
  (iv) means responsive to signals from said IAR register, after a second code format word has been fetched, for aborting the operation of said executing means (a4)(iii) and for instead executing in said logic processor the logic function (e.g., LD, AN, OR, EOR) represented by signals from the IAR register, with an operand which is a selected bit of a data word then in said AIR register, and
(d) means for aborting the operation of said executing means (a4)(iii) whenever (1) the fetched word and IAR register signals designate that the represented instruction is conditional, and (2) said accumulator signal (LA) has a predetermined one of its two states.

32. A control processor comprising:
a read/write memory comprised of a plurality of addressable multi-bit words, said read/write memory storing at a selected set of memory addresses input-output bit words and storing a program comprised of a plurality of controller instructions which each contain a selected one of a plurality of operation codes;
a processor data bus coupled to said read/write memory for reading words out of and writing words into said read/write memory;
a macro-instruction register coupled to said processor data bus for receiving and storing controller instructions read out of said read/write memory;
a micro-program memory for storing addressable micro-routine words, readable successively to form different sets of micro-instructions each of which sets corresponds to one of said operation codes in said plurality;
means coupled to said macro-instruction register and said micro-program memory for receiving the operation code in a controller instruction stored in said macro-instruction register and in response thereto addressing its corresponding set of micro-routine words in said micro-program memory; and
means for sequentially executing the micro-instructions in an addressed set of micro-routine words including:
  a. means responsive to a selected micro-instruction and responsive to a memory address code in a controller instruction stored in said macro-instruction register to read out a selected input-output bit word from said read/write memory;

b. a bit selector responsive to a bit pointer code in a controller instruction stored in said macro-instruction register to select a bit in an input-output bit word read from said read/write memory; and c. means responsive to a selected micro-instruction for performing a logical operation with the selected bit.

33. A control processor as recited in claim 32 which includes: a system flag table stored at a selected set of read/write memory addresses; and means for receiving input data which indicates a function to be performed and for setting a bit in said flag table which corresponds to that function; wherein selected controller instructions include address codes which enable said micro-instruction execution means to read out a memory word from said sytem flag table and perform a logical operation with a bit therein.

34. A control processor as recited in claim 32 which includes a plurality of groups of bi-state units coupled to said processor data bus, each of said groups of units being associated with one memory word location and forming a plural bit input-output bit word; each of said bi-state units including a circuit suitable for coupling to a respective external device, and each circuit associated with a bi-state unit of a given group corresponding to a respective single bit in said one memory word location associated with that group.

35. An industrial control processor as recited in claim 34 which includes means for coupling data between said input-output bit memory word locations and their associated sets of bi-state units.

* * * * *

UNITED STATES PATENT OFFICE
CERTIFICATE OF CORRECTION

PATENT NO. : 4,212,076          Page 1 of 2
DATED : July 8, 1980
INVENTOR(S) : John P. Conners It is certified that error appears in the above-identified patent and that said Letters Patent are hereby corrected as shown below:

Column 8, line 11, erase "0".

Column 9, line 21, "simplee" is changed to --simple--.

Column 14, line 55, "when" is changed to --which--.

Line 62, "anode" is changed to --decode--.

Column 15, line 6, "Y" is changed to --y--.

Line 48, "signal" is changed to --single--.

Column 16, line 22, "MUX" is changed to --demultiplexer--.

Column 17, line 25, "In" is changed to --It--.

Column 20, line 60, "BTM" is changed to --BTM'--.

Column 23, line 12, "26" is changed to --2b--.

Column 24, line 24, "uch" is changed to --such--.

Column 28, line 57, "ELB" is changed to --$\overline{\text{ELB}}$--.

Column 30, line 8, "420" is changed to --430--.

Line 22, "and" (second occurrence) is changed to --are--.

UNITED STATES PATENT AND TRADEMARK OFFICE
CERTIFICATE OF CORRECTION

PATENT NO. : 4,212,076
DATED : July 8, 1980
INVENTOR(S) : John P. Conners

It is certified that error appears in the above—identified patent and that said Letters Patent is hereby corrected as shown below:

Line 62, "function" is changed to --terminal--.

Column 37, line 54, "siginal" is changed to --signal--.

Column 42, line 31, "ELB" is changed to --$\overline{\text{ELB}}$--.

Line 40, "ELB" is changed to --$\overline{\text{ELB}}$--.
Column 46, line 29, "ELB" is changed to --$\overline{\text{ELB}}$--.

Line 29, "ELB" is changed to --$\overline{\text{ELB}}$--.

Line 36, "Θ" is changed to --⊖--.

Column 47, line 41, "The" is changed to --the--.

Table III, item (f)(1), "LAR" is changed to --IAR--.

Table VI, in line beginning "XR", "$\frac{0 \quad 0 \quad 0 \quad 1}{}$" is changed to --$\frac{0 \quad 0 \quad 0 \quad 1}{1 \quad 1 \quad 1 \quad 0}$--.

Claim 3, line 3,
(Column 54, line 56), "fetches" is changed to --fetched--.

Signed and Sealed this

Twentieth Day of October 1981

[SEAL]

Attest:

GERALD J. MOSSINGHOFF

Attesting Officer   Commissioner of Patents and Trademarks